United States Patent [19]

Wong

[11] Patent Number: 4,873,700

[45] Date of Patent: Oct. 10, 1989

[54] AUTO-THRESHOLD/ADAPTIVE EQUALIZER

[75] Inventor: Hee Wong, San Jose, Calif.

[73] Assignee: National Semiconductor Corporation, Santa Clara, Calif.

[21] Appl. No.: 108,718

[22] Filed: Oct. 14, 1987

[51] Int. Cl.$^4$ .............................................. H04L 25/06
[52] U.S. Cl. ...................................... 375/76; 307/355; 328/146
[58] Field of Search ............................. 375/76, 20, 28; 307/355, 356, 357, 358, 359; 328/146, 164

[56] References Cited

U.S. PATENT DOCUMENTS

| | | | |
|---|---|---|---|
| 3,908,169 | 9/1975 | Tong | 375/76 |
| 3,947,769 | 3/1976 | Rousos et al. | 375/76 |
| 4,272,845 | 6/1981 | Fiumani | 375/76 |
| 4,348,769 | 9/1982 | Kittel | 375/28 |
| 4,540,897 | 9/1985 | Takaoka et al. | 328/164 |
| 4,553,102 | 11/1985 | Yoshida | 375/76 |
| 4,575,683 | 3/1986 | Roberts et al. | 375/76 |
| 4,625,320 | 11/1986 | Butcher | 307/359 |
| 4,635,277 | 1/1987 | Blake et al. | 375/20 |
| 4,736,391 | 4/1988 | Siegel | 375/76 |

Primary Examiner—Robert L. Griffin
Assistant Examiner—Stephen Chin
Attorney, Agent, or Firm—Limbach, Limbach & Sutton

[57] ABSTRACT

An auto-threshold circuit in accordance with the present invention comprises a full-wave peak sensor for accurately estimating slice levels for input signal detection. The peak sensor is qualified such that the auto-threshold circuit does not track an input signal with no modulation. The input signal is windowed with a phase-locked-loop so that the peak sensor is coherent to the input signal, causing the circuit to be insensitive to noise spikes or input distortion outside the window. The auto-threshold circuit includes a digital loop filter which receives the output from an auto-threshold controller and generates a corresponding binary signal which is converted by a digital Sigma/delta modulator to a single bit pulse density modulated signal having a predetermined sampling frequency. An adaptive equalizer in accordance with the present invention shares the auto-threshold slicing signal for generating its error feedback signal. The adaptive equalizer comprises a frequency selector which generates an output signal in response to the input signal and the feedback signal. As stated above, a threshold comparator slices the equalizer output at predetermined levels. A controller receives the comparator output and provides a controller output representative of the voltage level of the comparator output. A digital filter is then utilized to generate a corresponding binary signal as the feedback signal to the frequency selector. The adaptive equalizer is operable at more than one speed.

10 Claims, 37 Drawing Sheets

ADAPTIVE EQUALIZER OUTPUT WING FORMS

INPUT = INFO 4
B1, B2, D, E = 23 BIT PRN DATA SEQUENCE

20μSec    1μSec

AUTO-THRESHOLD/ADAPTIVE EQUALIZER

BACKGROUND OF THE INVENTION

1. Field of the Invention

The present invention relates to data communications systems and, in particular, to auto-threshold/adaptive equalizer circuitry for an integrated services digital network (ISDN) S-interface.

2. Discussion of the Prior Art

Although data communications systems are designed to yield zero intersymbol interference (ISI) during transmission, some amount of residue ISI inevitably occurs due to imperfections in the design or changing channel characteristics. Typically, adjustable filters are included within the system to compensate for this distortion. The process of correcting channel induced distortion is called equalization.

The most commonly used form of adjustable equalizer has been the transversal filter. A transversal filter consists, essentially, of a delay line which is tapped at predefined intervals. Each tap is connected through a variable gain device to a summing amplifier. By specifying the output value of the equalizer, the required gain settings can be determined. This type of equalizer is called a zero forcing equalizer since the equalizer output has an equal number of zero values on either size. Zero forcing equalizers are optimum in that they minimize peak ISI. The primary problem with zero forcing equalizers is that they increase the noise power at the input of the A/D converter typically included in the receiver system.

The design and adjustments of the tap gains of the zero forcing equalizer described above involves the solution of a set of simultaneous equations. In the manual made, the "trimming" of the equalizer requires that a test pulse be sent through the system, the receiving filter output be measured at appropriate sampling times, the tap gains be solved for using appropriate mathematical relationships and, finally, that the gain on each tap be set manually.

To eliminate the need for these time-consuming manual adjustments, automatic systems for setting the tap gains have been developed. These systems are usually divided into two groups. Preset equalizer systems use a special sequence of pulses prior to or during breaks in data transmission. Adaptive equalizers use iteractive techniques to arrive at optimum tap gains.

Preset equalizers require an iterative "training" procedure, sometimes involving hundreds of test pulses, to arrive at the desired tap gains. A major problem in "training" a preset equalizer is the presence of noise in the observed equalizer output values. While the effects of noise can be somewhat minimized by averaging the measured output values over a number of test pulses, this averaging technique slows down the rate of convergence.

In an adaptive equalizer, tap gain corrections are continually estimated during the normal course of data transmission. Thus, adaptive equalizers have the ability to adapt to changes during data transmission and eliminate the need for the long training procedures required with preset equalizers. Adaptive equalizers are also more accurate, versatile and cheaper than preset equalizers.

Theoretically, in a simple adaptive equalizer, the output of the equalizer at sampling times should be either plus or minus a preselected value: plus, if the actual input bit corresponding to the sampling time is 1; minus, if the input bit is 0. In an actual system, the equalizer output values will vary about the preselected value, due to ISI, depending on the input sequence. If the ISI is not very large, the transmitted data can be decoded and a sequence of ideal or desired output values is generated. An estimate of the error sequence required for adjusting the tap gains is then generated based on a comparison of the ideal outputs with the actual measured outputs.

SUMMARY OF THE INVENTION

The present invention provides an auto-threshold circuit that allows the receiver of an ISDN S-interface circuit to detect input signals at different amplitude levels. Generation of the threshold level is substantially insensitive to noise as well as to bus contention problems. A novel adaptive equalizer is also provided to compensate frequency and phase distortions introduced in the transmission media. The adaptive equalizer is a simple, low cost design that shares the synthesized threshold level for making continuous error correcting decisions.

An auto-threshold circuit in accordance with the present invention comprises a full-wave peak sensor for accurately estimating slice levels for input signal detection. The peak sensor is qualified such that the auto-threshold circuit does not track an input signal with no modulation. The input signal is windowed with a phase-locked-loop so that the peak sensor is coherent to the input signal, causing the circuit to be insensitive to noise spikes or input distortion outside the window. The auto-threshold circuit includes a digital loop filter which receives the output from an auto-threshold controller and generates a corresponding binary signal which is converted by a digital Sigma/delta modulator to a single bit pulse density modulated signal having a predetermined sampling frequency.

An adaptive equalizer in accordance with the present invention shares the auto-threshold slicing signal for generating its error feedback signal. The adaptive equalizer comprises a frequency selector which generates an output signal in response to the input signal and the feedback signal. As stated above, a threshold comparator slices the equalizer output at predetermined levels. A controller receives the comparator output and provides a controller output representative of the voltage level of the comparator output. A digital filter is then utilized to generate a corresponding binary signal as the feedback signal to the frequency selector. The adaptive equalizer is operable at more than one speed.

These and other features and advantages of the present invention will become apparent and be appreciated by reference to the detailed description of a preferred embodiment of the invention provided below which should be considered in conjunction with the accompanying drawings.

DESCRIPTION OF THE DRAWINGS

FIGS. 7A-1 to 7E-3 combine to provide a schematic diagram illustrating a receiver circuit which incorporates the auto-threshold/adaptive equalizer concepts of the present invention.

DETAILED DESCRIPTION OF THE INVENTION

Figure 1:
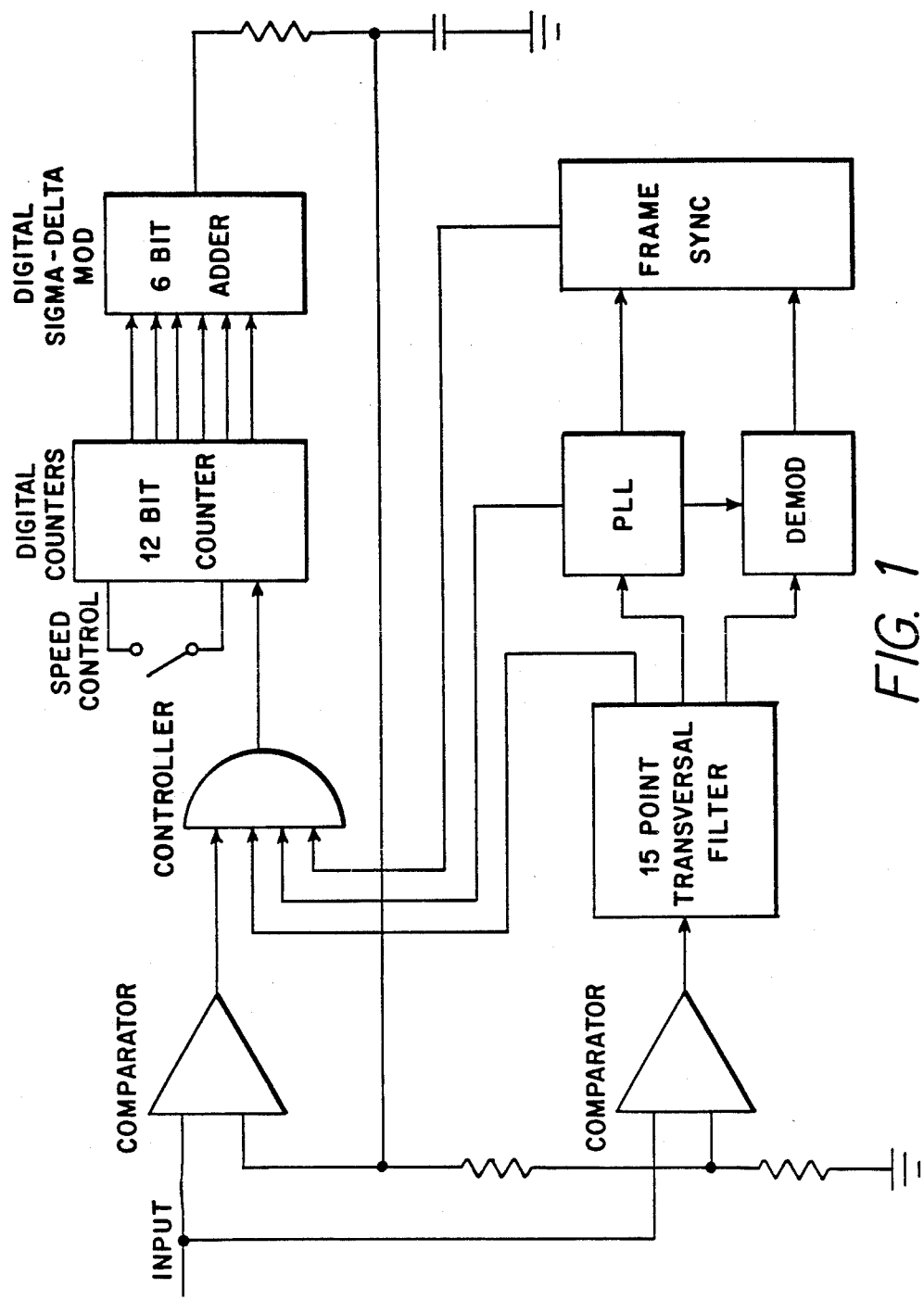
FIG. 1 is a block diagram illustrating an auto-threshold circuit in accordance with the present invention.

An auto-threshold circuit in accordance with the present invention includes full-wave peak sensing circuitry for accurately estimating slice levels for signal detection in a noisy environment, e.g. 200 KHz sine wave interference. The peak sensing circuit is qualified with outputs from 0+/0− filters. Therefore, noise rejection is enhanced. Due to the qualifiers from the 0+/0− filters, the auto-threshold circuit does not track an input signal with no modulation. Therefore, less ripple is produced at the circuit's control voltage output. The peak sensing circuit is coherent to the input signal, windowing the input with a phase-locked-loop, so that the auto-threshold circuit is insensitive to noise spikes or input distortion (due to bus contention) outside the window. In addition, since the auto-threshold circuit operates on the same input signal segments as the adaptive equalizer, as stated above, the synthesized threshold can be shared between these two circuits for error feedback generation. The auto-threshold filter is implemented digitally. The auto-threshold control voltage is generated from a digital Sigma/delta modulator; that is, the circuit utilizes no digital-to-analog converter. The ripple is filtered by a simple RC circuit with a non-critical time constant specification. The loop constant is determined only by the digital loop filter. The Sigma/delta modulator is updated synchronously to the input bit rate. Therefore, switching glitches at the outputs of the slicing comparators are minimized. A block diagram of an auto-threshold circuit in accordance with the present invention is shown in FIG. 1.

Figure 2:
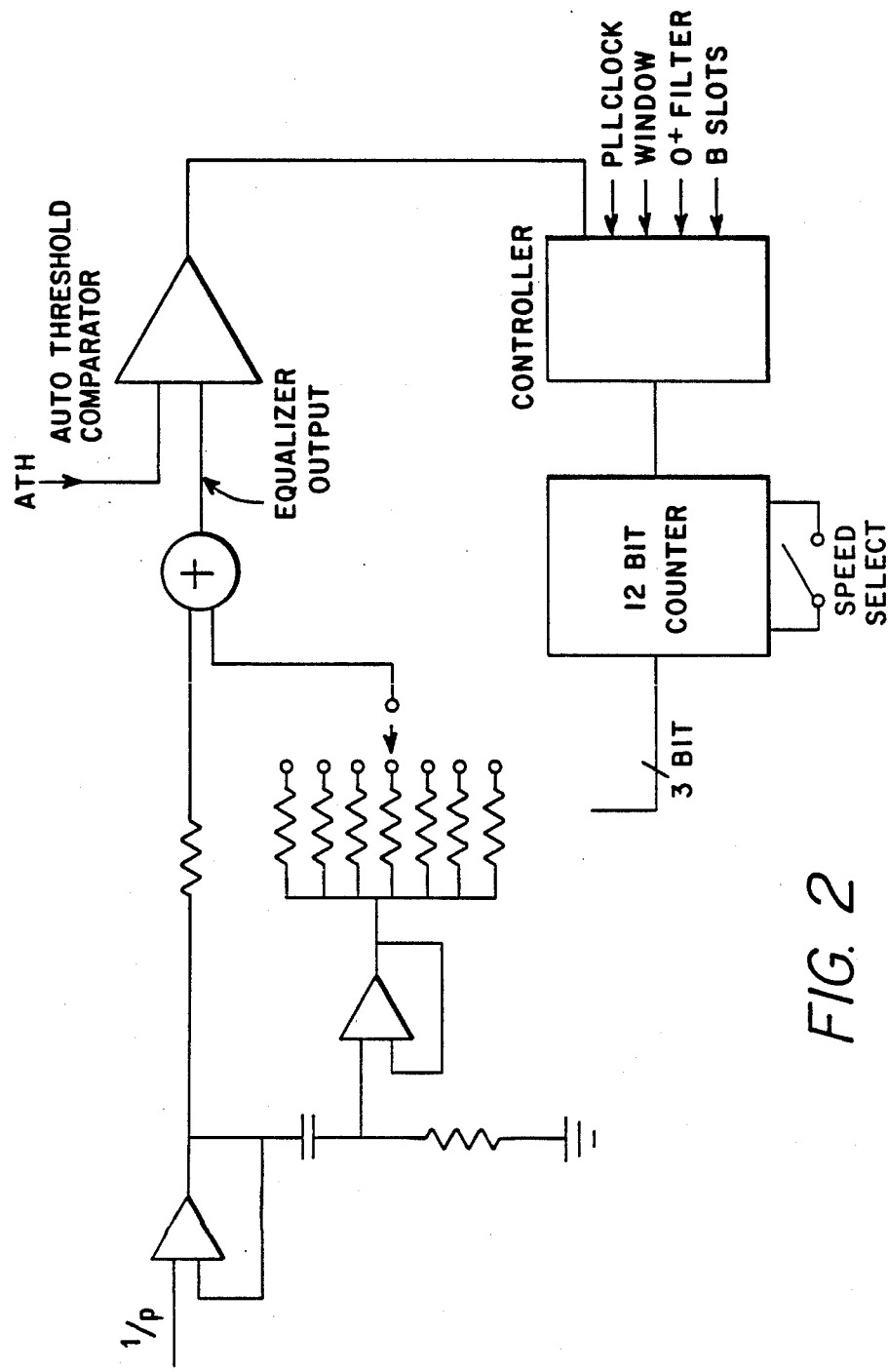
FIG. 2 is a block diagram illustrating an adaptive equalizer circuit in accordance with the present invention.

As stated above, the adaptive equalizer circuit shares the auto-threshold slicing level for generating the error feedback signal. The adapting algorithm is continuous and requires no training sequence. The step changes are synchronous to the input bit rate. Therefore, charge injecting distortion introduced by the analog switches during step changes can be placed at the middle of the 0+ pulses. This arrangement results in no degradation in detection accuracy while maintaining a simple circuit configuration. The loop filter has two tracking speeds and is implemented digitally. A block diagram of an adaptive equalizer circuit in accordance with the present invention is shown in FIG. 2.

Both the adaptive equalizer and the auto-threshold circuits are placed in the "hold" mode during some bit periods. Signal imperfections in these bits are ignored by these circuits.

A receiver circuit which incorporates the autothreshold/adaptive equalizer concepts of the present invention is shown schematically in FIGS. 7A-1 to 3E-3.

Referring to FIG. 3A-1, the receiver circuit includes a receiver front end and adaptive equalizer in accordance with the present invention. The front end and adaptive equalizer includes an input transformer 10 with a 1:1 ratio to prevent overloading of the buffers and the equalizer. The output of the transformer 10 drives a unity gain buffer and low-pass filter consisting of buffer 12, 2.7K resistor 14 and 47 pF capacitor 16 and having a −3 dB roll-off at a frequency of 1.25 MHz. The output of the unity gain buffer 12 is provided to a line equalization high-pass filter which consists of buffer 18 and an input RC consisting of 4.7K resistor 20 and 250 pF capacitor 22. The high-pass filter has a −3 dB roll-off at a frequency of 135 KHz. An amplifier 24, together with 1K resistor 26, 10K resistor 28, and 2.2K resistor 30, combine to form an inverting/summing amplifier which generates the equalizer output with a gain of 2.33. The amount of equalization is controlled by binary code at input pins C (msb), B and A of component 19 and it's seven associated resistors. There are eight possible steps, with a "0" binary code equalling a flat response.

Figure 3:
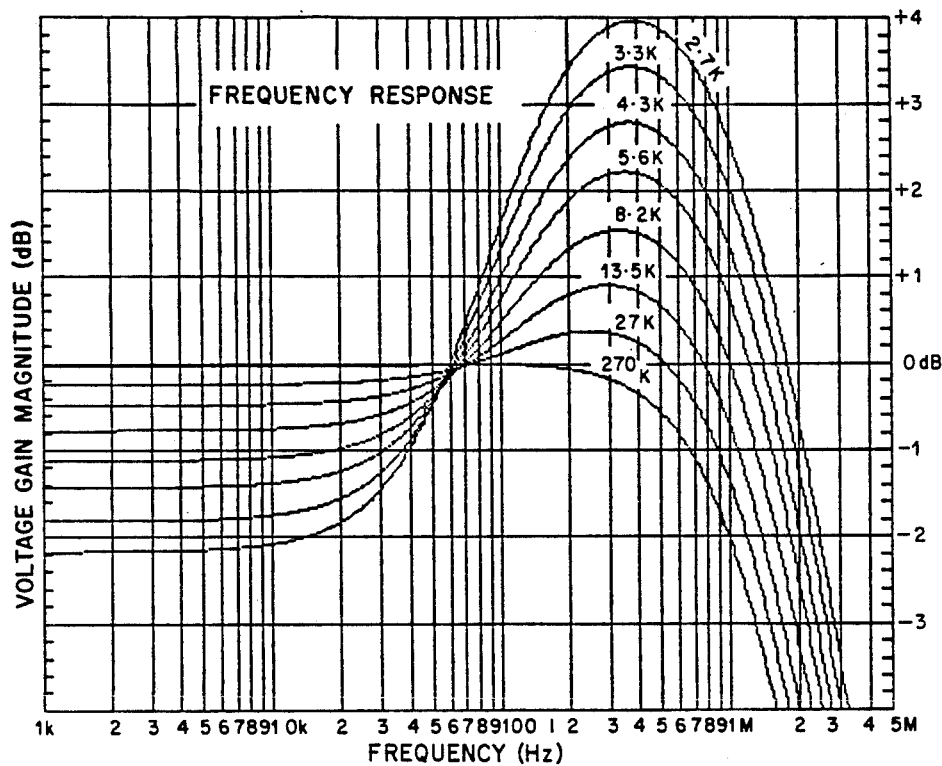
FIG. 3 is a graph illustrating the frequency response of an adaptive equalizer in accordance with the present invention.
Figure 4:
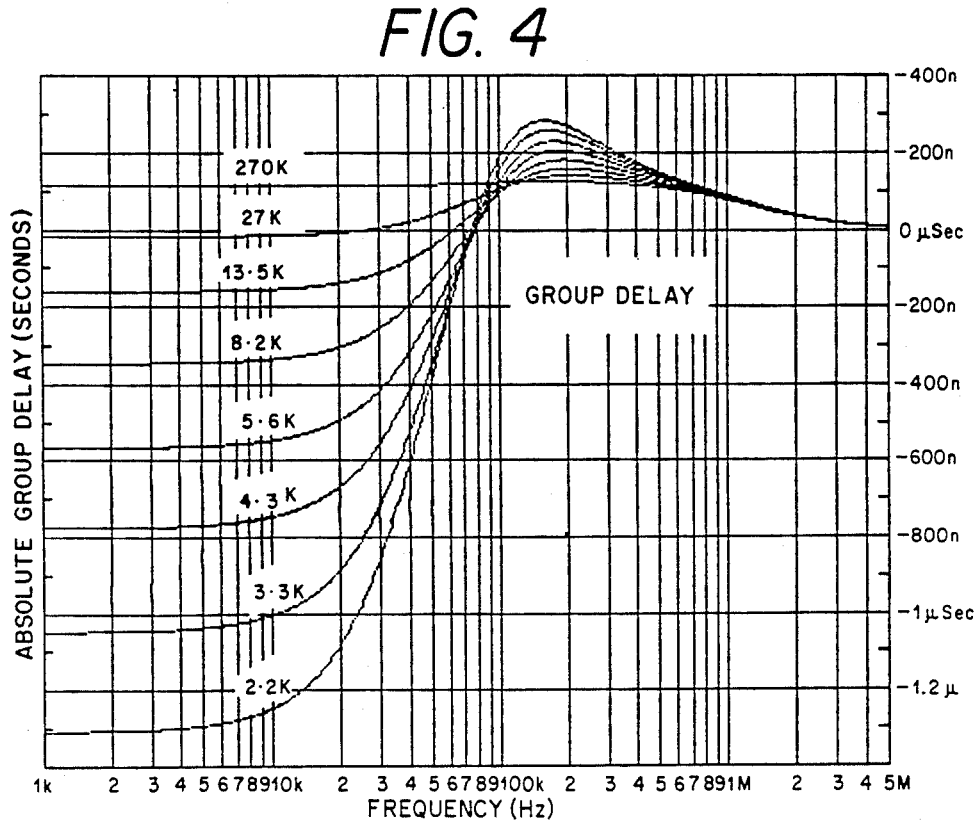
FIG. 4 is a graph illustrating the group delay of an adaptive equalizer in accordance with the present invention.
Figure 5:
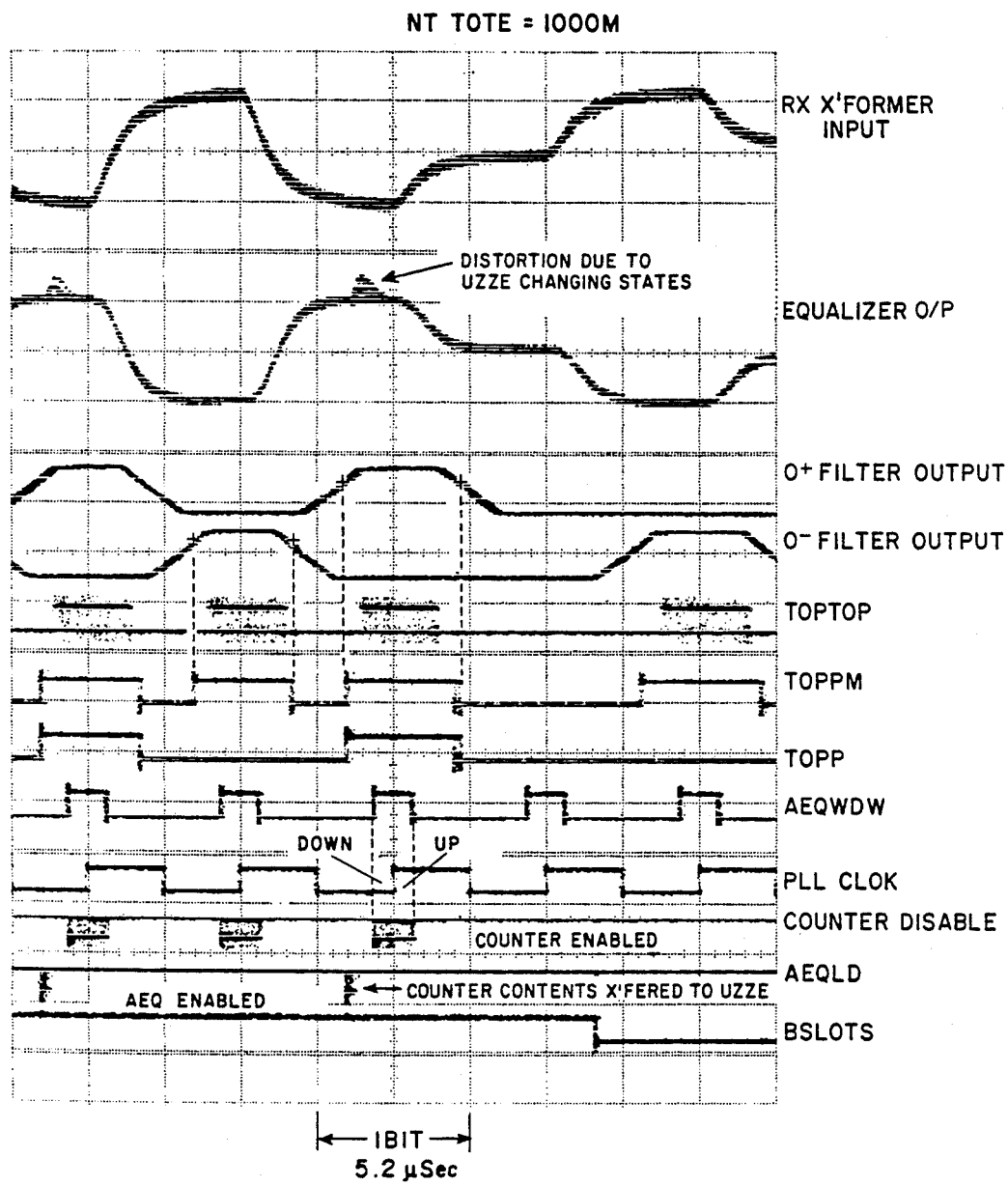
FIG. 5 is a timing diagram illustrating the waveform associated with an adaptive equalizer in accordance with the present invention.
Figure 6A:
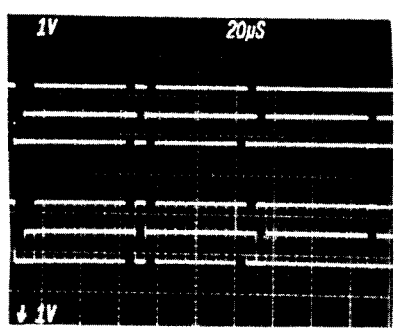
FIG. 6A is a graph illustrating a comparison between the input and output of an adaptive equalizer in accordance with the present invention for short (approx. 0 meter) transmission cables.
Figure 6A:
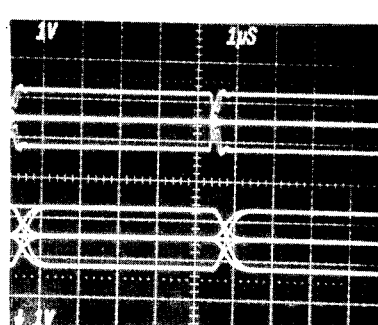
Figure 6A:
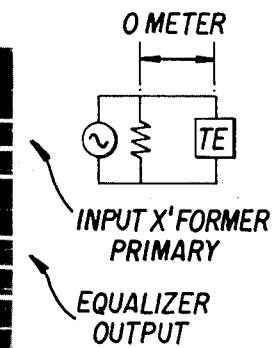
Figure 6B:
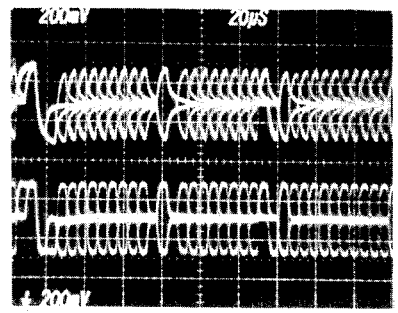
FIG. 6B is a graph illustrating a comparison between the input and output of an adaptive equalizer in accordance with the present invention for longer (approx. 500 meters) transmission cables.
Figure 6B:
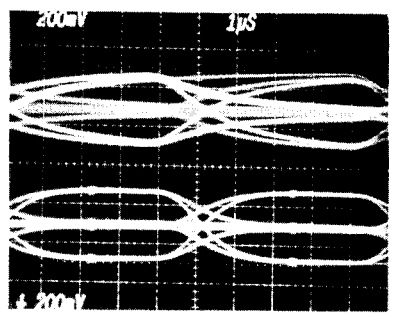
Figure 6B:
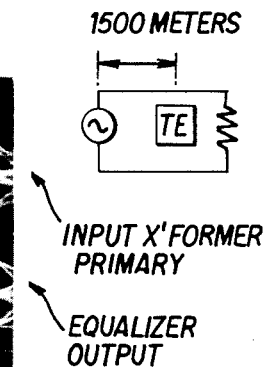

FIGS. 3 and 4 provide plots of the frequency response and group delay, respectively, of the adaptive equalizer described herein; FIG. 5 provides its timing diagram. FIGS. 6A and 6B illustrate the effect of the adaptive equalizer on the signal over short and long transmission distances, respectively.

Figures 1, 7A:
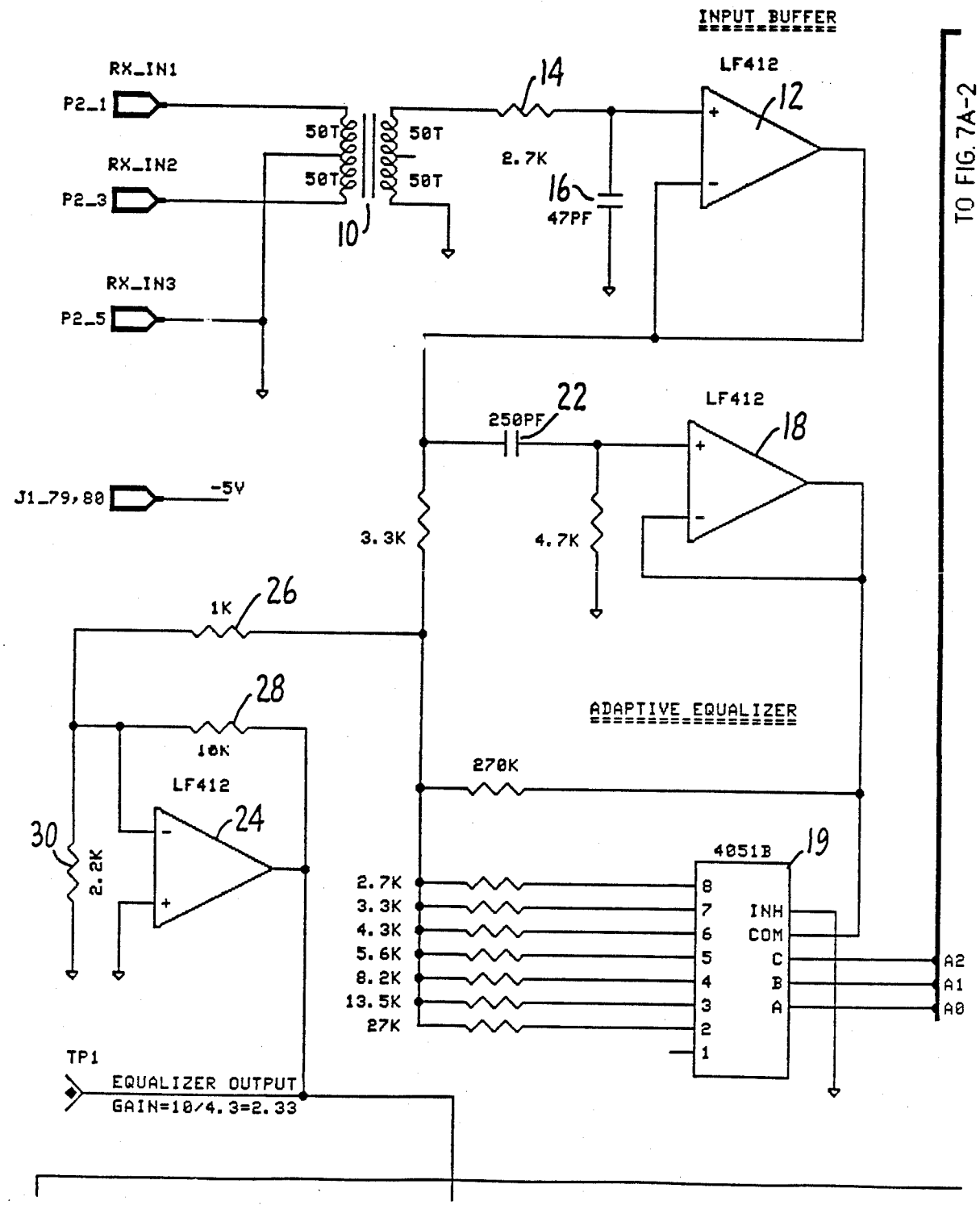
Figures 2, 7A:
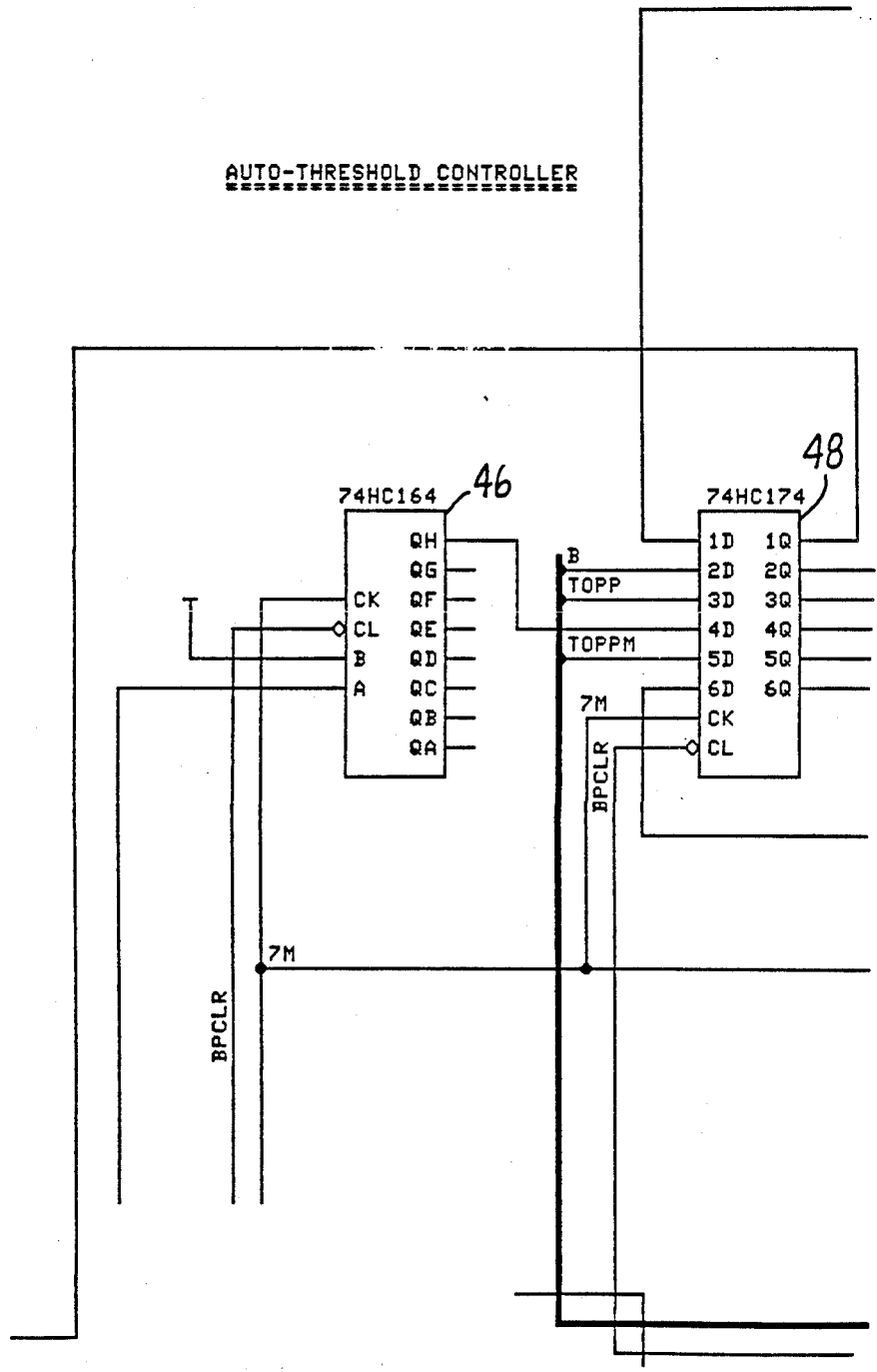
Figures 3, 7A:
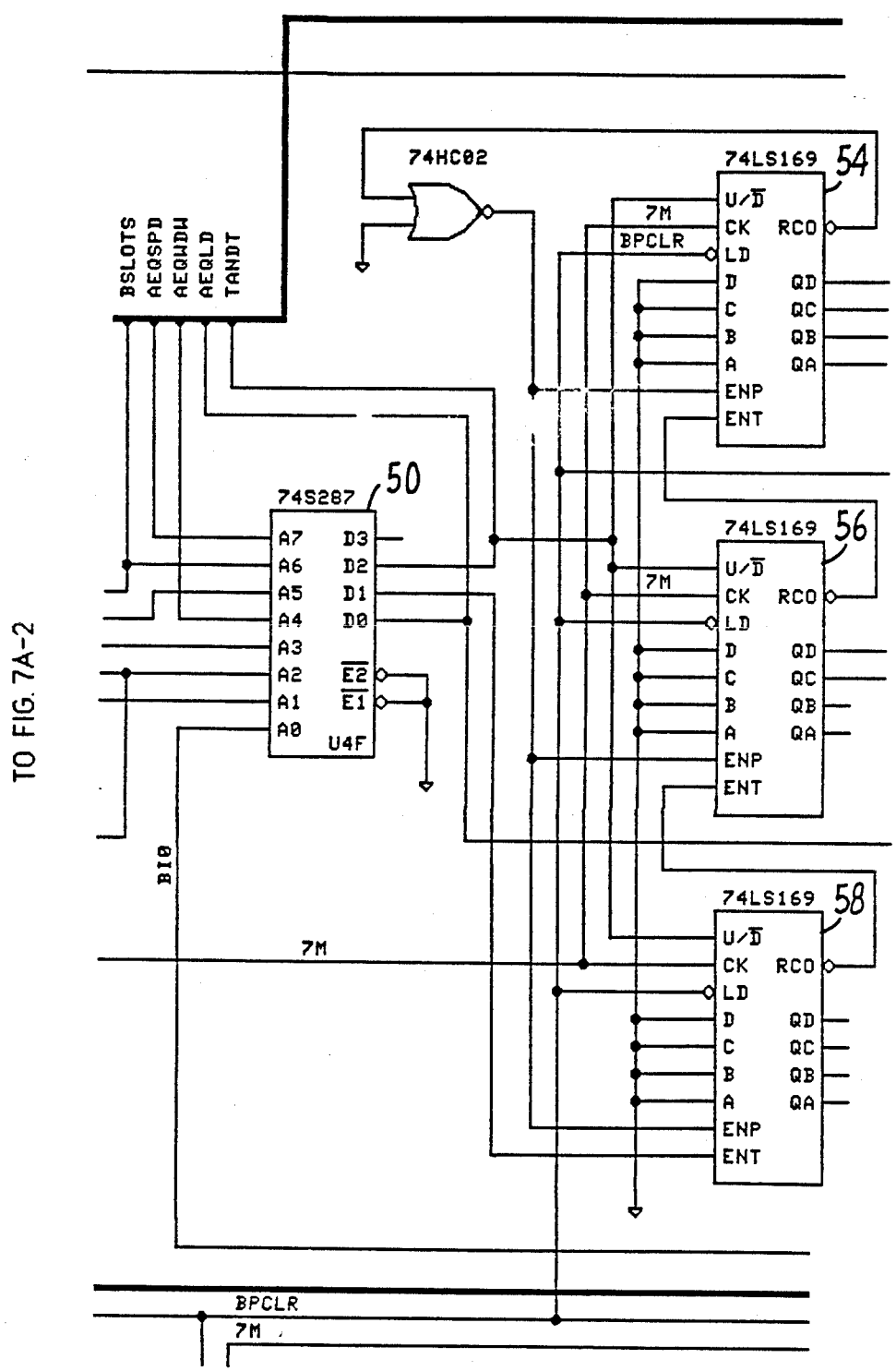
Figures 4, 7A:
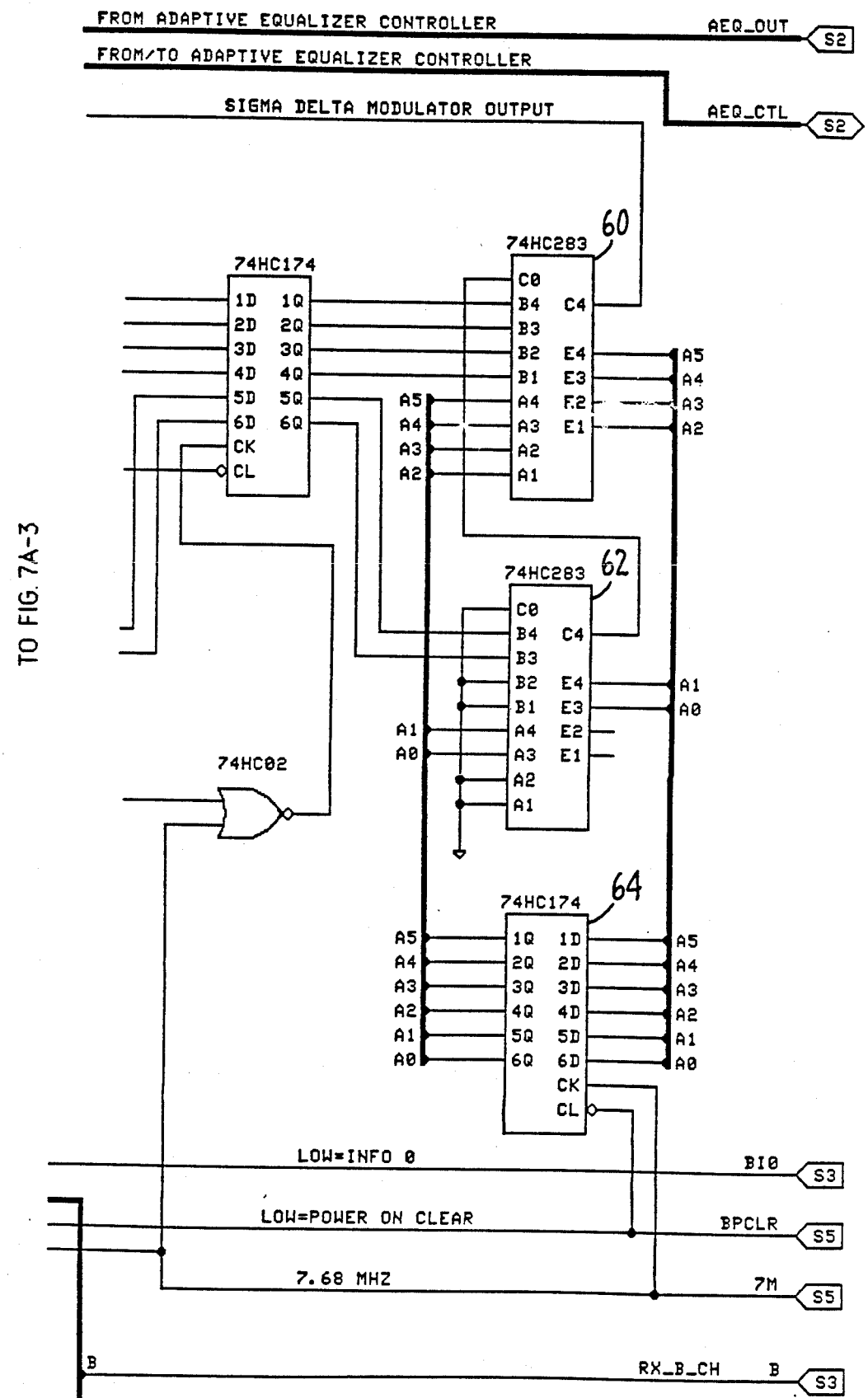
Figures 5, 7A:
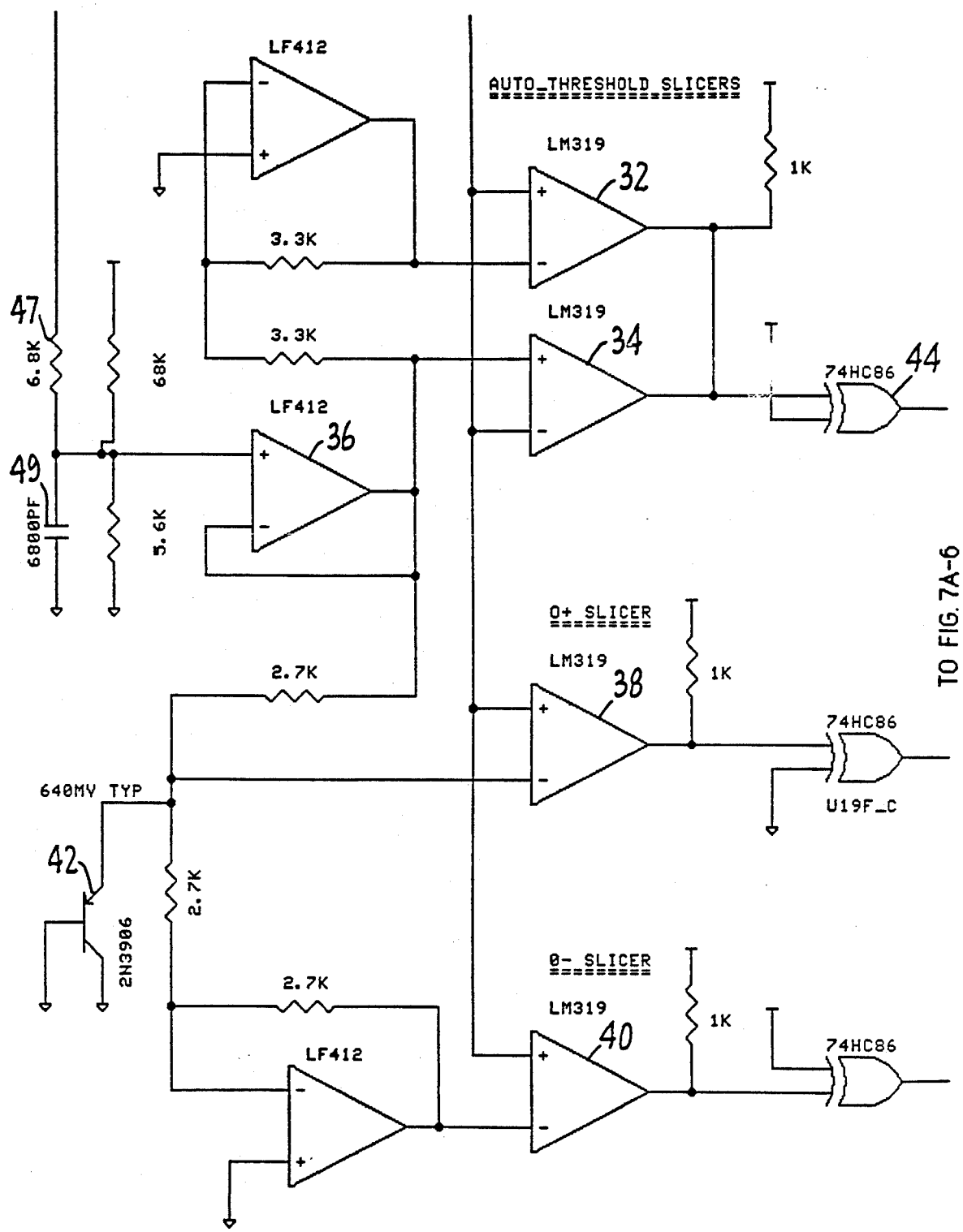

The equalizer output signal from component 24 is provided to a group of input slicers and level translators (see FIG. 7A-5). Components 32 and 34, together with an auto-threshold controller, which is described in detail below, form a full-wave, peak-voltage tracking loop. The voltage reading $V_{ath+}$ at the positive input of component 34 is a measure of the peak voltage of the equalizer output, i.e. 0.5 volts denotes the output amplitude=0.5 V peak or 1 V peak-to-peak. If the output amplitude is below 0.22 or above 2.33 V, then $V_{ath+}$ will be limited to 0.22 or 2.33 V, respectively. This is accomplished by the resistor "T" network at the positive input of component 36.

If voltage $V_{ath+}$ is normalized to 1, then the voltage $V_{ath-}$ at the negative input of auto-threshold 0-comparator 32 is −1 V, the voltage VO+ at the negative input of 0+ signal-detection slicer 38 is 0.5 V, and the voltage VO− at the negative input of 0-signal detection-slicer 40 is −0.5 V.

If voltage $V_{ath+}$ exceeds 1280 mv, then VO+ and VO− are clamped to 640 millivolts and −640 millivolts, respectively. The clamping function is necessary when the circuit operates in the network terminating mode with multiple-terminal nodes TE connected to the bus. Otherwise the nearby TEs would drive the VO+ or the VO− threshold levels above the received signal peaks from the remote TEs, causing detection errors.

The PNP transistor 42 connected to the negative input pin of component 38 provides the clamping function.

A cross-reference table showing the relationship between the voltage levels is provided in Table 1.

TABLE 1

| X' Former Secondary | $E_q$ O/P | $V_{ath+}$ | VO+ |
|---|---|---|---|
| 1 $V_{peak}$ (+2.5dB) | 2.33$V_{peak}$ | 2.33V | 0.64V |
| 0.89$V_{peak}$ (+1.5dB) | 2.07$V_{peak}$ | 2.07V | 0.64V |

TABLE 1-continued

| X' Former Secondary | $E_q$ O/P | $V_{ath+}$ | VO+ |
|---|---|---|---|
| $0.75V_{peak}$ (0dB) | $1.74V_{peak}$ | 1.74V | 0.64V |
| $0.55V_{peak}$ (−2.7dB) | $1.28V_{peak}$ | 1.28V | 0.64V |
| $0.50V_{peak}$ (−3.5dB) | $1.17V_{peak}$ | 1.17V | 0.58V |
| $0.32V_{peak}$ (−7.5dB) | $0.74V_{peak}$ | 0.74V | 0.37V |
| $0.09V_{peak}$ (−18.0dB) | $0.22V_{peak}$ | 0.22V | 0.11V |
| $0V_{peak}$ | $0V_{peak}$ | 0.22V | 0.11V |

Note: $V_{ath-} = -V_{ath+}$, VO− = −VO+

The output of auto-threshold comparators 32 and 34 is provided to an auto-threshold controller. More specifically, the output of auto-threshold comparator 34 is provided through XOR gate 44 and pipelined through components 46 and 48 (see FIG. 7A-2), its destination being auto-threshold controller ROM 50 (see FIG. 7A-3). The coding program "ATHCTL.src" for auto-threshold controller ROM 50 is provided as Appendix A at the end of this specification.

The signal at pin A3 of ROM 50 is named "TOPP", and, if high, shows the 0+ pulse from the equalizer is either higher than $V_{ath+}$ or the 0− pulse is lower than $V_{ath-}$ (0+ and 0− pulses are exclusive). The TOPP signal is used to generate the error feedback control for the loop. Under normal operation, the control loop will "track out" the voltage differences causing TOPP to bounce between 0 V and 5 V.

There are three qualifiers connected to auto-threshold controller ROM 50. The first qualifier is provided by center estimating ROM 52 (see FIG. 7A-7) and is the sliced output from the 0+ and 0− filters. This signal, named "TOPPM", if high, indicates that the TOPP output is due to a "healthy" pulse, i.e., one not caused by noise. The "TOPPM" signal also indicates when the input signal has no modulation, i.e., binary 1's imbedded in the input stream. In this case, $V_{ath+}$, as well as $V_{ath-}$, retain the previous value during the binary 1's period, resulting is less ripple in the control voltage.

The second qualifier input to ROM 50 is provided by the adaptive equalizer and is identified as "AEQWDW". This qualifier allows the auto-threshold circuit to operate to the same input signal segments as the adaptive equalizer.

The third input to ROM 50 is from the frame synchronizer/lock detector, to be described below, and is identified as "BSLOTS". This signal enables the auto-threshold circuit from the second "B" bit to the bit after the last "B" bit in the B1 and B2 channels. The function of the BSLOTS input is to prevent the auto-threshold circuit from responding to other bits which may contain distortion due to the bus contention.

The signal "AEQSPD", applied to pin A7 of ROM 50, is derived from the frame synchronizer/lock detector, which is set high after frame-in-lock plus eight additional frames, is used to enable/disable the qualifiers. When AEQSPD is set low, the TOPP output is qualified with TOPPM only, so that $V_{ath+}$ or $V_{ath-}$ ramps up at maximum speed. After signal ASQSPD is set high, TOPP is qualified with TOPPM, AEQWDW and BSLOTS, so that the activities of the auto-threshold circuit are limited to a fraction of a bit period within the B channels for rejecting unwanted input imperfections.

Components 54, 56 and 58 (see FIG. 7A-3) form an error integrator for the control loop. The error integrator, up/down controlled by the TOPP signal, is enabled during the period defined by the qualifiers. During the window openings, the integrator counters either count up if the input signal is less than $V_{ath+}$ or count down if the input signal is more than $V_{ath+}$. The opposite is true for $V_{ath-}$.

The signal TOPP, which is applied at the pin D3 of ROM 50 and derived from the center estimating ROM 52, is the sliced 0+ filter output. This signal is similar to TOPPM except that there is no output for the 0− input pulses. During the rising edge of the TOPP signal, the integrator's output is transferred to a Sigma/delta modulator, described below.

The Sigma/delta modulator, consisting of components 60, 62 and 64 (see FIG. 7A-4), converts the binary output from the integrators 54, 56, 58 to a 1 bit pulse density modulated PDM signal having a 7.68 MHz sampling frequency. The modulator is functionally equivalent to a conventional 6 bit digital-to-analog converter (DAC). The output of the modulator is available at the "carry" pin, i.e. pin C4, of adder circuit 60. The output is then pipelined through component 48 and converted into a DC control voltage after the RC network consisting of 6.8K resistor 47 and 6800 pF capacitor 49, connected at pin 1Q of component 48. The RC time constant is set at 20 microseconds, which is about 4 bit periods.

Signal "BIO", which is derived from "info decoders", to be described in greater detail below, goes low when the input equals INFO 0. If INFO 0 is detected, then $V_{ath+}$ (the same for $V_{ath-}$, but opposite direction) is ramped down towards the minimum voltage level, i.e. the highest sensitivity.

Figures 6, 7A:
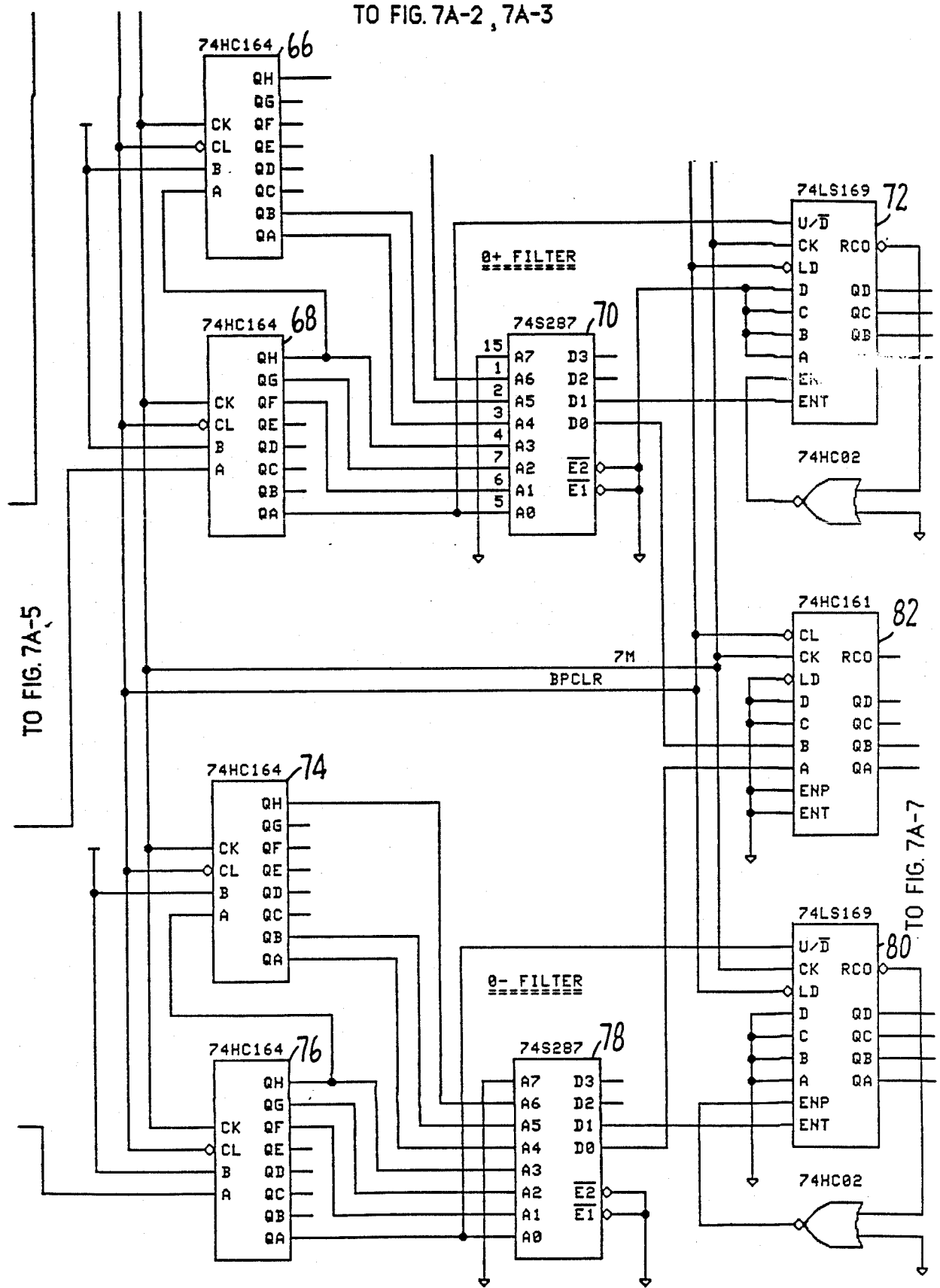
Figures 7, 7A:
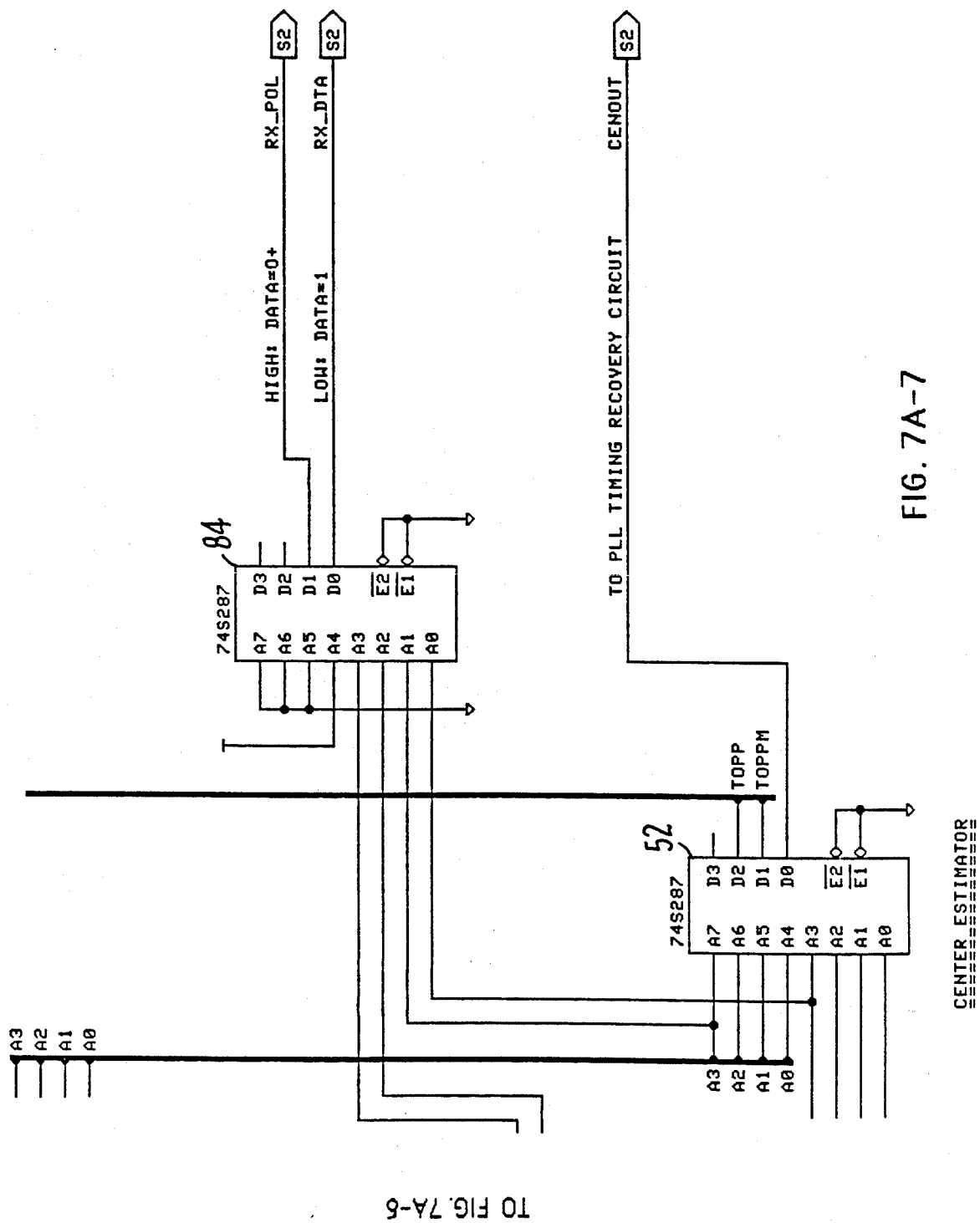

As shown in FIG. 7A-6, the 0+ filter block, consisting of components 66, 68, 70 and 72, and the 0− filter block, consisting of components 74, 76, 78 and 80, are identical. Each filter block consists of two 1-bit wide moving average filters (5 and 15 sampling points), so there are four filters. The filter algorithm sums the numbers of 1's and 0's within the specified window period. If the number of 1's is greater than the number of 0's, then the filter outputs a "1". If the opposite is true, then the filter outputs a "0". Details of the coding algorithm "FTF" are provided in Appendix B at the end of this specification. The implementation of the 15-point filters is slightly different from the 5-point filters, in that the 15-point filters utilize counters instead of direct decoding for cost purposes.

The 5-point filters are utilized for signal detection, i.e., demodulation, purposes. The 0+ filter output is available at pin D0 of component 70, while the 0− output is available at pin D0 of component 78. These two outputs, after being pipelined through components 82, are provided to PROM 84 (see FIG. 7A-7). PROM 84 also receives inputs from the 15-point outputs of filters 72 and 80. The select pin, i.e., pin A4 of PROM 84, selects either the 5-point pair or the 15-point pair to the outputs of PROM 84. In this embodiment, the select input is connected to $V_{CC}$ such that the 5-point filter outputs are always selected. The "RX-POL" output from PROM 84 is identical to the 5-point filter plus filter output: if high, input=0+; if low, input=0−. The "RX-DATA" output is the logical "OR" of the 5-point 0+ and 0-filter outputs: if high, input equals 0+ or 0−; if low, input equal binary 1. The coding program "FA-SEL" for the PROM 84 are provided in Appendix C at the end of this specification.

The 15-point filters serve as the front-end circuitry for the center estimator described below. The TOPP and TOPPM signals connected to the auto-thresholder section described above are derived from the 0+ and the 0— filters; if the number of 1's is >12 within a 15-point window, then the output is set to 1.

As described above, a front-end set of comparators slice the signal at thresholds determined by a peak detector circuit, typically at one-half of the received signal peak. The system is sampled at a rate $f_s$, typically many times the line-rate $f_b$. Asynchronous polar pulses P and N are fed with proper phase to the filter circuits using shift registers 66, 68 and 74, 76, respectively. Integration is performed by up-down counters 72 and 80 which are connected in a top/bottom self-stop mode. Circuits 70 and 78 produce integrator control signals based in pulse presence for a time span given by the register length. Center estimator ROM 52 contains discrimination logic plus detector circuitry. As stated above, state transition is provided by the FASEL program listing provided in Appendix C.

The center estimator described above is described in greater detail in copending U.S. patent application Ser. No. 108,717, filed by Wong Hee and Jesus Guinea of even date and commonly assigned herewith.

Figures 1, 7B:
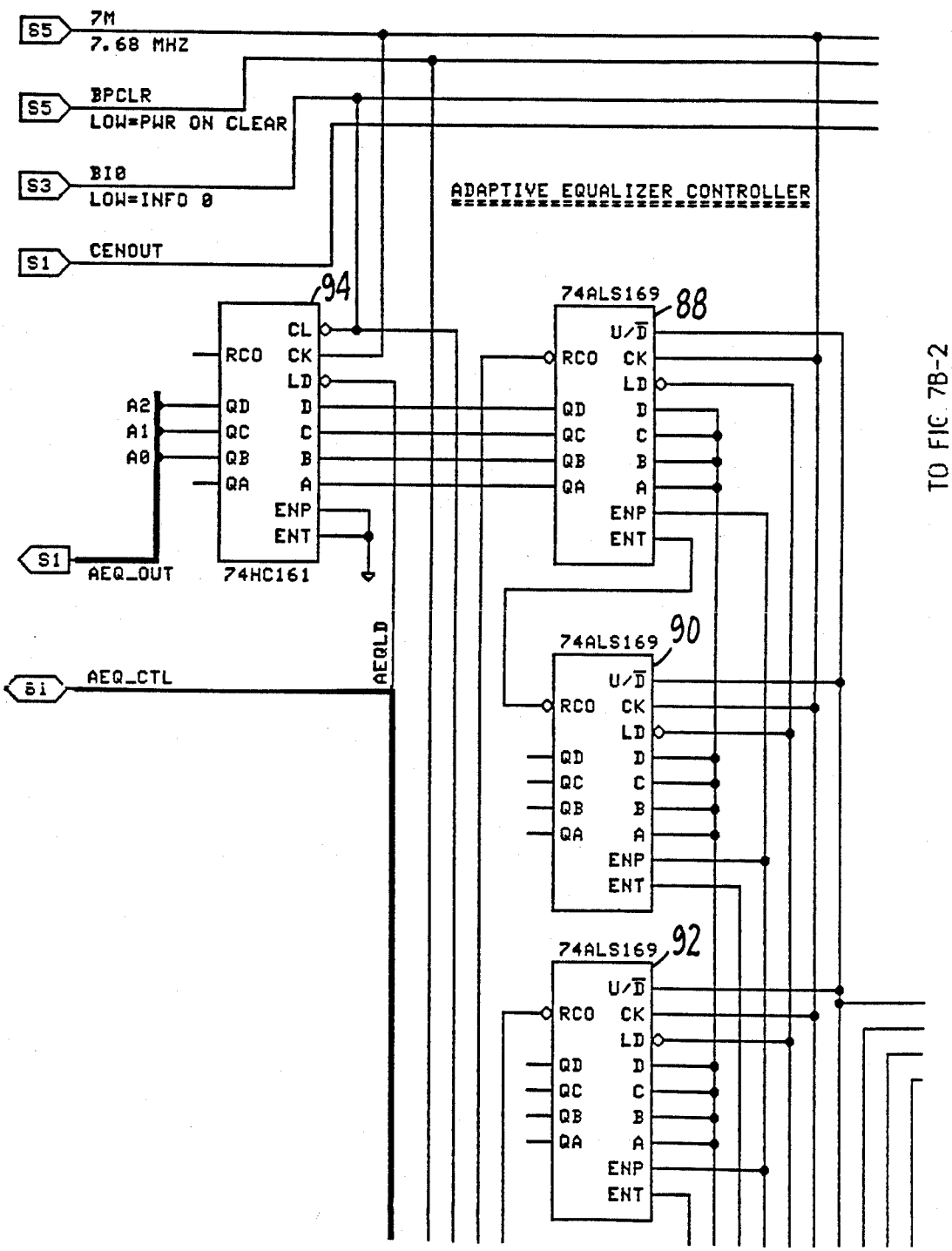
Figures 2, 7B:
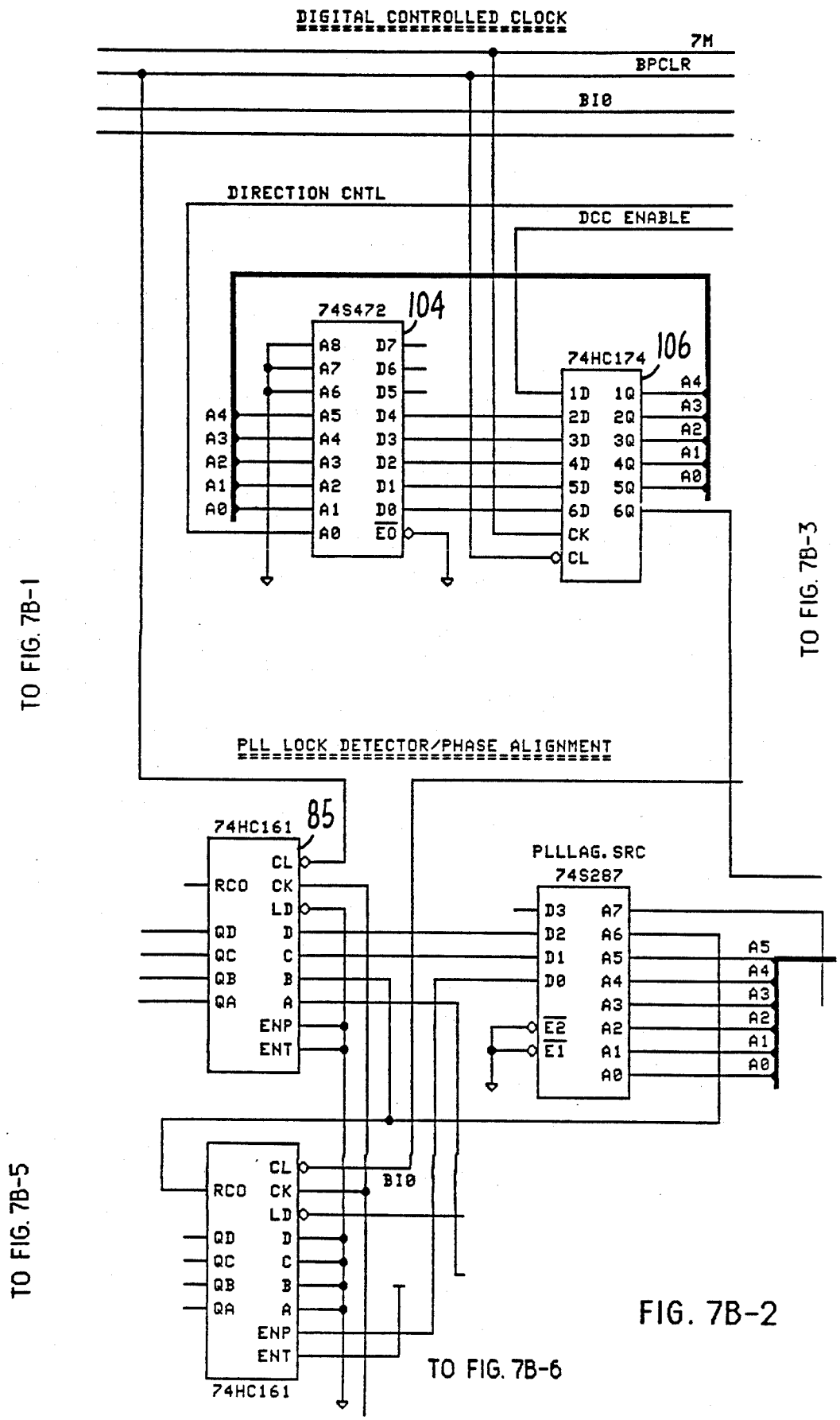
Figures 3, 7B:
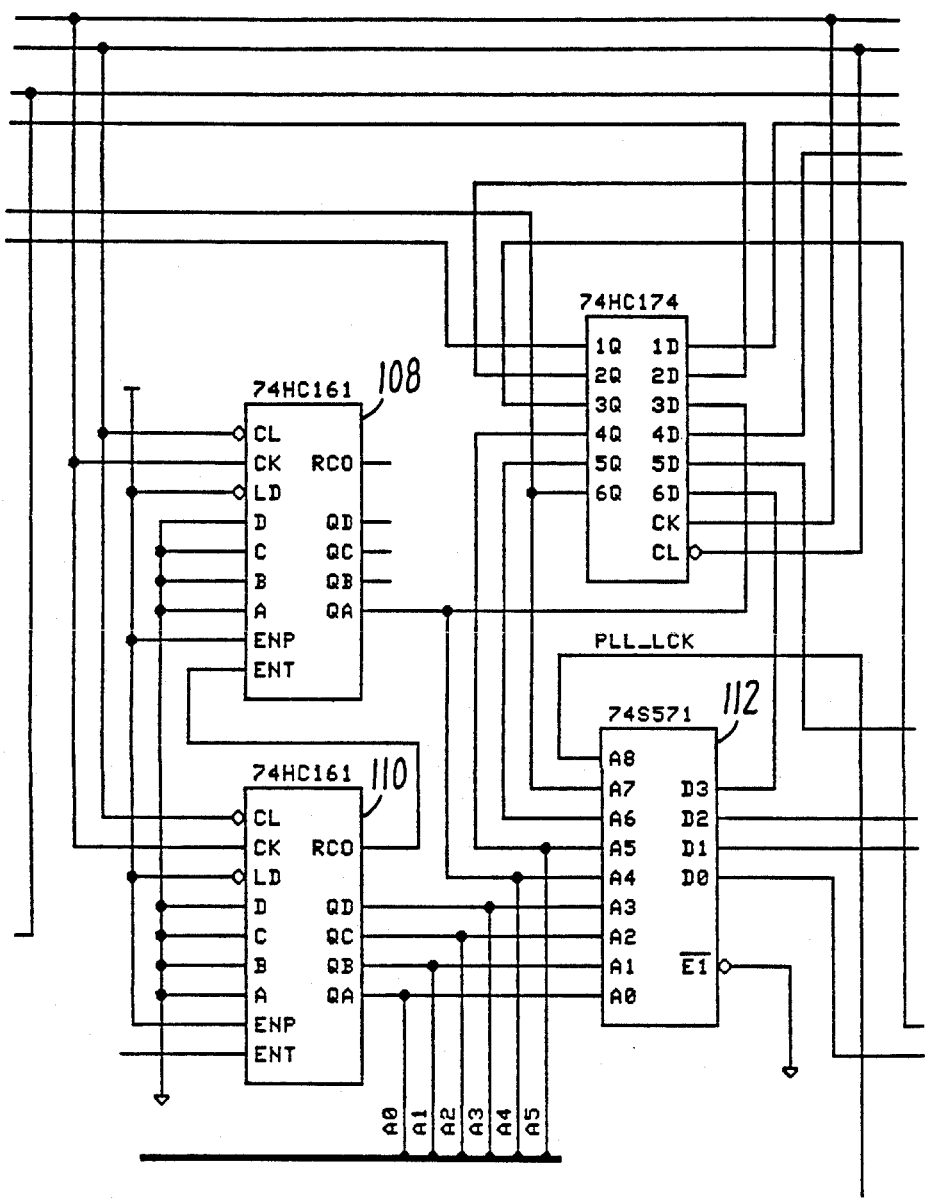
Figures 4, 7B:
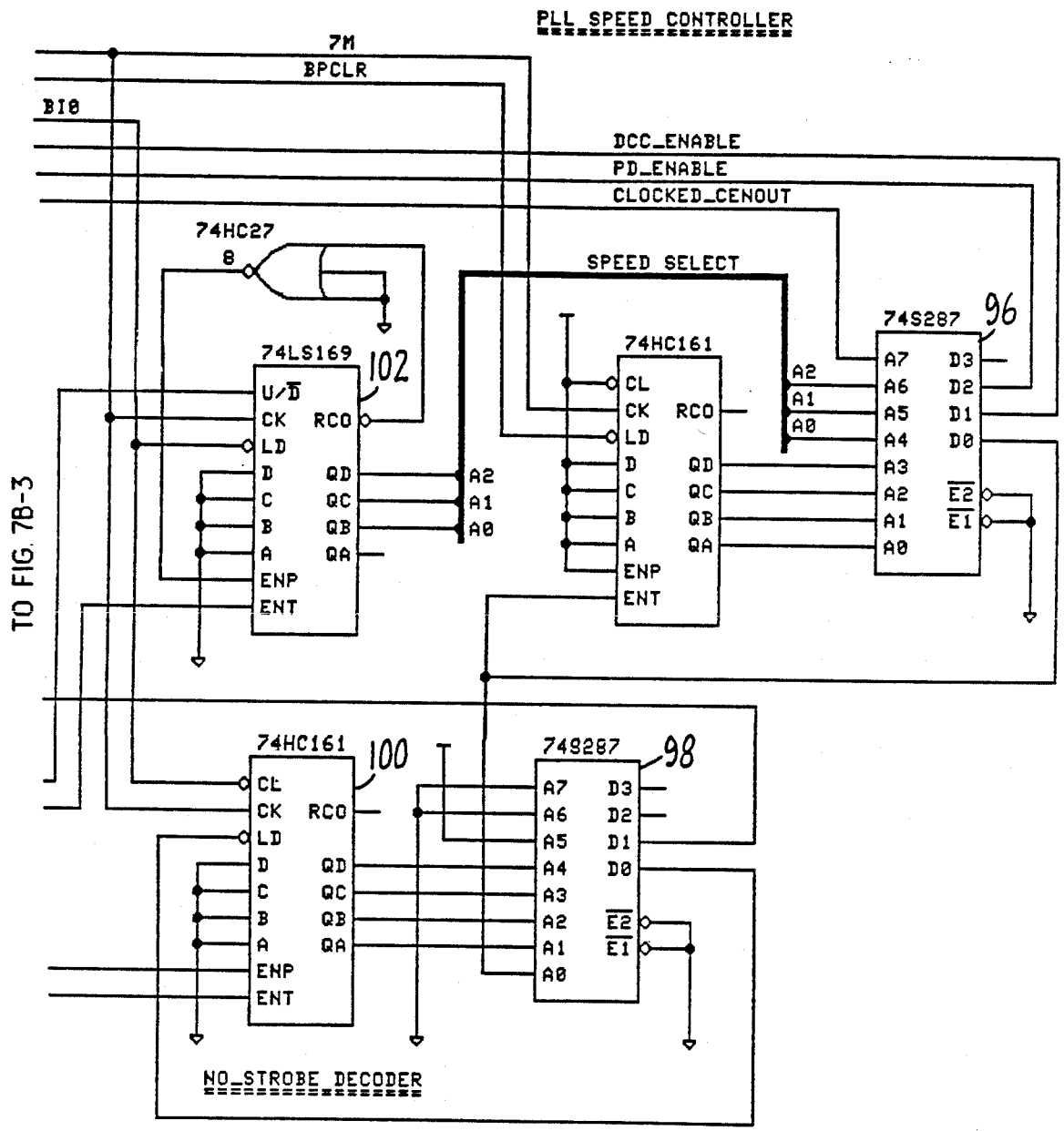
Figures 5, 7B:
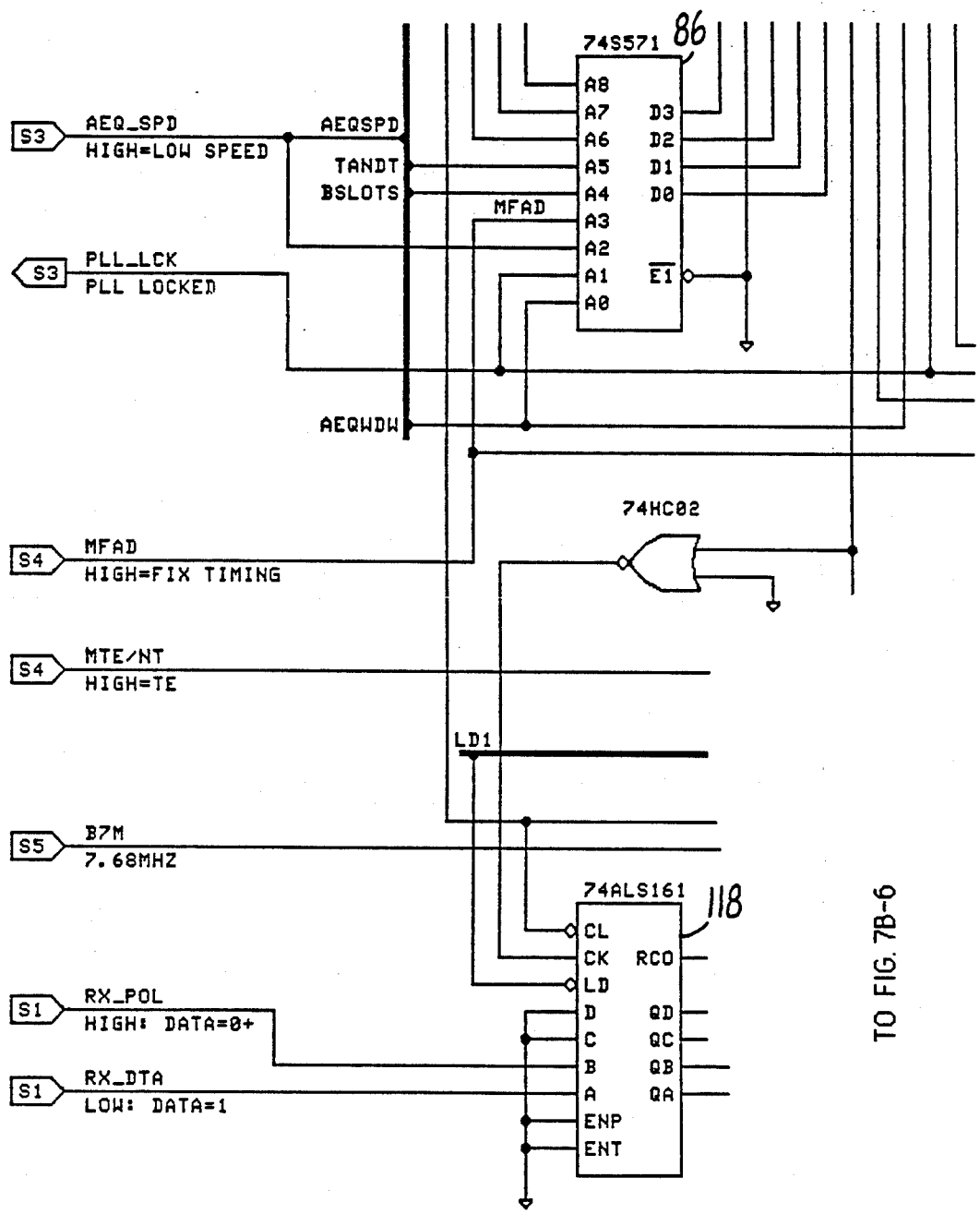
Figures 6, 7B:
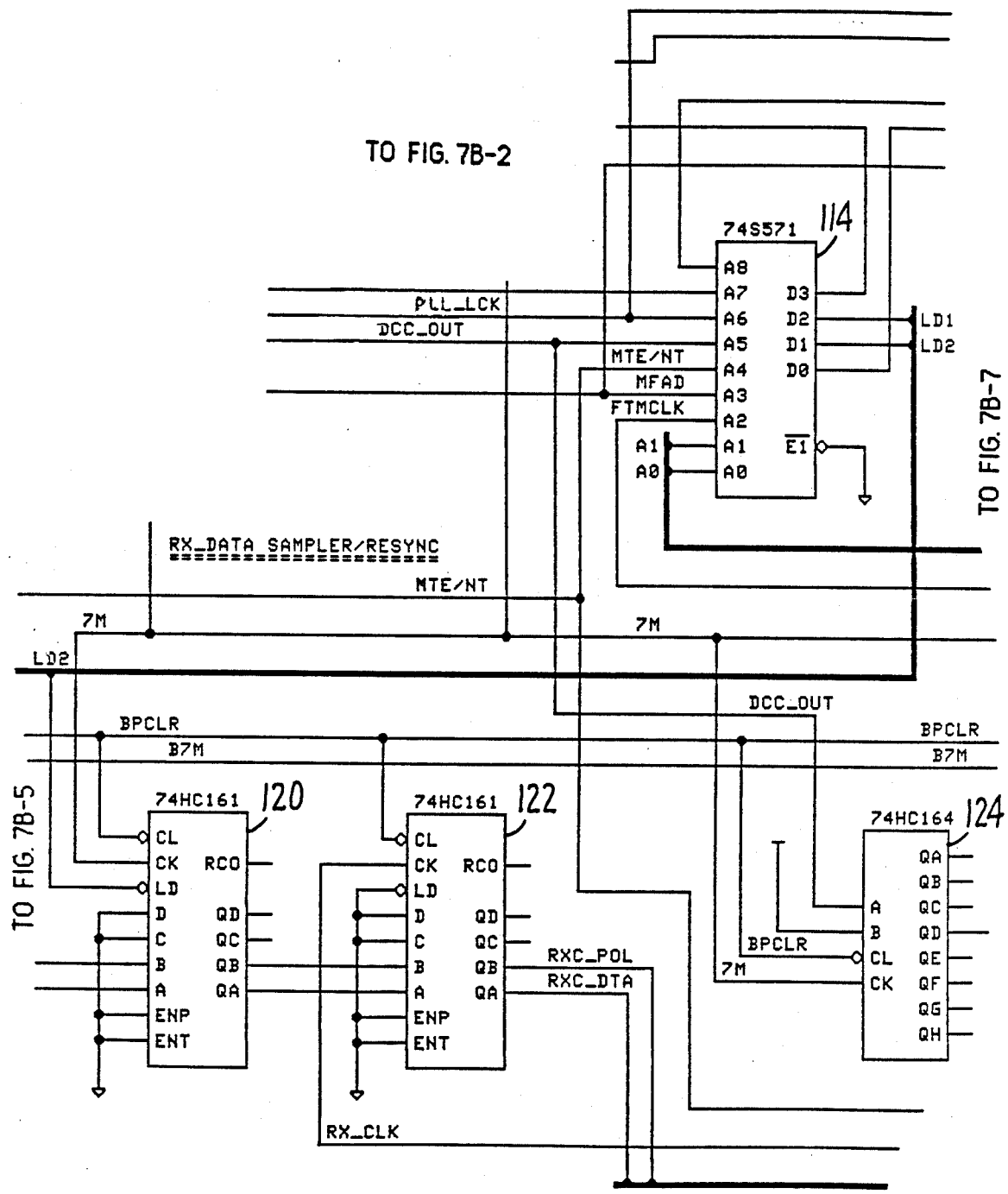
Figures 7, 7B:
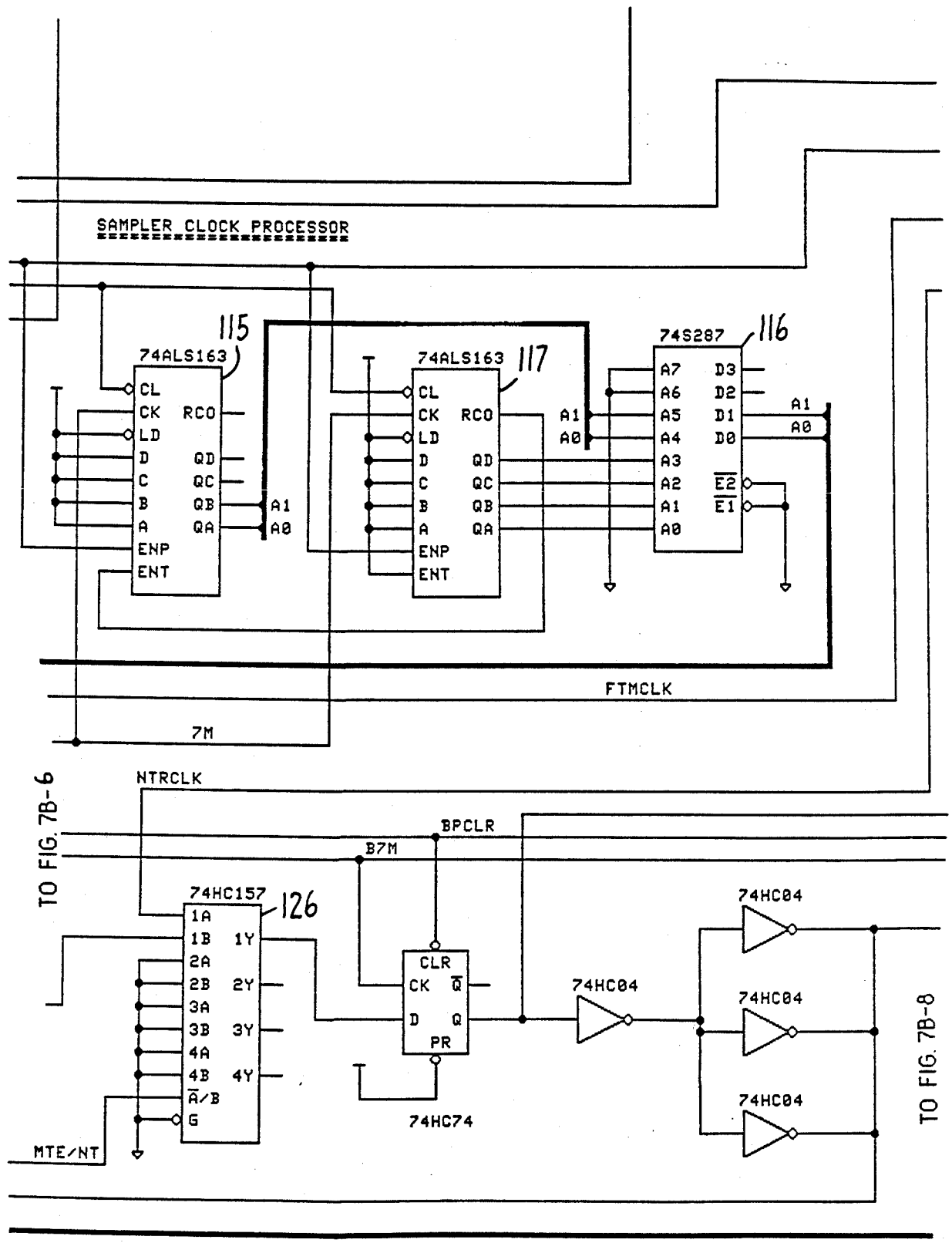
Figures 7, 7B, 8:
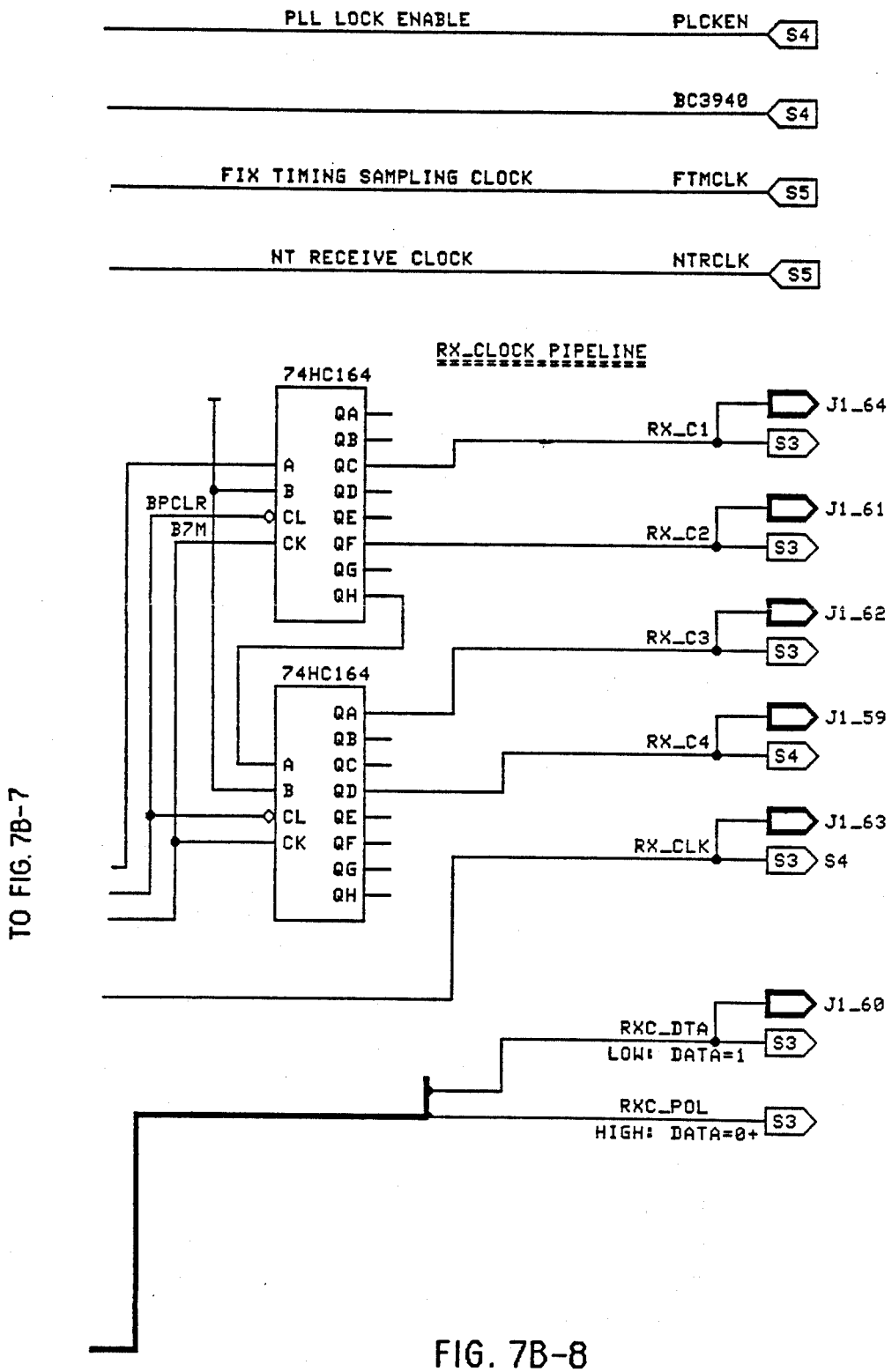

Referring now to FIG. 7B-5, control ROM 86 is in lock with a PLL timing recovery circuit to be described below. The program coding "AEQCTL.src" for equalizer controller ROM 86 is provided in Appendix D at the end of this specification. An auto-threshold circuit should be settled-out, e.g., the slicing level of component 34 tracks the peaks of the equalizer output. The "DCC-OUT" signal controls the up/down of the error integrator counters 88, 90, 92 (see FIG. 7B-1). The DCC-OU digital-controlled-clock output also equals the timing-recovery clock from the PLL or PLL clock available at pin QD of component 85 (see FIG. 7B-2); low to high transitions are normally aligned to the center of the TOPP signal if the input needs no equalization, e.g., short connection between TE and NT.

The counters 88, 90, 92 are enabled when the "TANDT" signal is high. This signal is available by ANDing the TOPP and TOPPM signals. If the auto-threshold circuit is not settled, and TANDT signal will have either no output or a full output such that there will be no up or down counts passed on to the counters. In the case of no output, the counters are not enabled. In the case of a full output, the up counts will be equal to the down counts since the DCC-OUT signal is centered about the enable window TANDT. In other words, the adaptive equalizer is automatically disabled when the threshold is not settled.

If the RX input is well equalized, the TOPP signal will be centering at the PLL clock rising edges so that up counts equal down counts and no step changes are passed onto component 19 (FIG. 7A-1).

Counters 88, 90 and 92 form a dual speed (8 or 12-bit) error integrator. The integrator has a high tracking-rate when the circuit starts receiving signal, after the reset due to the INFO 0 signal, and a low tracking-rate after "frame in-lock" plus 8 good frames. The selection is controlled by the AEQSPD" signal derived from the frame synchronizer/lock detector. During the low-speed mode, the AEQWDW and BSLOTS signals are enabled. The AEQWDE signal is available at pin A0 of component 86 (see FIG. 7B-5) and is derived from the PLL clock, with a width of window equal to 25% of a bit period, with centering at PLL clock rising-edges. The BSLOTS signal is avialable at pin A4 of component 86.

If the RX input equals INFO 0, i.e., the BIO signal is low, then the equalizer is reset to flat gain, i.e., no equalization. If in NT fixed timing mode, then the equalizer is disabled, i.e., there is no equalization. Component 94 is a step-update D-latch which is clocked after low-to-high transitions of the TOPP signal so that distortion at the equalizer output due to injection charge of component 19 during step changes is forced to the center of 0+ it cells. Otherwise, detection errors are caused.

The quotient algorithm digital phase-locked-loop portion of the circuit receives the timing signal strobe and the BIO signal as inputs. A binary phase detector with hold-go gating is implemented by using a function of the strobe (F-strobe) to latch a counter that is cycling through a baud. F-strobe is processed by control machine 96 (see FIG. 7B-4) which avoids correction for a no-strobe condition. Compnents 98 and 100 are no-strobe time-out circuits.

Speed value is calculated on a saturating (bi-direction) speed counter 102 and altered only when triggered by a strobe on a baud period enabled by the BIO signal. Speed is input to ROM 96 to generate the hold/go signal on a fast or slow basis to feed the digital-controlled-clock. The speed value is fed into the F-strobe monitor which creates a gating signal to the digital-controlled-clock allowing incremental phase to be executed for "x" number of times dependent on the speed.

Refering to FIG. 7B-2, digital-controlled-clock 104 and latch 106 obtain the quotient digital-controlled-clock and output $Q_f$ which gates the SCLK signal to result in RCLOCK. The RCLOCK signal is divided by divider 108, 110 to quantify the phase position on a baud interval (baud rate recovered clock) for the binary phase-detector using the most significant bits and the range-phase- detector circuit using a magnitude-of-phase-error comparator. As stated above, the software generation state for the sequential machines in ROM 96 ("PLLCTL.src"), 112 ("BRPD.src"), ROM 98 ("NOSTB.src") and ROM 104 ("DCC.src") are shown in appendices E, F, G and H, respectively, at the end of this specification.

The No-strobe decoder 98, 100 used in this portion of the circuit increases the phase-locked-loop gain when seven consecutive missing synchronizing-strobes to the PLL are detected. Otherwise, the PLL would not be able to track an input with excess frequency-offset. The extreme case would be info 3 or 4 without marks at the B, D and SF channels.

The quotient algorithm digital phase-locked-loop described above is described in greater detail in copending U.S. patent application Ser. No. 108,371, filed by Wong Hee and Jesus Guinea of even date and commonly assigned herewith.

A received-data sampler and clocks switching logic utilizes ROMs 114 and 116, the coding algorithms for which "SCLKP.src" and "SCPDEC.src" are provided in Appendices I and J, respectively, at the end of this specification.

In the TE mode, the first sampler clock, i.e., pins LD and CK of component 118 (see FIG. 7B-5), experience a 0.5 pipeline delay after the PLL clock. Thus, the "Signal Eye" at the filter output is sampled at maximum "eye" opening. The second-sampler clock. i.e., pins LD and CK of component 120 (see FIG. 7B-6), experience 1 pipeline delay after the PLL clock, allowing data to be passed onto the third sampler. The third sampler clock, i.e., pin CK of component 122, experiences a 4.5 pipeline delay after the PLL clock. Since this clock is also used for the TX bit clock, the delay section, i.e., the tap point at component 124, will effect the alignment of the TX zero-crossings to the RX zero-crossings. An offset of 3-4%, TX zero-crossings lagging the RX crossings, is recommended.

In the NT adaptive timing mode, the first sampler clock, i.e., pins LD and CK of component 118, experience a 0.5 pipeline delay after the PLL clock. Thus, the "Signal Eye" at the filter output is sampled at maximum opening. The second sampler clock, i.e., pins LD and CK of component 120, as derived from a free-running counter with frequency synchronized to the TX bit clock. If the PLL is out-of-lock, the counter is phase synchronized to the PLL clock with rising edges equal 20 pipeline delay (half of a bit period) after rising edges of the PLL clock. If the PLL is in-lock, the synchronizing link to the PLL is defeated and the counter left free-running and the frequency is synchronized to TX bit block. Thus, it samples at maximum opening of the signal I for the first sampler 118. The third sampler is clock 122. Therefore, the received data output has the same timing as the transmitter.

In the NT fixed timing mode, the first sampler clock 118 has a 0.5 pipeline delay after the fixed timing clock, i.e., pin A2 of component 114, i.e., a fixed relationship to the TX bit clock. A second sampler clock 120 experiences a 1 pipeline delay after the fixed timing clock to allow data to pass onto the third sampler. The third sampler clock 122 is connected to the TX bit clock so that the receive data output has the same timing as the transmitter.

Figures 1, 7C:
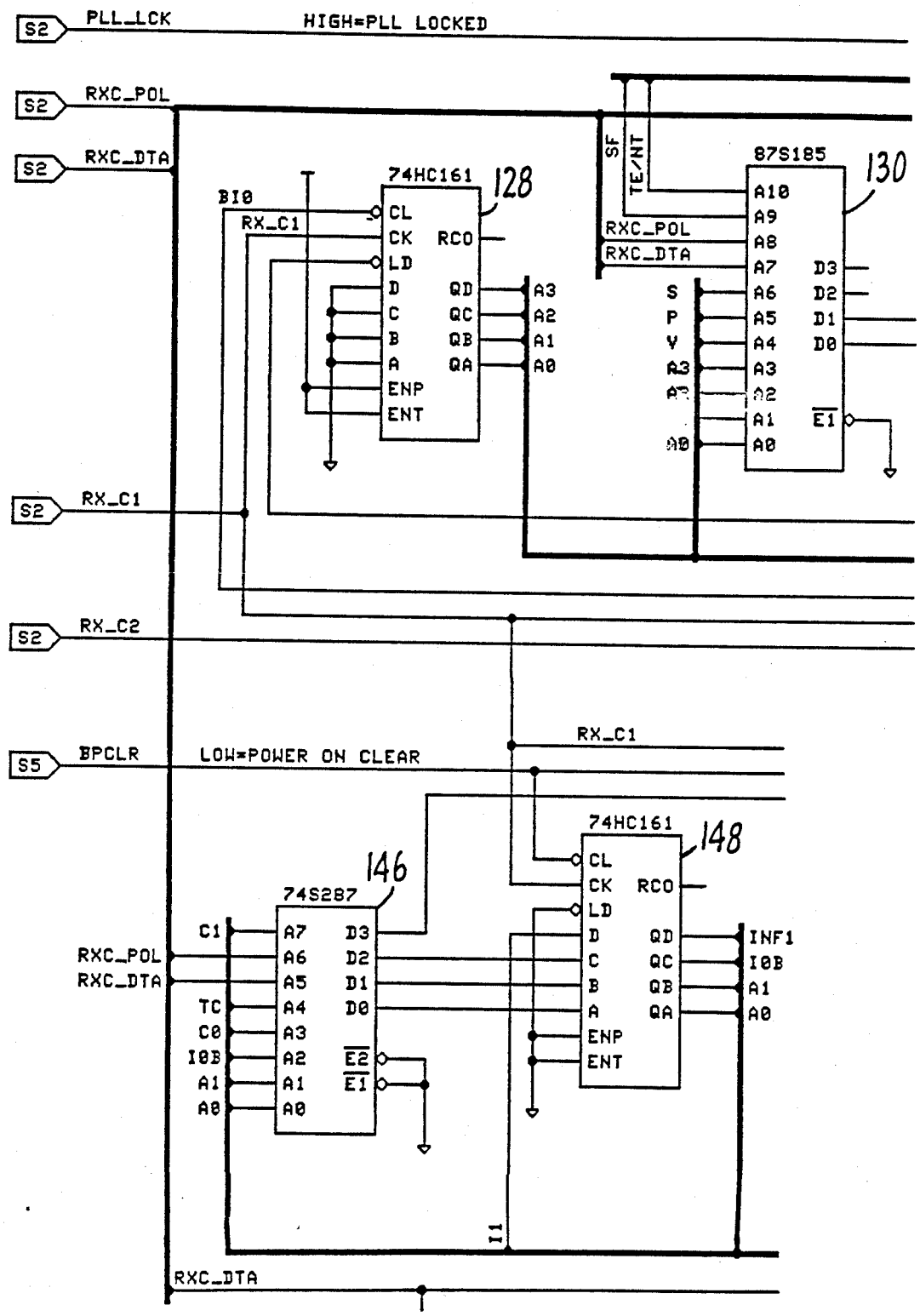
Figures 2, 7C:
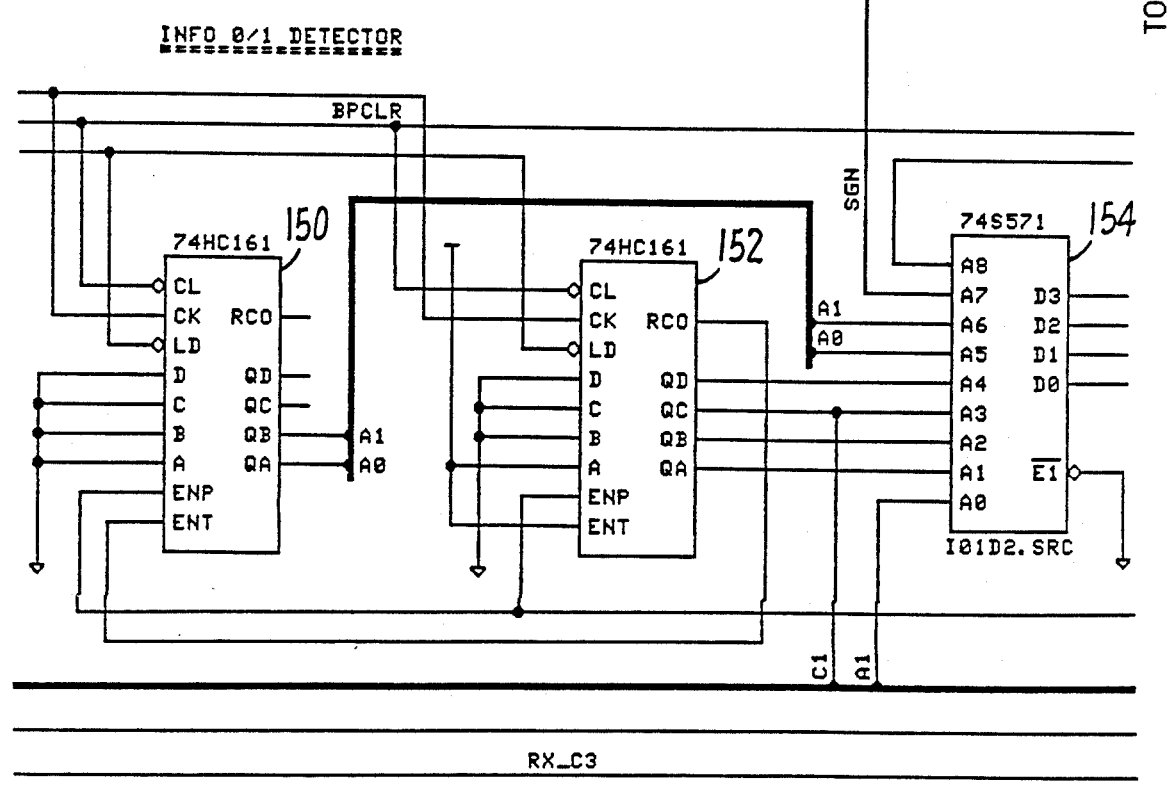
Figures 3, 7C:
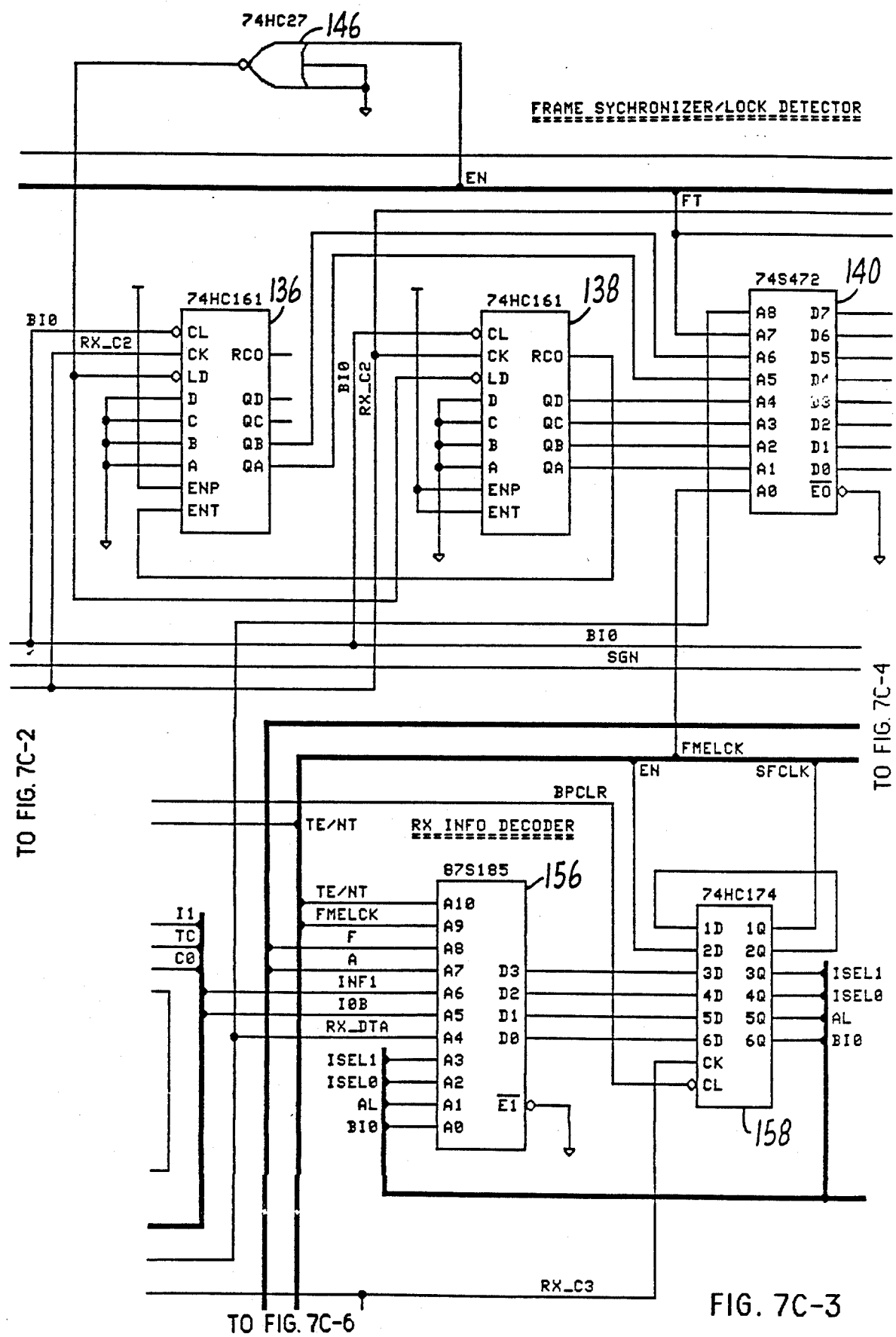
Figures 4, 7C:
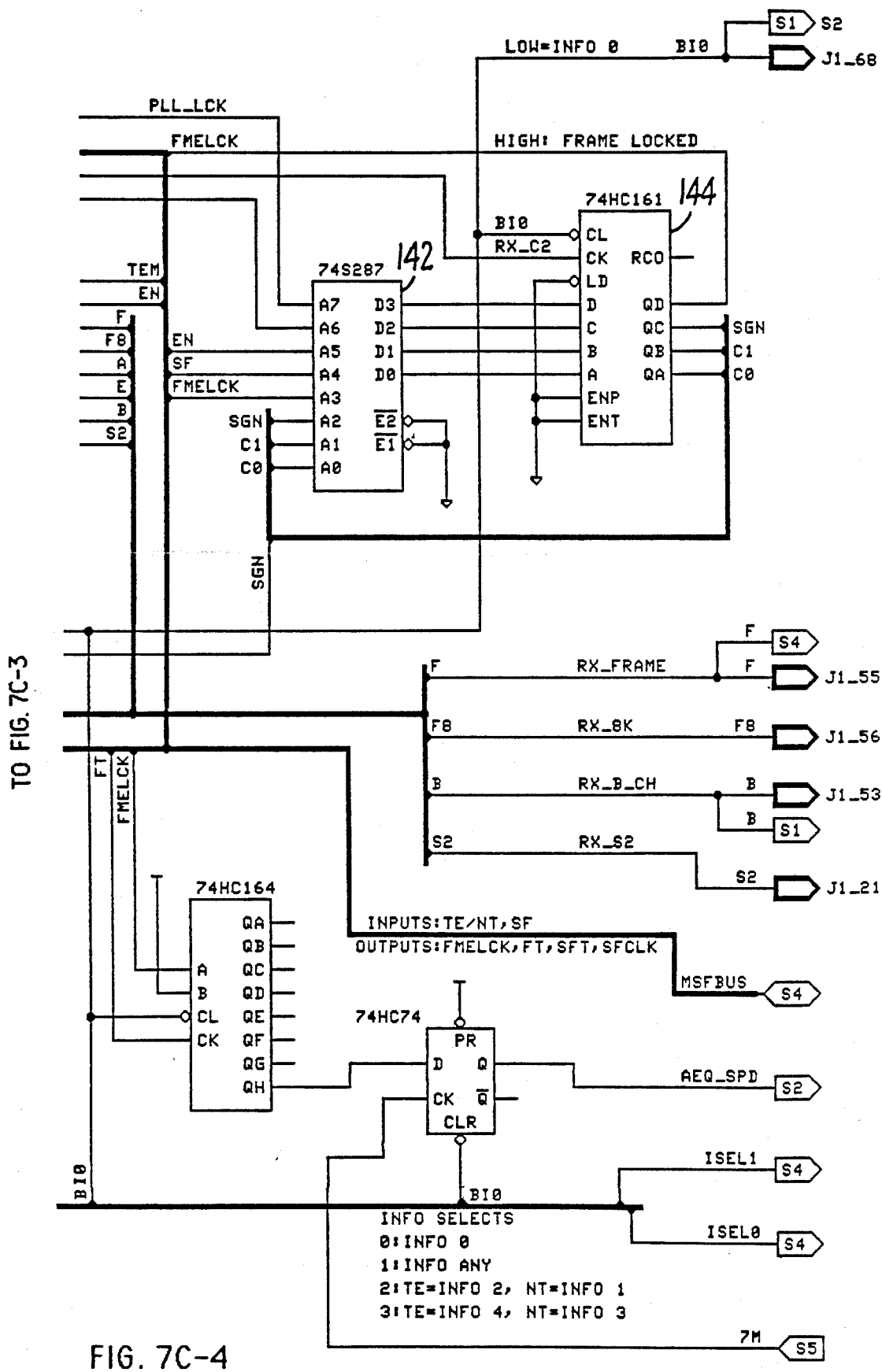
Figures 5, 7C:
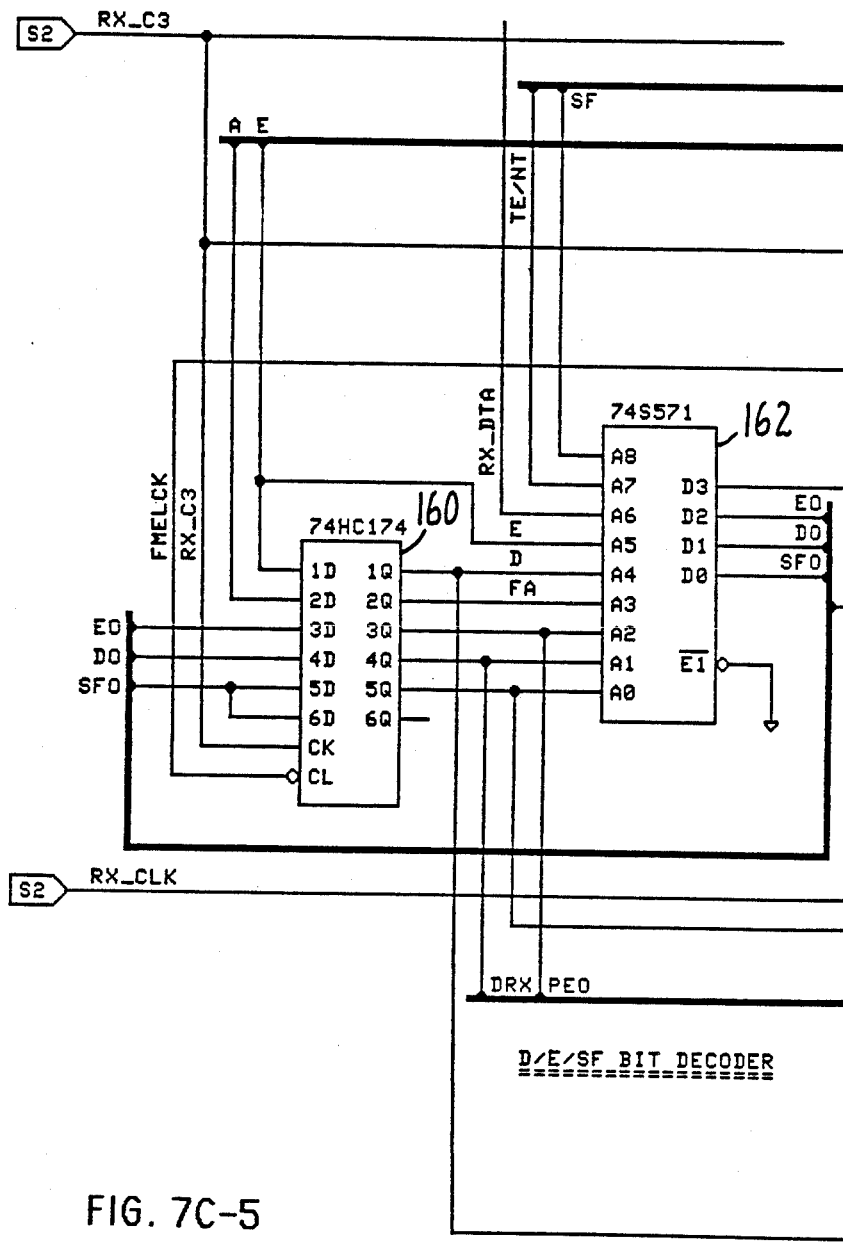
Figures 6, 7C:
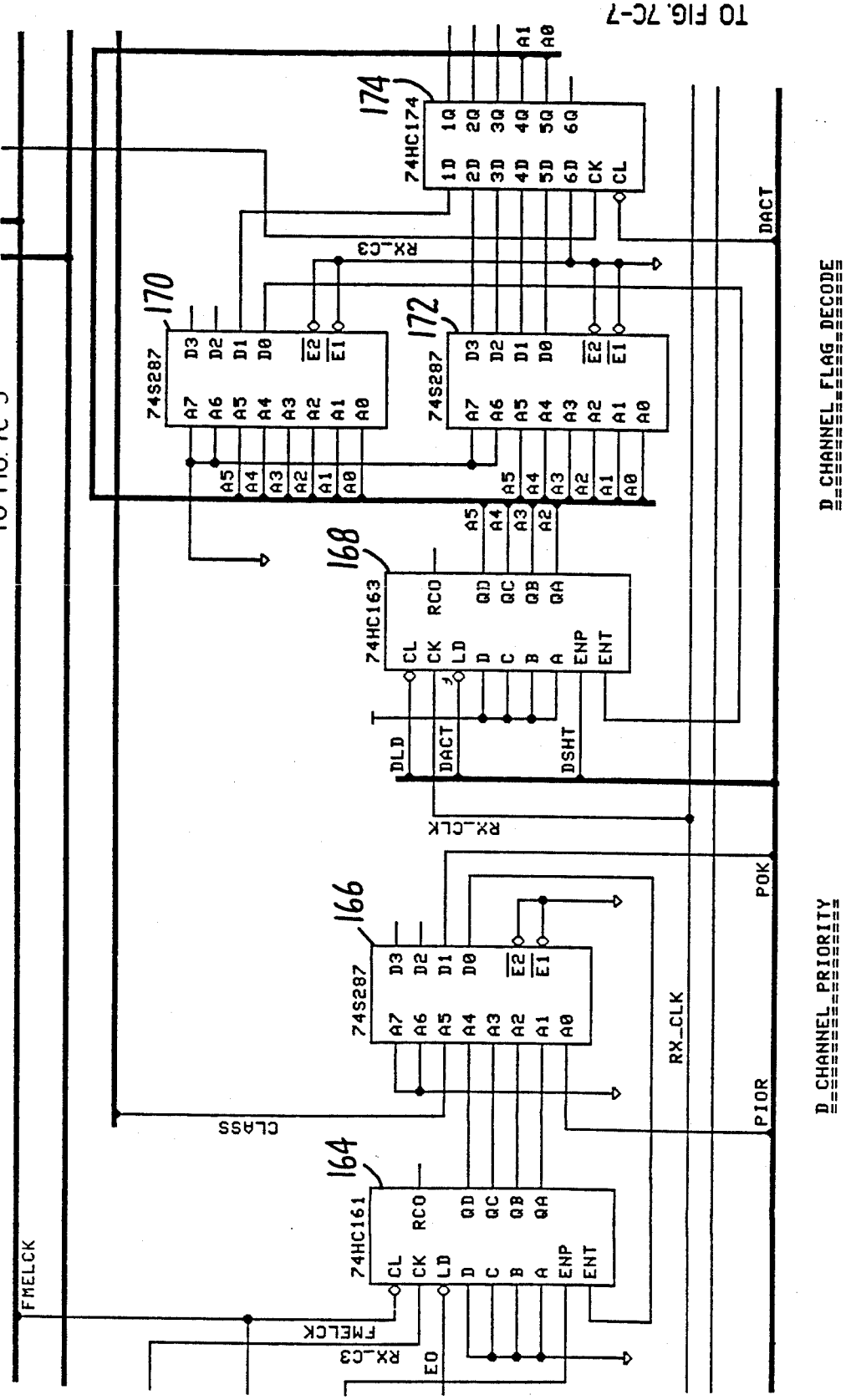
Figures 7, 7C:
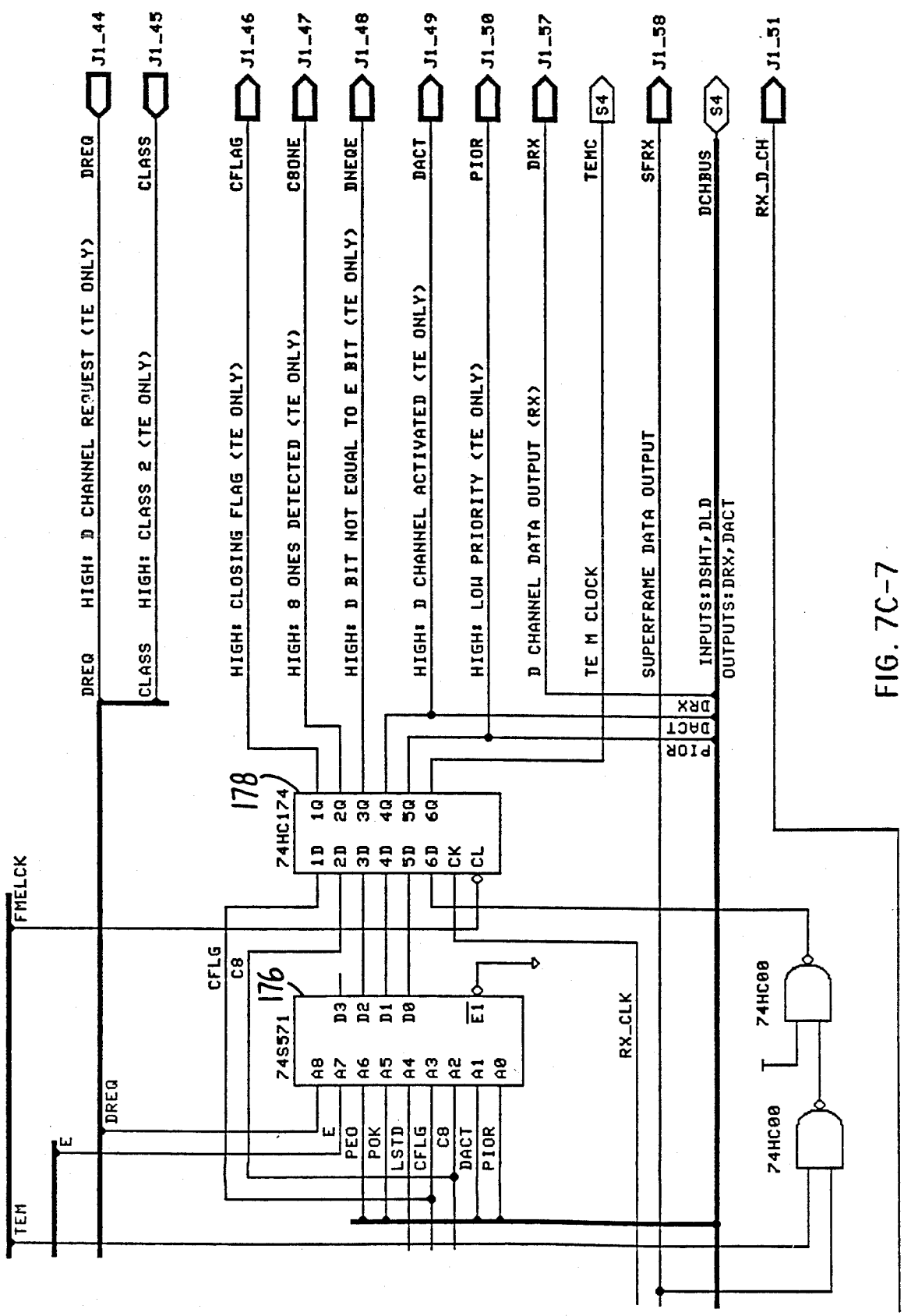

Referring to FIGS. 7C-1 and 7C-2, components 128, 130, 132 and 134 form a frame trigger pulse decoder.

As shown in FIGS. 7C-3 and 7C-4, components 136, 138, 140, 142, 144 and 146 form a frame synchronizer/lock detector. Three consecutive good frames plus the PLL inlock equals a frame in-lock. Three consecutive BAD frames equal a frame out-of-lock. If the input equals INFO 0 (BIO=low, then the frame is out-of-lock). The $R_x$ bit id outputs are as follows:

B1 channel: B (pin D1 of component 140)=high F8 (pin D4 of component 140)=high
B2 channel: B (pin D1 of component 140)=high F8 (pin D4 of component 140)=low
S2 channel: S2 (pin D0 of component 140)=high
D channel: Decoded as described below
SF channel: Decoded as described below
Note: F8 also provides half-frame timing PROM 140 (see FIG. 7C-3) also decodes the polarity of the M bits (super frame) for generating the M clock in the TE mode.

Refering to FIGS. 7C-1, 7C-2 and 7C-3, components 146, 148, 150, 152, 154, 156 and 158 combine to form info decoders. The info recognition criteria are as follows:

INFO 0: The no 0+ or 0− pulses for 64 data bits, BIO (bar info 0) goes low at frame boundaries.
INFO 1: NT mode, 8 consecutive "0011xxxx" frame received, "x" denotes either 0 or 1, the two consecutive 0s must be opposite in polarity and consistent through the 8 frames.
INFO ANY: Circuit detects Info Any after receiving two opposite "0" pulses ("0+, 0−" or "0−, 0+"). If other info types can be unambiguously recognized the detector will flag the actual info types instead. Normally, Info Any indicates the receiving of I2, I3 or I4 when the framing circuit is not in-lock, i.e., loss of framing or before locking.
INFO 3: NT mode, frame in-lock
INFO 2: TE mode, frame in-lock, "A" bit=binary 0 (0+ or 0−)
INFO 4: TE mode, frame in-clock, "A" bit=binary 1

A D-channel access/E-channel logic circuit is formed by components 160, 162, 164, 166, 168, 170, 172, 174, 176 and 178 (see FIGS. 7C-5, 7C-6 and 7C-7). Components 160 and 162 are a D/E/SF transmit-data decoder. Pins D3 and D2 of component 162 provide the E-bit outputs which control "C" counter 164. Pin 3Q of component 160 is a pipelined E-bit output which drives component 176 for transmission E-bit data input to the transmitter in the NT mode. Pin 5Q of component 160 is the super-frame transmit-data output for NT mode only. In the TE mode, this pin decodes the inverted $F_A/N$ bits from the NT output to qualify the generation of the M-clock. Components 164 and 166 form a "C" counter, with pin D1 of component 166 high if the D-channel is available, i.e., "C" count is ≧ the current priority level. Both the class and the priority signals are inputs to this counter. The circuit is disabled if the frame is out-of-lock. Components 168, 170, 172 and 174 combine to form a D-channel flag-decoder. The LSTD signal or last-transmitted D-bit from the local transmitter, on pin 1Q of component 174 feeds component 176 for error flag generation. If this flag is found true, the D-channel access is terminated immediately, i.e., the DACT signal on pin A1 of component 176 goes low. The transmitter sends binary 1s in the D-channel afterward regardless of the state of the transmitter data input. There are no more DSHT (D-channel data shift-/enable) pulses to the outside world for requesting data. Priority remains the original value, i.e., high priority.

The HDLC Closing flag CFLG at pin 2Q of component 174 goes high after the transmission of "01111110 D . . . D 01111110" in the D-channel, where "D . . . D"=any data pattern except HDLC flags. If a continuous seven 1's pattern is embedded in the "D . . . D" sequence, then the flag "01111110" after the seven 1's pattern is considered to be the opening flag again. Without the seven 1's pattern, this sequence would be the closing flag. The next "01111110", i.e. third flag starting from the beginning of the transmitted message, becomes the actual closing flag. It should be noted that the "0" between two flags can be shared by the two flags: i.e. "011111101111110" contains an opening flag and a closing flag. After the closing flag, the D-channel is considered to be deactivated. The circuit functions the same way as the deactivation caused by the D<>E error flag except that the priority is set to low priority.

The "C8" signal at pin 3Q of component 174 goes high if D-channel transmitted data was eight consecutive 1's. After this flag, the D-channel access is deactivated. This is similar to the closing flag case except there are no priority changes.

The D-channel request input DREG at pin A8 of component 176, connected to an external microcontroller, goes high if TE wants to access the D-channel. If pin A5 of component 176 is high, i.e. the D-channel is available, and DREG is high, then DACT is high showing that the D-channel is activated. If any of the error flags (E<>D, CFLG, C8) are detected, then DACT goes low showing that the D-channel is deactivated. Priority output at pin 5Q of component 178 is high (low priority) if deactivation is due to CFLG. If frame is out of lock during activation, then the D-channel access is terminated immediately the same way as caused by other flags. The implementation is achieved by resetting the D-channel circuit, including the C counter, to its power up state. In other words, D-channel access is only possible when the frame synchronizer is in lock.

Figures 1, 7D:
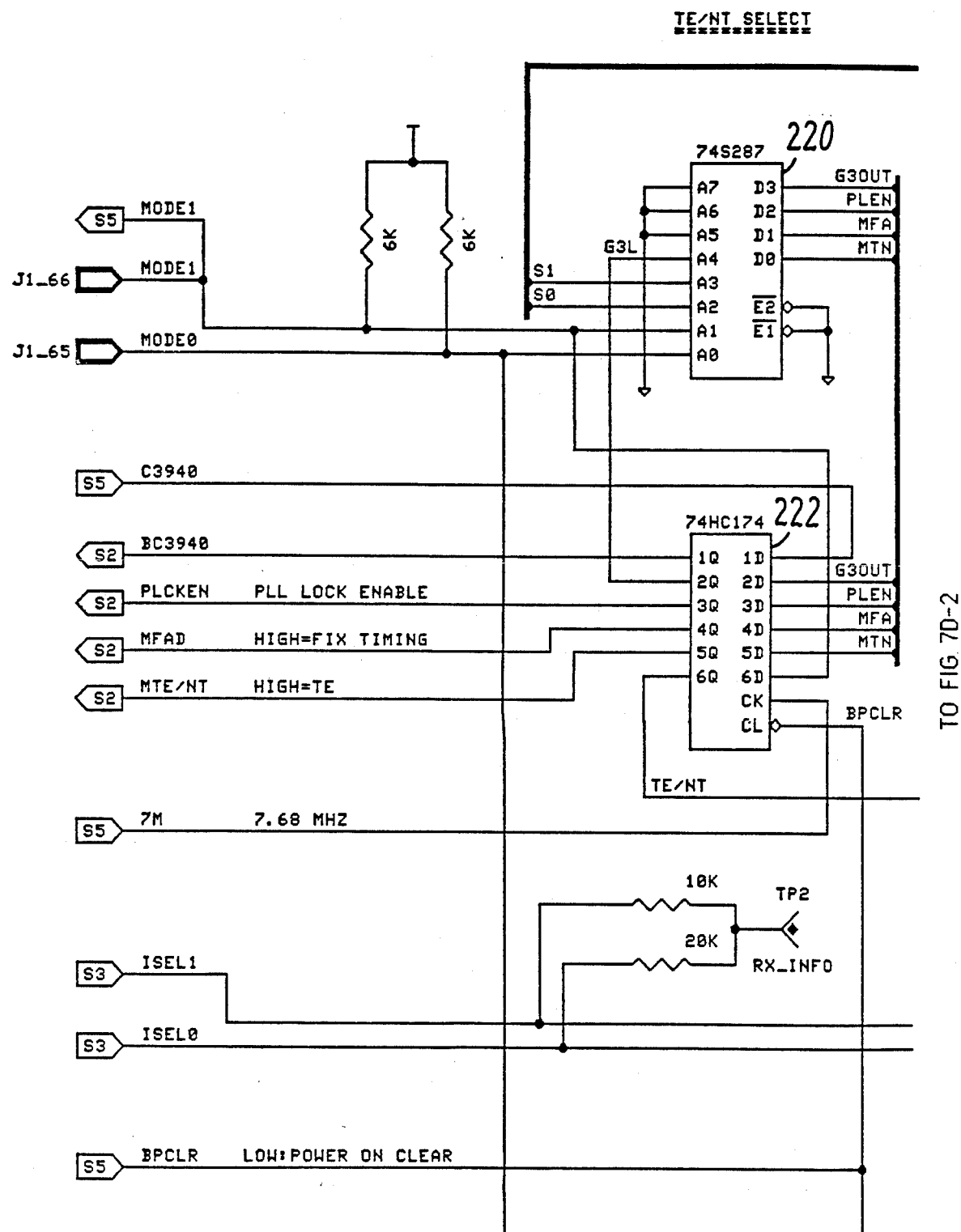
Figures 2, 7D:
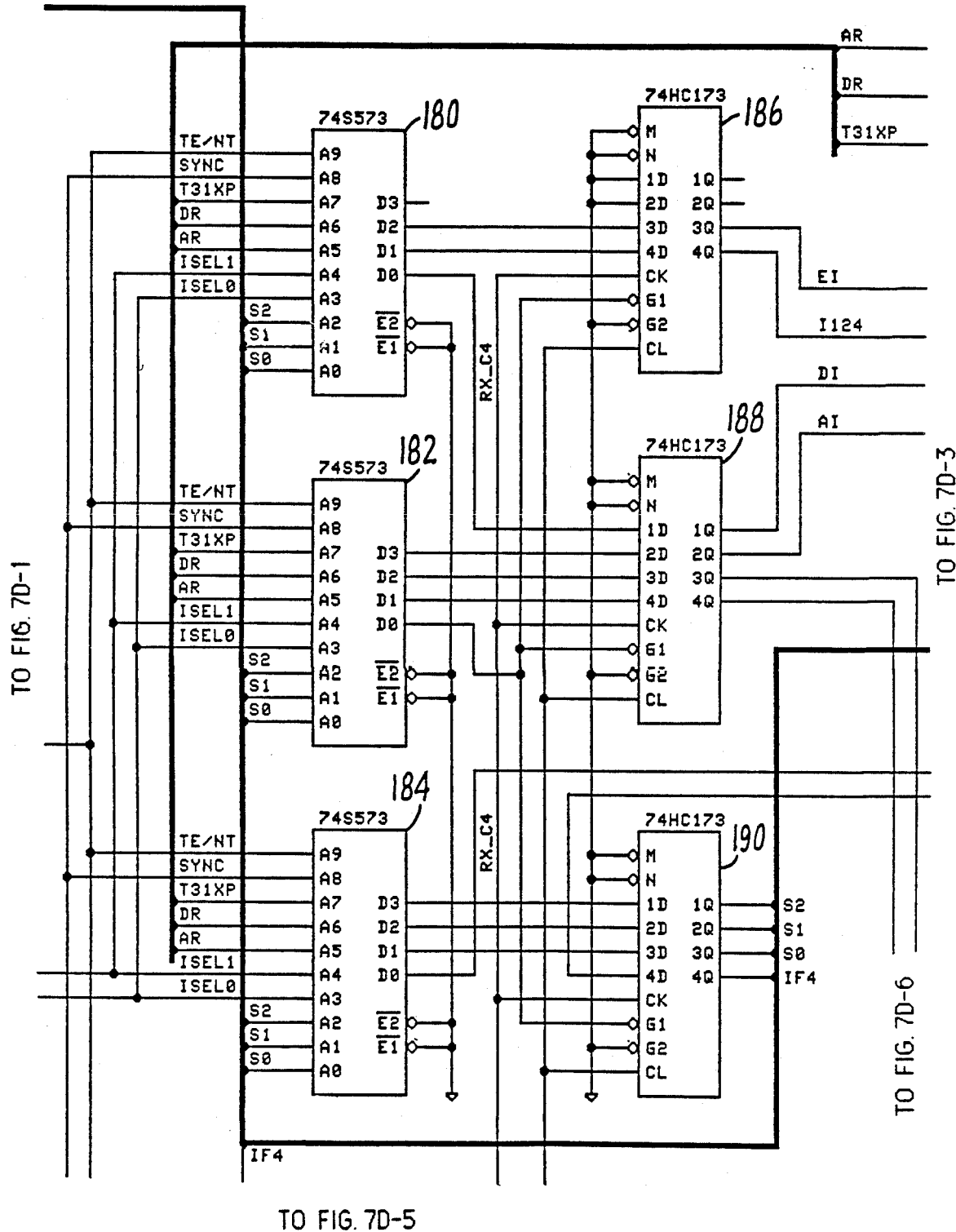
Figure 7D:
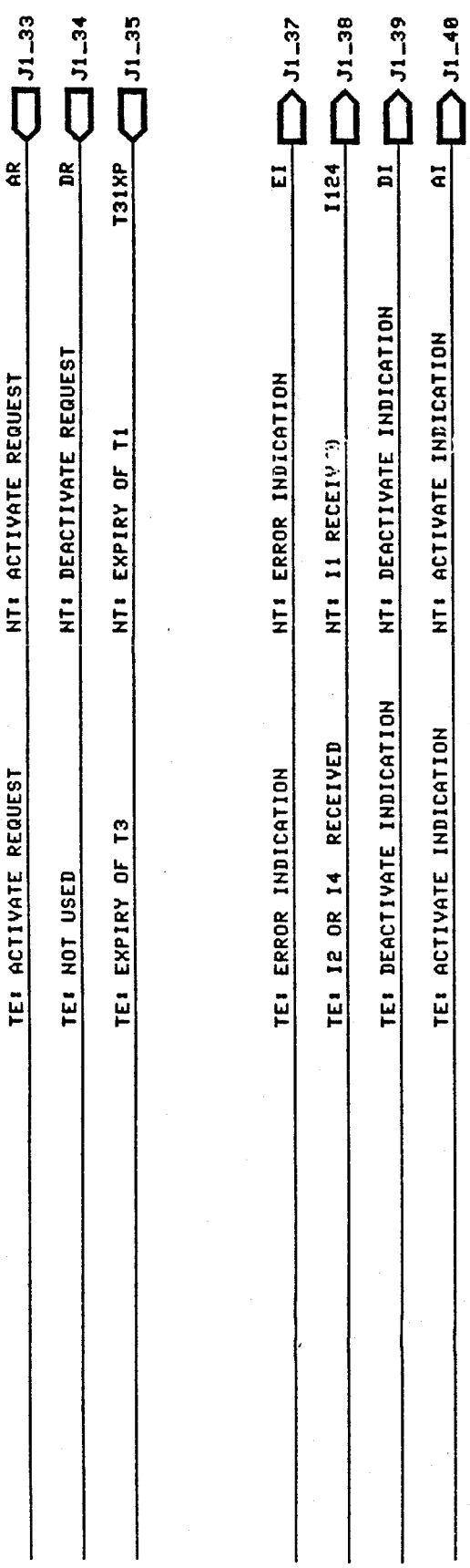
Figure 3:
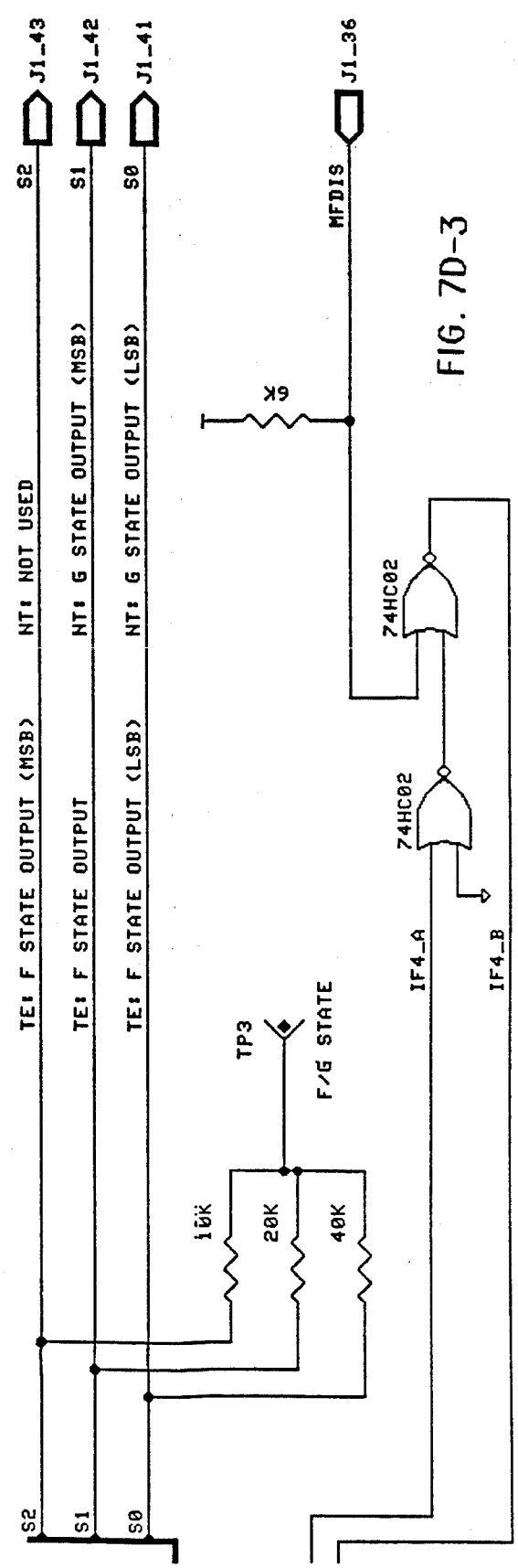
Figures 4, 7D:
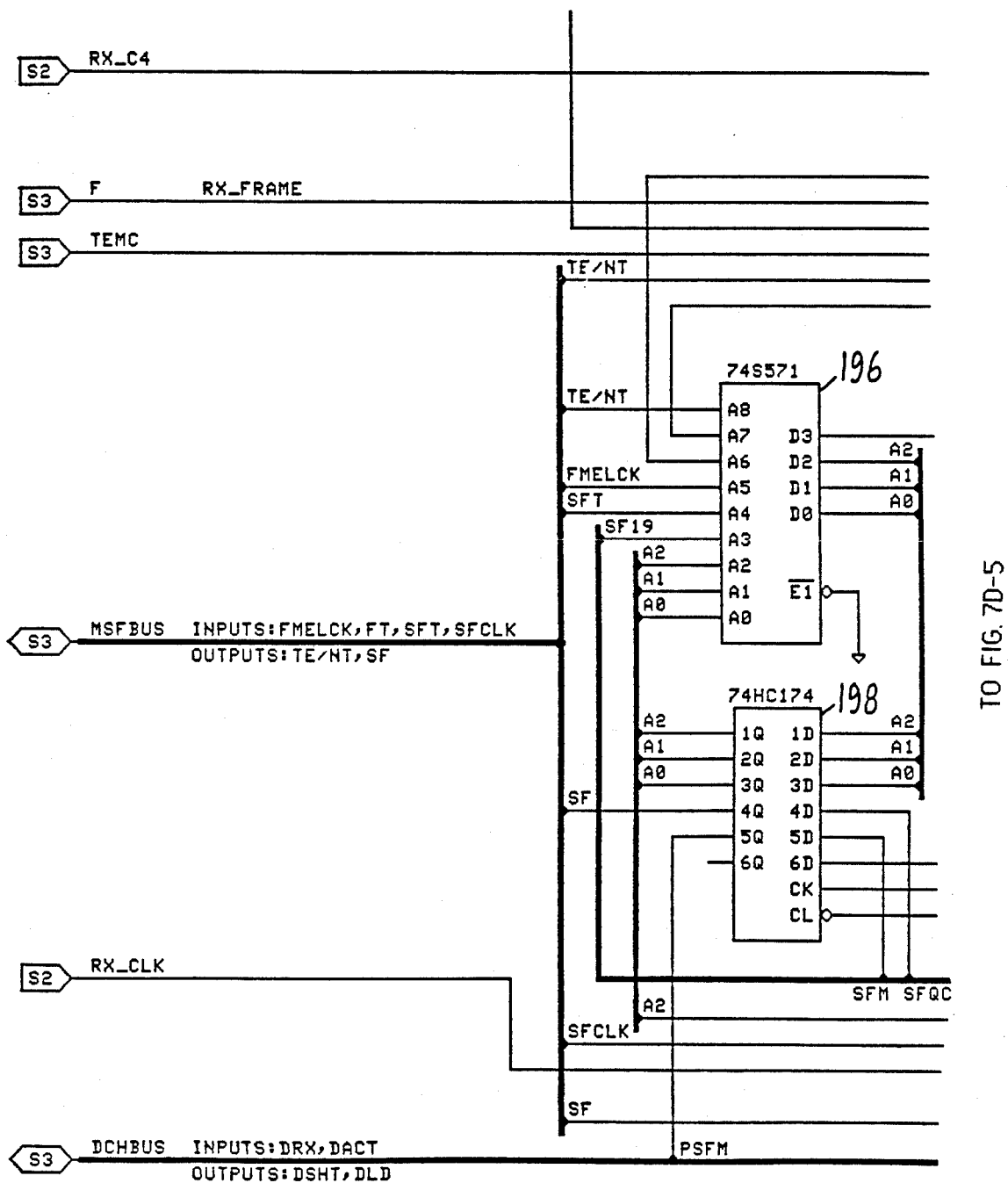
Figures 5, 7D:
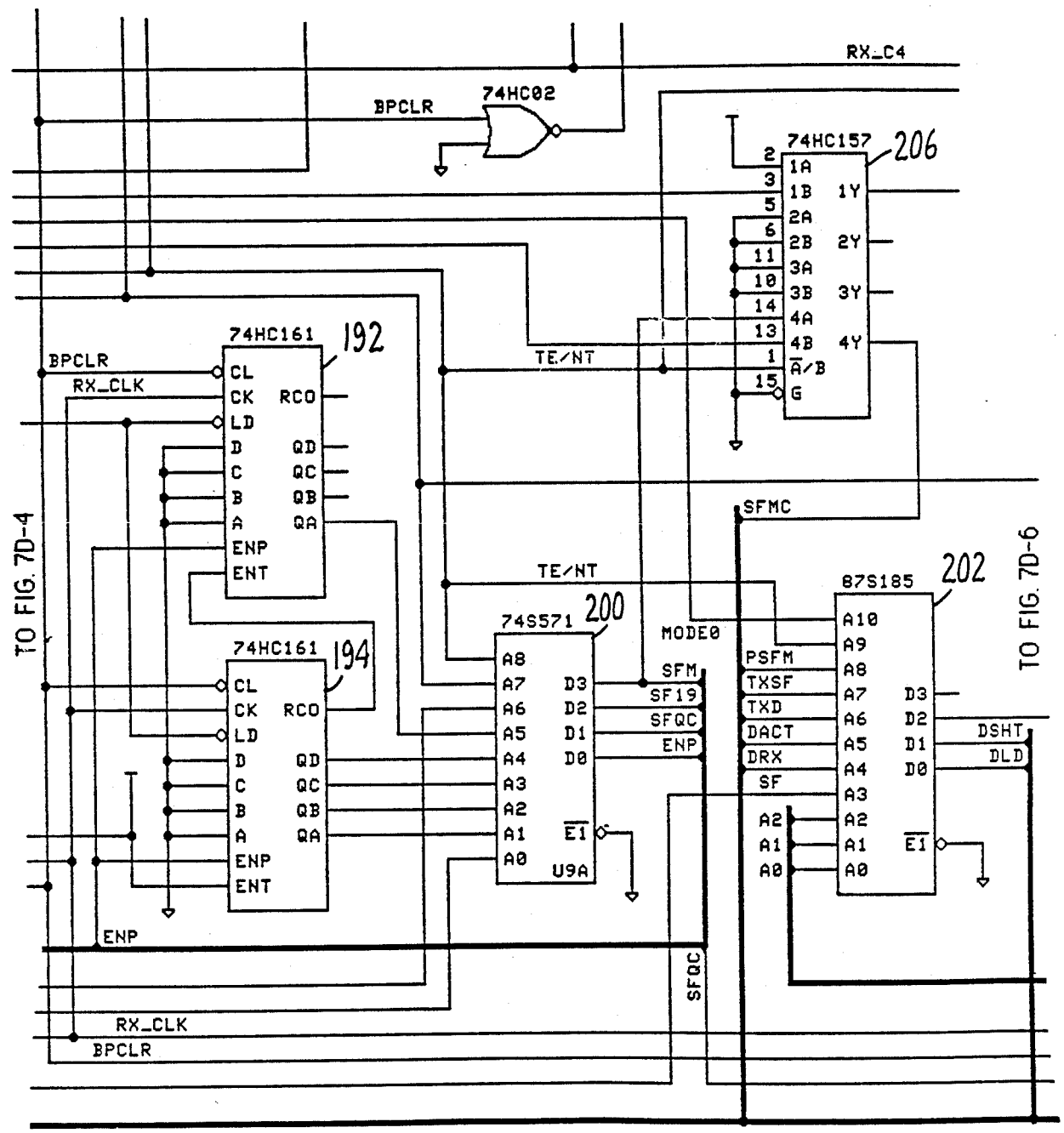
Figures 6, 7D:
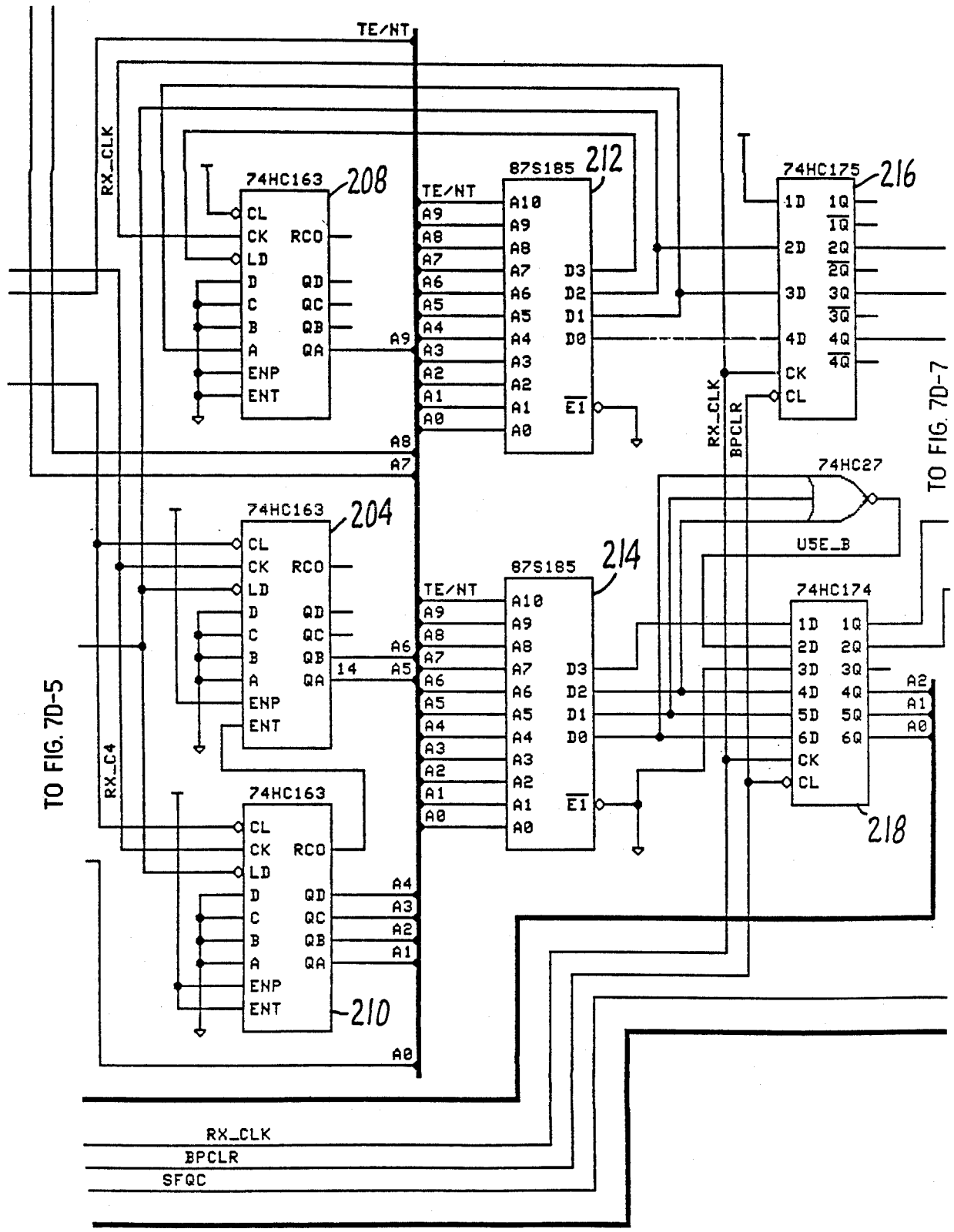
Figures 7, 7D:
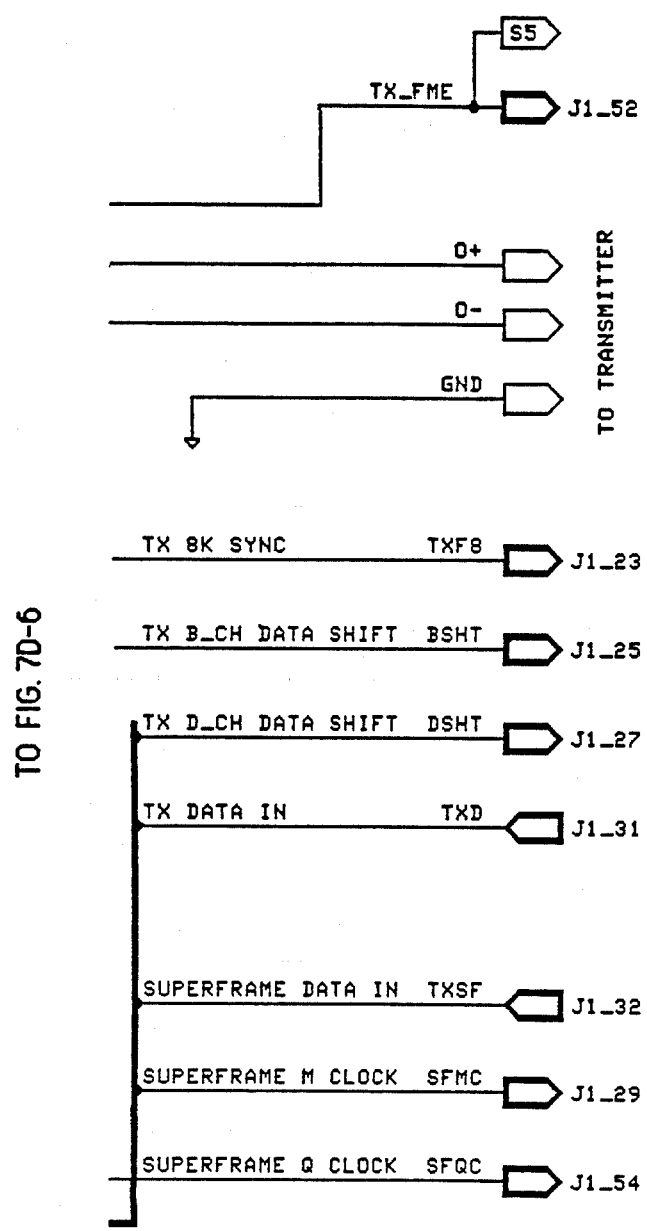

Referring to FIG. 7D-2, activate/deactivate logic is provided by components 180, 182, 184, 186, 188 and 190. The coding algorithm "ADLGC.src" for ROMs 180, 182 and 184 are provided in Appendix K at the end of this specification. Appendix L provides the recommended subroutines for external up and input latch circuit for AR (Activation Request), DR (Deactivation Request) and T31XP (Timer 3/1 expiry). Note that I124 indicates the receiving of INFO1(NT) or INFO2/4 4(TE). This signal is sent to the external microprocessor through the uwire for activation acknowledgement.

Components 192 and 194 (see FIG. 7D-5) form a frame counter for deriving superframe sequence, i.e. modulo=20 in NT mode, 5 in TE mode. Components 196 and 198 (see FIGS. 7D-4) form a superframe counter controller. In the TE mode, counter 192, 194 is synchronized to the SFT (superFrame trigger) signal from the frame trigger decoder described above. If >=3 consecutive SFT's, then the circuit assumes in lock, i.e. TE superframe TX channel is enabled. If three consecutive SFT pulses are found missing or INFOO is detected or the Frame synchronizer is out of lock, then the circuit assumes out-of-lock, i.e. TE superframe TX channel is disabled. In the NT mode, counter 192, 194 is synchronized to transmitter. If TX equals INFO4, then the superframe sequences are transmitted.

Component 200 (see FIG. 7D-5) provides superframe enable/disable and clock switching functions. Pin D3 of component 200 derives a "1 out of 20" frame sequence from the outputs of counter 192, 194 for generating the M clock SFMC in the NT mode if TX=INFO4. The SFMC signal is switched to receive it's input from the frame synchronizer in the TE mode (i.e., pin D3 of component 200 is not active). In the NT mode, the M clock provides timing information to the transmit data processor 202 for encoding the M(S1) bit.

Pin D1 of component 200 derives a "1 out of 5" frame sequence from the outputs of counter 192, 194 for generating the Q clock SFQC. In the NT mode, the Q clock is enabled if TX=INFO4. In the TE mode, the Q clock is enabled when Superframe timing is in lock This clock feeds two elements: transmit data processor 202 and frame synchronizer/lock detector 204 (see FIG. 7D-6). The first connection provides timing information to the transmitter for encoding the Fa/N (INFO4) or Fa/L (INFO3) bits. The second connection forbids the frame locking circuit 204 from responding to missing frame trigger pulses during superframes.

The S2 signal is the data output in the TE mode and can be decoded from RXC-DTA with RX-S2. The signal is also the S2 data input to the NT transmitter.

Refering to FIGS. 7D-5 and 7D-6, a transmit data processor/encoder is formed by components 206, 202, 208, 204, 210, 212, 214, 216 and 218. The signal TXD at pin A6 of component 202 is the TX B/D channel data input, 1=0+ or 0−. The B-channel data path is enabled by signals BSHT and TXF8 at pins 2Q and 1Q, respectively, of component 218: channel B1 is selected when TXF8 is high and BSHT is high; channel B2 is selected when TXF82 is low and BHST is high. The TXF8 signal also provides half-frame timing.

In the TE mode, the D-channel data path is enabled by DSHT at pin D1 of component 202. If the D-channel is not activated (DACT=low), then DSHT pulses are not outputed and transmit data is automatically set to binary 1. In the NT mode, the DRX signal at pin A4 of component 202 and the E-bit TX data input is connected to the D-channel Rx output and multiplexed by component 202 into the TX data path. Pin A7 of component 202 provides the superframe data input (TE mode only).

In the NT mode, the transmitter is frame synchronized to an external source (U-Interface) by either shortening (39 counts) or widening (41 counts) the last L bit period. In the TE mode, the transmitter is frame synchronized to the RX-frame with a 2-bit offset.

As shown in FIG. 7D-1, components 220 and 222 provide TE/NT select. In NT modes, the receiver is configured as adaptive timing mode (similar to receiver in TE mode) for receiving asynchronous Info1 signal. After INFO1 is recognized, the receiver is switched back to normal mode. In the NT adaptive timing mode, if NT changes from the G3 state to the G2 state, due to loss of framing or upon receiving INFO0, pin 3Q of component 222 will issue a low-going pulse for resetting the PLL locking circuitry, thus causing phase re-estimation of the second sampling clock.

Referring now to FIGS. 7E-1, 7E-2 and 7E-3, an NT frame synchronizer is formed by components 222, 224, 226, 228, 232, 2334 and 236. The NT receiving clock NTRCLK, pin QC of component 224, is at 192 KHz and is generated by dividing 7.68 MHz with a modulo of 40 in components 232 and 234. For each bit period, there are forty 7.68 MHz clocks. The NT frame sync input signal NTFSYN at pin B of components 224 is provided for an external 8 KHz sync signal to synchronize the framing of the transmitter. If there is no signal at this input, the transmitter frame clock provided at pin 49 of component 236 is free running at the sub-multiple (/40, 40 clocks per bit; and then /48, bits per frame) of the crystal frequency (7.68 MHz). If an external sync signal is applied to this input, then the counters 232, 234 will either add or subtract a count during the last bit of each frame until the frame timing is frequency locked to the positive edges of the external input. The coding algorithm of component 236 does not allow consecutive opposite changes (e.g., 39 in one frame and 41 in the next frame): the counters have to step through the normal state (/40) before the next opposite change. The counters 115, 117 (FIG. 7B) used in the sampler clock processor are also frequency locked to the external sync signal in NT adaptive timing mode. This is accomplished by the signal BC3940 connecting between pin D2 of component 236 and pin ENP of component 117.

Figure 7E:
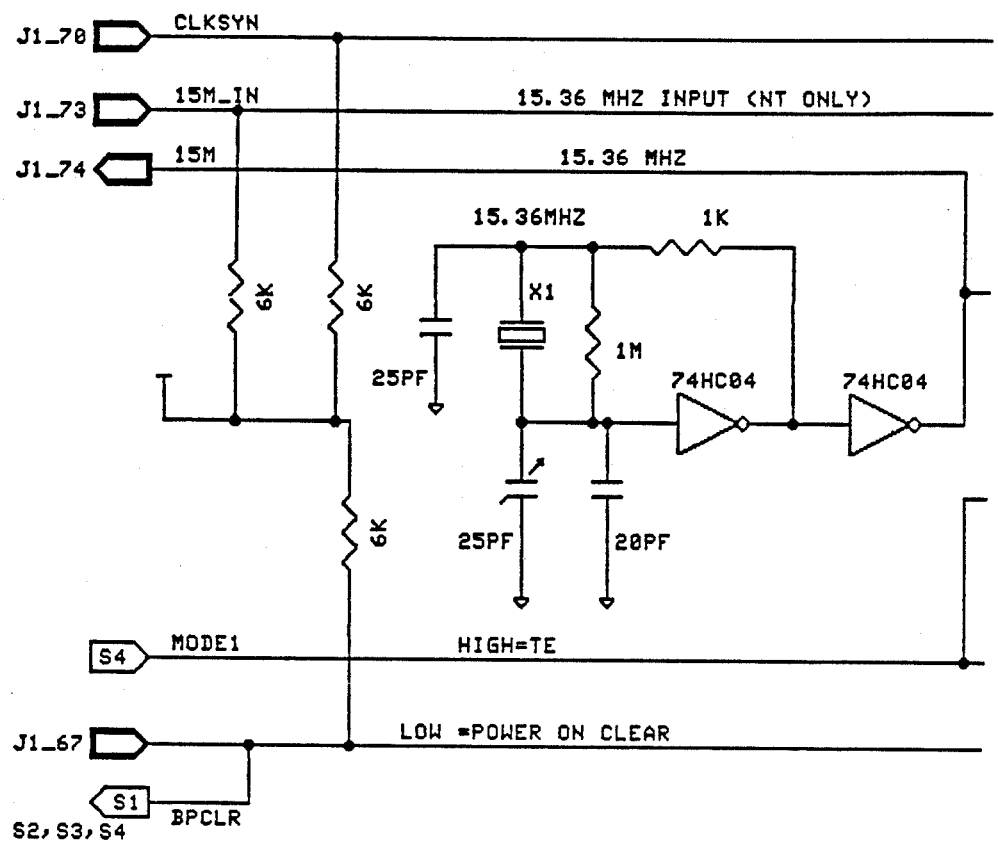
Figure 1:
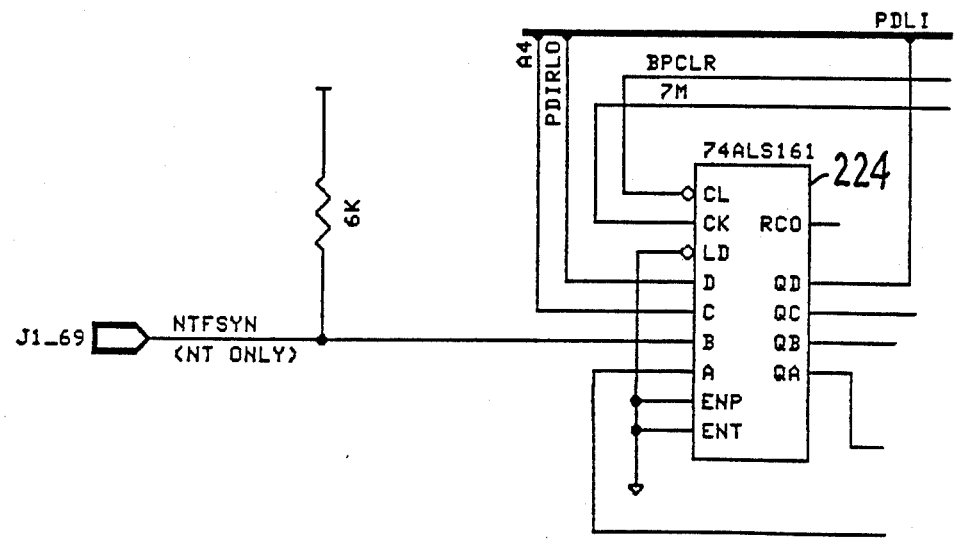
Figures 2, 7E:
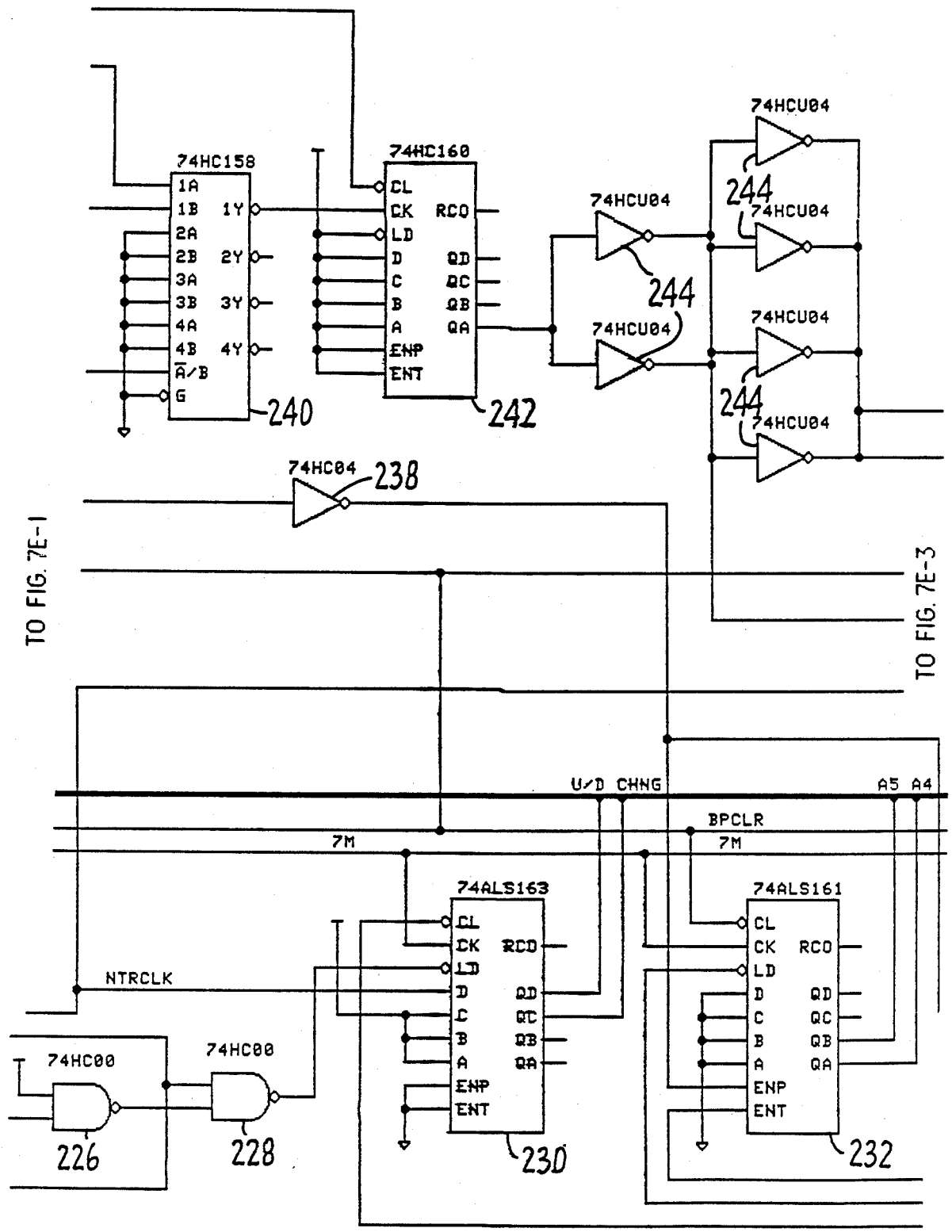
Figures 3, 7E:
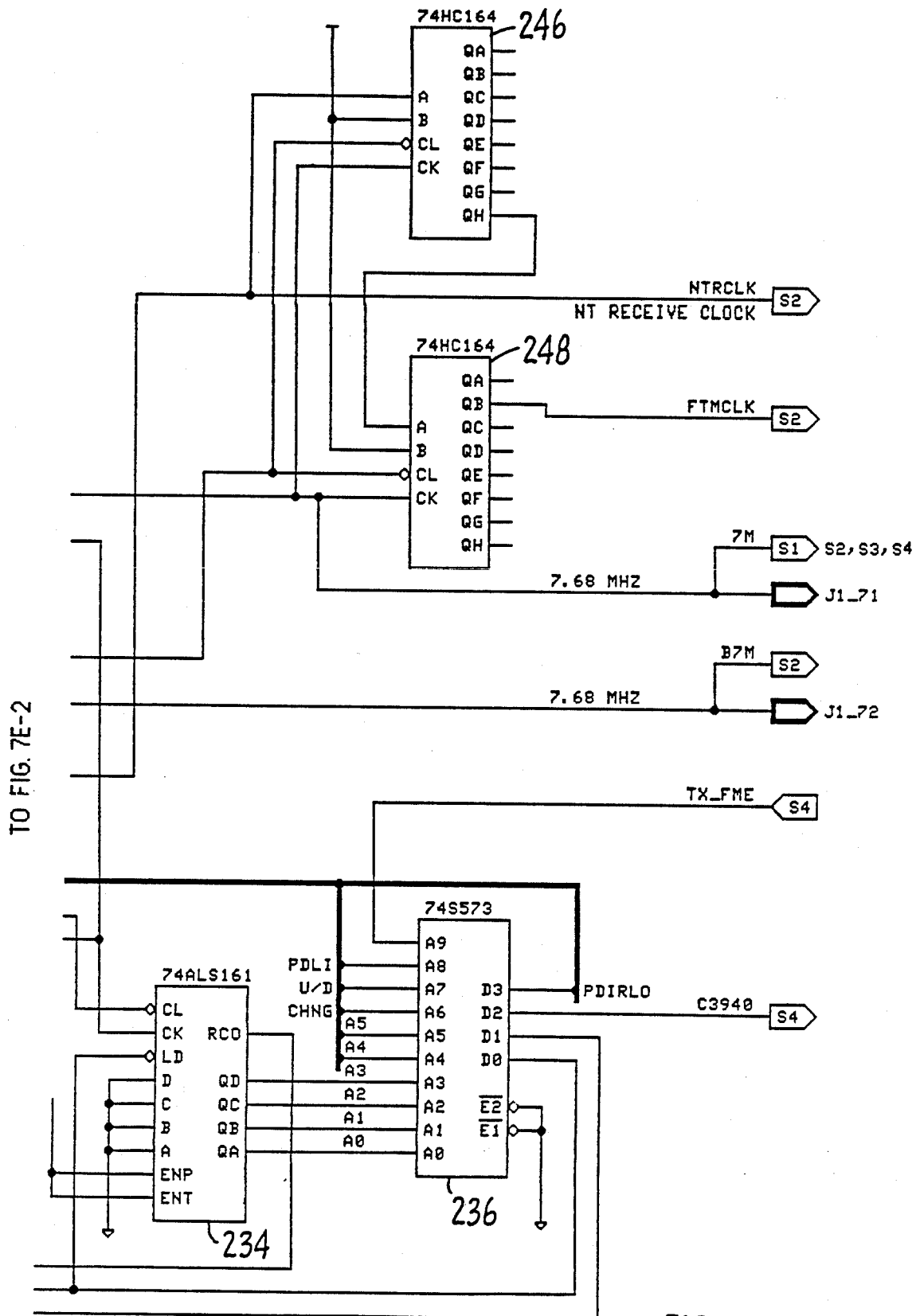

As shown in FIGS. 7E-2 and 7E-3, a system clock generator is formed by components 238, 240, 242, 244, 246 and 248. The clock input is 15.36 MHz crystal in the TE mode and 15.36 MHz external input in the NT mode from the U-Interface. The fixed timing sampling clock signal FTMCLK at pin QB of component 248 can be moved to other taps for different RX sampling timings; this connection only affects NT Fixed timing mode.

It should be understood that various alternatives to the embodiment of the invention described herein may be employed in practicing the invention. It is intended that the following claims define the scope of the invention and that the structure within the scope of these claims and its equivalents be covered thereby.

APPENDIX A

```
10   ! ATHCTL.SRC   DEC 85   REVISION 1   JUNE 23,86
20   ! S-RECEIVER AUTO-THRESHOLD CONTROLLER
30   MASS STORAGE IS "TENT:CS80,7"
40   OPTION BASE 0
50   DOUBLE If(127),Output(255),Addr,Reqspd,B,Topp,Requdw
60   DOUBLE Toptop,Top,Bi0,Reqld,Tandt,Ent
70   MAT If=(0)
80   If(0)=8
90   If(1)=3
100  File$="ATHCTL.DATA"
110  !
120  PRINT PAGE
130  FOR Addr=0 TO 255
140     Mask_bits(Addr,"10000000",Reqspd)  ! Req speed control
150     Mask_bits(Addr,"01000000",B)       ! B slot timing, from RXFME
160     Mask_bits(Addr,"00100000",Topp)    ! Top+
170     Mask_bits(Addr,"00010000",Requdw)
180     Mask_bits(Addr,"00001000",Toptop)
190     Mask_bits(Addr,"00000110",Top)     ! Top+-
200     Mask_bits(Addr,"00000001",Bi0)
210     !
220     IF Bi0=0 THEN                      ! if info 0
230        Tandt=Ent=Reqld=0               ! then slew down threshold
240                                         ! Tandt connected to Updown
250     ELSE
260        Tandt=0                         ! Toptop AND Top, also Updown
270        IF (Toptop=1) AND ((Top=2) OR (Top=3)) THEN Tandt=1
280        !
290        Ent=Reqld=1                     ! disable counter, no LD(update)
300        SELECT Top
310        CASE 0                          ! do nothing
320        CASE 1                          ! falling edge
330           IF Reqspd=0 THEN Ent=0! enable counter
340        CASE 2,3                        ! rising edge & 1
350           SELECT Reqspd
360           CASE 0                       ! Reqspd=high speed
370              Ent=0                     ! no windowing in this case
380           CASE 1! if Reqspd=low speed, apply windowing
390              IF (Requdw=1) AND (B=1) THEN Ent=0
400           END SELECT
410           !
420           IF (Topp=1) AND (Top=2) THEN Reqld=0
430           ! rising edge (Top+ only) enables Req & Ath
440        END SELECT
450     END IF
460     !
470     Output(Addr)=(Tandt*4)+(Ent*2)+Reqld
480     Print_bin(Addr,8,""," ",";")
490     Print_bin(Output(Addr),3,"","",".")
500  NEXT Addr
510  Write_data_file(File$,If(*),Output(*))
520  END
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

```
Pt#   (A)7654 3210   (D)210
                            oo
<1>    0--- --1-     -1-
<2>    0--- -1--     -1-
<3>    ---- ---0     -11
<4>    ---- 11-1     1--
<5>    --1- -10-     --1
<6>    -1-1 -1--     -1-
```

Size of matrix = 6x(8x2+3) = 114

APPENDIX B

```
10   ! FTF      NOV 85    REVISION 1 JUNE 6,86
20   ! S-INTERFACE 5 POINT FILTER
30   MASS STORAGE IS "TENT:CS80,7"
40   OPTION BASE 0
50   DOUBLE If(127),Output(127),Addr,Dlast,Din,Dout,Ent
60   DOUBLE X,Dcnt,Dfirst
70   MAT If=(0)
80   If(0)=7
90   If(1)=2
100  File$="FTF.DATA"
110  !
120  PRINT PAGE
130  FOR Addr=0 TO 127
140     Mask_bits(Addr,"1000000",Dlast)
150     Mask_bits(Addr,"0111110",Din)
160     Mask_bits(Addr,"0000001",Dfirst)
170     !
180     Dcnt=0
190     FOR X=0 TO 4
200        IF BIT(Din,X)=1 THEN Dcnt=Dcnt+1
210     NEXT X
220     Dout=0
230     IF Dcnt>=3 THEN Dout=1
240     !
250     Ent=BINEOR(1,BINEOR(Dfirst,Dlast))
260     !
270     Output(Addr)=Dout+(Ent*2)
280     Print_hex(Addr,7,""," ",";")
290     Print_bin(Output(Addr),2,"","",".")
300  NEXT Addr
310  Write_data_file(File$,If(*),Output(*))
320  END
330  !
340  !
>>>>>>  SUB Write_data_file(File$,DOUBLE Inf(*),Outdata(*))
>>>>>>  SUB Read_data_file(File$,DOUBLE Inf(*),Indata(*))
>>>>>>  SUB Mask_bits(DOUBLE Addr,M$,DOUBLE X)
>>>>>>  SUB Print_hex(DOUBLE X,Length,X$,Y$,Z$)
>>>>>>  SUB Print_bin(DOUBLE X,Length,X$,Y$,Z$)
>>>>>>  SUB Convert_hex(DOUBLE X,Length,Hex$)
>>>>>>  SUB Convert_bin(DOUBLE X,Length,Bin$)
>>>>>>  SUB Dbl_string(DOUBLE X,X$)
```

| FTF | Sep 12 1986 [1677] | TENT/FTF.DATA (128x2) |
|---|---|---|
| RFTCF v2.0 2-85 WHee | [000.00.19] | [000.00.01.C..........] |
| Address bit (A): '0'=Address bar '1'=Address | | '-'=no connection |
| Data bit (D): '-'=no connection '1'=wired OR | | 'o'=AND-NOR |

```
Pt#    (A)654 3210    (D)10
 (1)    0-- ---0       1-
 (2)    1-- ---1       1-
 (3)    --- 111-       -1
 (4)    --1 -11-       -1
 (5)    --1 1-1-       -1
 (6)    --1 11--       -1
 (7)    -1- -11-       -1
 (8)    -1- 1-1-       -1
 (9)    -1- 11--       -1
(10)    -11 --1-       -1

(11)    -11 -1--       -1
(12)    -11 1---       -1
```

Size of matrix = 12x(7x2+2) = 192

APPENDIX C

```
10  ! FASEL         NOV 85
20  ! S-INTERFACE FIX/ADAPTIVE TIMING SEL ROM
30  MASS STORAGE IS "TEXT:CS80,7"
40  OPTION BASE 0
50  DOUBLE If(127),Output(31),Addr,Sel,A0p,F0p,F0m,A0m,Pol,Dta
60  MAT If=(0)
70  If(0)=5
80  If(1)=2
90  File$="FASEL.DATA"
100 !
110 PRINT PAGE
120 FOR Addr=0 TO 31
130    Mask_bits(Addr,"10000",Sel)
140    Mask_bits(Addr,"01000",F0p)
150    Mask_bits(Addr,"00100",F0m)
160    Mask_bits(Addr,"00010",A0p)
170    Mask_bits(Addr,"00001",A0m)
180    !
190    SELECT Sel
200    CASE 0       ! Adaptive timing
210       Pol=A0p                    ! pol=0 IF input=0-
220       Dta=BINIOR(A0p,A0m)        ! Dta=0 IF input=binary 1
230    CASE ELSE ! Fix timing
240       Pol=F0p
250       Dta=BINIOR(F0p,F0m)
260    END SELECT
270    !
280    Output(Addr)=Dta+(Pol*2)
290    Print_bin(Sel,1,"","  ","|")
310    Print_bin(F0p,1,"","","|")
320    Print_bin(F0m,1,"","","|")
325    Print_bin(A0p,1,"","","|")
330    Print_bin(A0m,1,""," ","|")
340    Print_bin(Output(Addr),2,"","",".")
350 NEXT Addr
360 Write_data_file(File$,If(*),Output(*))
370 END
380 !
390 !
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
```

```
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

| | Sep 12 1986 [1681] | | TENT/FASEL.DATA (32x2) |
|---|---|---|---|
| RFTCF v2.0 2-85 WHee | | [000.00.15] | [000.00.01.C.1.........] |
| Address bit (A): '0'=Address bar | | '1'=Address | '-'=no connection |
| Data bit (D): '-'=no connection | | '1'=wired OR | '0'=AND-NOR |

Pt# (A)4 3210 (D)10

| | | |
|---|---|---|
| <1> | 0 ---1 | -1 |
| <2> | 0 --1- | 11 |
| <3> | 1 -1-- | -1 |
| <4> | 1 1--- | 11 |

Size of matrix = 4x(5x2+2) = 48

APPENDIX D

```
10  ! AEQCTL.SRC    DEC 85    REVISION 1   JUNE 24,86
20  ! S-RECEIVER ADAPTIVE-EQUALIZER CONTROLLER
30  MASS STORAGE IS "TENT:CS80,7"
40  OPTION BASE 0
50  DOUBLE If(127),Output(511),Addr,Rcl,Rch,B,Lck,Ftm,Spd,Bi0
60  DOUBLE Tandt,Entl,Enth,Enp,Ld,Aequdw
70  MAT If=(0)
80  If(0)=9
90  If(1)=4
100 File$="AEQCTL.DATA"
110 !
120 PRINT PAGE
130 FOR Addr=0 TO 511
140    Mask_bits(Addr,"100000000",Rcl)
150    Mask_bits(Addr,"010000000",Rch)
160    Mask_bits(Addr,"001000000",Bi0)
170    Mask_bits(Addr,"000100000",Tandt) ! Toptop & Top
180    Mask_bits(Addr,"000010000",B)     ! B slot timing, from RXFME
190    Mask_bits(Addr,"000001000",Ftm)
200    Mask_bits(Addr,"000000100",Spd)
210    Mask_bits(Addr,"000000010",Lck)
220    Mask_bits(Addr,"000000001",Aequdw)
230    !
240    IF (Bi0=0) OR (Ftm=1) THEN   ! if info0 or Fix timing mode
250       Ld=0                       ! disable equalizer
260       Entl=Enth=Enp=1
270    ELSE                          ! else, enable equalizer
280       Enp=BINEOR(1,Rch)  ! no wrap arround
290       Ld=Entl=Enth=1     ! disable counter first
300       !
310       IF (Lck=1) AND (Tandt=1) THEN
320          SELECT Spd
330          CASE 0    ! high speed
340             Enth=0
350             Entl=1
360          CASE ELSE ! low speed
370             Enth=Rcl
380             IF (B=1) AND (Aequdw=1) THEN Entl=0
390          END SELECT
400       END IF
410    END IF
420    !
430    Output(Addr)=(Entl*8)+(Enth*4)+(Enp*2)+Ld
```

```
440     Print_bin(Addr,9,"",", "," ",";")
450     Print_bin(Output(Addr),4,"","",". ")
460   NEXT Addr
470   Write_data_file(File$,If(*),Output(*))
480   END
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

[R R Krf]    Sep 12 1986  [1684]         TENT/RECCTL.DATA (512x4)
RFTCF v2.0 2-85 WHee          [000.01.21]  [000.00.08.C.1.........]
Address bit (A): '0'=Address bar   '1'=Address    '-'=no connection
 Data bit (D): '-'=no connection  '1'=wired OR   'o'=AND-NOR

| Pt# | (A)8 7654 3210 | (D)3210 |
|-----|----------------|---------|
|     |                | ooo     |
| (1) | - -11Y 0111    | 1---    |
| (2) | 0 -11- 0-1-    | -1--    |
| (3) | - -11- 001-    | -1--    |
| (4) | - 11-- 0---    | --1-    |
| (5) | - -1-- 0---    | ---1    |

Size of matrix = 5x(9x2+4) = 110

APPENDIX E

```
10   ! PLLCTL.SRC    DEC 85    REVISION 1   JULY 11,86
20   ! S-RECEIVER PLL CONTROLLER
30   MASS STORAGE IS "TENT:CS80,7"
40   OPTION BASE 0
50   DOUBLE If(127),Output(255),Addr,Stb,Speed,Cnt,Pden,Idwdw,Sqen
60   MAT If=(0)
70   If(0)=8
80   If(1)=3
90   File$="PLLCTL.DATA"
100  !
110  PRINT PAGE
120  FOR Addr=0 TO 255
130    Mask_bits(Addr,"10000000",Stb)
140    Mask_bits(Addr,"01110000",Speed)
150    Mask_bits(Addr,"00001111",Cnt)
160    !
170    Sqen=1
180    IF (Stb=0) AND (Cnt=15) THEN Sqen=0
190    Pden=0
200    IF Cnt=0 THEN Pden=1
210    !
220    Idwdw=0
230    SELECT Speed
240    CASE 7      ! 1 slot
250      IF Cnt<=0 THEN Idwdw=1
260    CASE 6      ! 1 slot
270      IF Cnt<=0 THEN Idwdw=1
280    CASE 5      ! 2 slots
290      IF Cnt<=1 THEN Idwdw=1
300    CASE 4      ! 3 slots
310      IF Cnt<=2 THEN Idwdw=1
320    CASE 3      ! 4 slots
330      IF Cnt<=3 THEN Idwdw=1
```

```
340     CASE 2       ! 5 slots
350        IF Cnt<=4 THEN Idwdw=1
360     CASE 1       ! 6 slots
370        IF Cnt<=5 THEN Idwdw=1
380     CASE 0       ! 7 slots
390        IF Cnt<=6 THEN Idwdw=1
400     END SELECT
410     !
420     Output(Addr)=(Pden*4)+(Idwdw*2)+(Sqen*1)
430     Print_bin(Addr,8,"","   ",";")
440     Print_bin(Output(Addr),3,"","",".")
450   NEXT Addr
460   Write_data_file(File$,If(*),Output(*))
470   END
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

| [RF NET] | Sep 12 1986 [1688] | | TENT/PLLCTL.DATA (256x3) |
|---|---|---|---|
| RFICP v2.0 2-85 WHee | | [000.00.39] | [000.00.10.C.1s.........] |
| Address bit (A): '0'=Address bar | '1'=Address | | '-'=no connection |
| Data bit (D): '-'=no connection | '1'=wired OR | | 'o'=AND-NOR |

| Pt# | (A)7654 3210 | (D)210 |
|---|---|---|
| | | o |
| (1) | 0--- 1111 | --1 |
| (2) | -000 0--0 | -1- |
| (3) | -00- 0-0- | -1- |
| (4) | -0-0 0-00 | -1- |
| (5) | -0-- 00-- | -1- |
| (6) | --00 00-0 | -1- |
| (7) | --0- 000- | -1- |
| (8) | ---- 0000 | 11- |

Size of matrix = 8x(8x2+3) = 152

APPENDIX F

```
10    ! BRPD.SRC    DEC 85   REVISION 1   JUNE 9,86
20    ! S-RECEIVER PLL-BINARY/RANGE PHASE DETECTOR
30    MASS STORAGE IS "TENT:CS80,7"
40    OPTION BASE 0
50    DOUBLE If(127),Output(511),Addr,Pick,Dir,Nostb,Pden,Phasem,Phase
60    DOUBLE Dirout,Ud,Entud,Entup
70    MAT If=(0)
80    If(0)=9
90    If(1)=4
100   File$="BRPD.DATA"
110   !
120   PRINT PAGE
130   FOR Addr=0 TO 511
140     Mask_bits(Addr,"100000000",Pick)
150     Mask_bits(Addr,"010000000",Dir)
160     Mask_bits(Addr,"001000000",Nostb)
170     Mask_bits(Addr,"000100000",Pden)
180     Mask_bits(Addr,"000010000",Phasem)
190     Mask_bits(Addr,"000001111",Phase)
200     !
210     !RANGE PD
220     Ud=0     ! set down first
```

```
230    IF (Phase<=0) OR (Phase>=31) THEN Ud=1 ! if 0 and 31, up
240    !
250    Entud=1 ! disable counter first
260    SELECT Ud
270    CASE 0 ! down
280       IF (Pden=1) AND (Plck=0) THEN Entud=0
290    ! if strobe and Pll not inlock, enable speed counter
300    CASE 1 ! up
310       IF Pden=1 THEN Entud=0        ! enable speed counter
320    END SELECT
330    !
340    !BINARY PD
350    Dirout=Dir
360    IF Pden=1 THEN
370       Dirout=Phasem
380    END IF
390    !
400    IF Hostb=1 THEN
410       Ud=Entud=0                    ! decr speed counter
420    END IF
430    !
440    Entup=0
450    IF Phase=0 THEN Entup=1   ! enable HOSTB counter
460    !
470    Output(Addr)=(Dirout*8)+(Ud*4)+(Entud*2)+Entup
480    Print_hex(Addr,2,"","  ",";")
490    Print_bin(Output(Addr),4,"","",".")
500  NEXT Addr
510  Write_data_file(File$,If(*),Output(*))
520  END
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

[FIG. G.I.]    Sep 12 1986  [1686]           TENT/BRPD.DATA (512x4)
RFTCP v2.0 2-85 WHee           [000.01.25] [000.00.21.C.]........c.]
Address bit (A):  '0'=Address bar    '1'=Address     '-'=no connection
Data bit (D):  '-'=no connection   '1'=wired OR    'o'=AND-NOR

```
   Pt#   (A)8 7654 3210   (D)3210
                            o o
   (1)    - 0-0- ----      1---
   (2)    - --10 ----      1---
   (3)    - -0-0 0000      -1--
   (4)    - -0-1 1111      -1--
   (5)    0 --1- ----      --1-
   (6)    - --10 0000      --1-
   (7)    - --11 1111      --1-
   (8)    - -1-- ----      --1-
   (9)    - ---0 0000      ---1
```

Size of matrix = 9x(9x2+4) = 198

APPENDIX G

```
10  ! HOSTB.SRC    DEC 85    REVISION 1    JUNE 10,86
20  ! S-RECEIVER PLL-NO STROBE DECODER
30  MASS STORAGE IS "TENT:CS80,7"
40  OPTION BASE 0'
50  DOUBLE If(127),Output(63),Addr,Tent,Cnt,Stb,Cry,Ld,Cntmax
```

```
60   MAT If=(0)
70   If(0)=6
80   If(1)=2
90   File$="HOSTB.DATA"
100  !
110  PRINT PAGE
120  Cntmax=7
130  FOR Addr=0 TO 63
140    Mask_bits(Addr,"100000",Tent)
150    Mask_bits(Addr,"011110",Cnt)
160    Mask_bits(Addr,"000001",Stb)
170    !
180    SELECT Tent
190    CASE 1     ! TE
200      Cry=0
210      Ld=1
220      IF Cnt>=Cntmax THEN
230        Ld=0
240        Cry=1
250      END IF
260      IF Stb=1 THEN Ld=0
270    CASE ELSE  ! NT
280      ! no strobe decoder can be defeated since freq_in=freq_out
290      Cry=0
300      Ld=0
310    END SELECT
320    !
330    Output(Addr)=(Cry*2)+Ld
340    Print_hex(Addr,2,"","  ",";")
350    Print_bin(Output(Addr),2,"","",".")
360  NEXT Addr
370  Write_data_file(File$,If(*),Output(*))
380  END
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

| [TENT] | Sep 12 1986 [1687] | TENT/HOSTB.DATA (64x2) |
|---|---|---|
| RFTCP v2.0 2-85 WHee | [000.00.17] | [000.00.01.C.1.........] |
| Address bit (A): '0'=Address bar | '1'=Address | '-'=no connection |
| Data bit (D): '-'=no connection | '1'=wired OR | '0'=AND-NOR |

| Pt# | (A)54 3210 | (D)10 |
|---|---|---|
| (1) | 0- ---- | -1 |
| (2) | -- ---1 | -1 |
| (3) | 1- 111- | 11 |
| (4) | 11 ---- | 11 |

Size of matrix = 4x(6x2+2) = 56

APPENDIX H

```
10  ! DCC.SRC        DEC 85
20  ! S-RECEIVER PLL-DIGITAL CONTROLLED CLOCK
30  MASS STORAGE IS "TENT:CS80,7"
40  OPTION BASE 0
50  DOUBLE If(127),Output(63),Addr,Idwdw,Ai,Id,Udct1,Ao,Cry,Delta
60  MAT If=(0)
70  If(0)=6
```

```
 80    If(1)=5
 90    Files="DCC.DATA"
100    !
110    PRINT PAGE
120    FOR Addr=0 TO 63
130      Mask_bits(Addr,"100000",Idwdw)
140      Mask_bits(Addr,"011110",Ai)
150      Mask_bits(Addr,"000001",Id)
160      Udctl=(Idwdw*2)+Id
170      !
180      SELECT Udctl
190      CASE 2           ! 10     .. decreament
200         Delta=11
210      CASE 0,1         ! 00 01  .. hold
220         Delta=12
230      CASE 3           ! 11     .. increament
240         Delta=13
250      END SELECT
260      !
270      IF Ai>=15 THEN Ai=0       ! invalid state
280      !
290      Ao=Ai+Delta
300      IF Ao>=15 THEN
310         Ao=Ao-15
320         Cry=1
330      ELSE
340         Cry=0
350      END IF
360      !
370      Output(Addr)=(Ao*2)+Cry
380      PRINT USING "#,2D,4X,2D,"" + "",2D,"" = """;Addr,Ai,Delta
390      PRINT USING "#,1D,"","",2D,3X";Cry,Ao
400      Print_bin(Output(Addr),5,"","",".")
410    NEXT Addr
420    Write_data_file(Files,If(*),Output(*))
430    END
>>>>>> SUB Write_data_file(Files,DOUBLE Inf(*),Outdata(*))
>>>>>> SUB Read_data_file(Files,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

[B.T.M.]    Sep 12 1986  [1685]              TENT/DCC.DATA (64:5)
KFTCP v2.0 2-85 WHee            [000.00.42] [000.00.13.C.1s......c.]
Address bit (A): '0'=Address bar  '1'=Address     '-'=no connection
Data    bit (D): '-'=no connection '1'=wired OR   'o'=AND-NOR

| Pt# | (A)54 3210 | (D)4 3210 |
|-----|------------|-----------|
|     |            |   o o     |
| (1) | 00 001-    | 1 1-11    |
| (2) | 00 0-0-    | 1 1--1    |
| (3) | 00 0-1-    | - -1--    |
| (4) | 0- -00-    | - -1--    |
| (5) | 0- 1-0-    | - --1-    |
| (6) | 0- 111-    | - 11--    |
| (7) | 01 0-0-    | - 1-1-    |
| (8) | 01 -11-    | 1 -1--    |
| (9) | -0 00-1    | 1 1--1    |
| (10)| -0 0010    | 1 11-1    |
| (11)| -1 00--    | - 1---    |
| (12)| -1 1---    | 1 ----    |
| (13)| -1 111-    | - ---1    |

```
<14>    10 0001     /- -11-
<15>    10 0-00     - --1-
<16>    10 0--0     1 ---1
<17>    10 010-     - -1--
<18>    1- 01-0     - 1---
<19>    1- -111     - -11-
<20>    1- 10-0     - -1--

<21>    1- 1-1-     - --1-
<22>    1- 11-1     - 11--
<23>    11 -0-0     - -1--
<24>    11 --1-     - --1-
<25>    11 -1-1     1 -1--
```

Size of matrix = 25x(6x2+5) = 425

APPENDIX I

```
10   ! SCLKP.SRC    DEC 85    REVISION 1   AUG 19,86
20   ! S-RECEIVER SAMPLER CLOCK PROCESSOR
30   MASS STORAGE IS "TEHT:CS80,7"
40   OPTION BASE 0
50   DOUBLE If(127),Output(511),Addr,C3940,Lat,Lck,Pll,Sel,Bclk
60   DOUBLE C38,C19,Latout,Ld1,Ld2,Clear
70   MAT If=(0)
80   If(0)=9
90   If(1)=4
100  File$="SCLKP.DATA"
110  !
120  PRINT PAGE
130  FOR Addr=0 TO 511
140    Mask_bits(Addr,"100000000",C3940)
150    Mask_bits(Addr,"010000000",Lat)
160    Mask_bits(Addr,"001000000",Lck)
170    Mask_bits(Addr,"000100000",Pll)
180    Mask_bits(Addr,"000011000",Sel)
190    Mask_bits(Addr,"000000100",Bclk)
200    Mask_bits(Addr,"000000010",C38)
210    Mask_bits(Addr,"000000001",C19)
220    !
230    Ld1=Ld2=1
240    SELECT Sel
250    CASE 2,3          ! TE
260      Clear=0
270      Latout=Pll
280      IF (Lat=0) AND (Pll=1) THEN
290        Ld1=Ld2=0    ! Pll rising edge enables samplers
300      END IF
310    CASE 0            ! NT adaptive timing
320      Clear=1
330      Latout=Pll
340      IF (Lat=0) AND (Pll=1) THEN
350        Ld1=0        ! Pll rising edge enables 1st sampler
360        Clear=0      ! also sync phase estimator counters
370      END IF
380      IF Lck=1 THEN Clear=1   ! if PLL locked, no sync
390      IF C38=1 THEN Clear=0   ! make 39 counts, C3940 extends to 40/41
400      IF C19=1 THEN Ld2=0     ! enable 2nd sampler
410      IF C3940=0 THEN         ! if extended, no clear/ld
420        Clear=Ld2=1
430      END IF
440    CASE 1            ! NT fix timing
450      Clear=0
460      Latout=Bclk
```

```
470     IF (Lat=0) AND (Bclk=1) THEN
480        Ld1=Ld2=0    ! Bclk rising edge enables samplers
490     END IF
500   END SELECT
510   !
520   Output(Addr)=(Latout*8)+(Ld1*4)+(Ld2*2)+Clear
530   Print_hex(Addr,2,"","  ","|")
540   Print_bin(Output(Addr),4,"","",".")
550 NEXT Addr
560 Write_data_file(File$,If(*),Output(*))
570 END
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
```

| | Sep 12 1986  [1690] | | TENT/SCLKF.DATA (512x4) |
|---|---|---|---|
| RFTCF v2.0 2-85 WHee | | [000.01.19] | [000.00.12.C.1s........] |
| Address bit (A): '0'=Address bar | '1'=Address | '-'=no connection | |
| Data bit (D): '-'=no connection | '1'=wired OR | 'o'=AND-NOR | |

| Pt# | (A)8 7654 3210 | (D)3210 |
|---|---|---|
|     |                | o       |
| (1) | 0 ---0 0--- | --11 |
| (2) | - --00 0-0- | ---1 |
| (3) | - --0- 0--- | 11-- |
| (4) | - --01 ---- | 111- |
| (5) | - ---0 0--0 | --1- |
| (6) | - ---0 10-- | 111- |
| (7) | - -1-0 0-0- | ---1 |
| (8) | - 1--0 0-0- | ---1 |
| (9) | - 1--- ---- | -1-- |
| (10)| - 1--- 1--- | --1- |
| (11)| - 1--1 ---- | --1- |

Size of matrix = 11x(9x2+4) = 242

APPENDIX J

```
10  ! SCPDEC.SRC     DEC 85   REVISION 1  AUG 19,86
20  ! S-RECEIVER SAMPLER CLOCK PROCESSOR DECODER
30  MASS STORAGE IS "TENT:CS80,7"
40  OPTION BASE 0
50  DOUBLE If(127),Output(63),Addr,C38,C19
60  MAT If=(0)
70  If(0)=6
80  If(1)=2
90  File$="SCPDEC.DATA"
100 !
110 PRINT PAGE
120 FOR Addr=0 TO 63
130   !
140   C38=C19=0
150   IF Addr=19 THEN C19=1
160   IF Addr=38 THEN C38=1   ! /39, compensated by C3940 (NTFS.src)
170   !
180   Output(Addr)=(C38*2)+C19
190   PRINT USING "#,DD,3X";Addr
200   Print_bin(Output(Addr),2,"","",".")
210 NEXT Addr
220 Write_data_file(File$,If(*),Output(*))
230 END
```

```
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

```
               Sep 12 1986  [1691]           TENT/SCFDEC.DATA (64x2)
 RFTCF v2.0 2-85 WHee            [000.00.17]  [000.00.01.C.1.........]
 Address bit (A):  '0'=Address bar    '1'=Address       '-'=no connection
 Data    bit (D):  '-'=no connection  '1'=wired OR      'o'=AND-NOR Pt#   (A)54 3210   (D)10

<1>    10 0110     1-
    <2>    01 0011     -1

Size of matrix = 2x(6x2+2) = 28
```

APPENDIX K

```
  10  ! ADLGC.SRC    NOV 85   REVISION 4  SEP 23,86
  20  ! S-INTERFACE ACTIVATION/DEACTIVATION LOGIC
  30  MASS STORAGE IS "TENT:CS80,7"
  40  OPTION BASE 0
  50  DOUBLE If(127),Output(1023)
  60  DOUBLE Addr,Sync,Tent,T31exp,Ar,Dr,Ix
  70  DOUBLE St1n,I124,Ei,Ai,Di,Iout,Ld,Stout,Info4
  80  DOUBLE G0,G1,G2,G3,I0,I1,I2,I3,I4,Iany,Quick
  90  DOUBLE F1,F2,F3,F4,F5,F6,F7,F8,I0o,I1o,I2o,I3o,I4o,Dcare
 100  Dcare=65536
 110  MAT If=(0)
 120  If(0)=10
 130  If(1)=11
 140  File$="ADLGC.DATA"
 150  !
 160  F1=G0=0
 170  F2=G1=1
 180  F3=G2=2
 190  F4=G3=3
 200  F5=4
 210  F6=5
 220  F7=6
 230  F8=7
 240  !
 250  !Info (input)
 260  I0=0
 270  Iany=1
 280  I1=I2=2
 290  I3=I4=3
 300  !
 310  !Info (output)
 320  I0o=0
 330  I1o=2
 340  I2o=2
 350  I3o=3
 360  I4o=3
 370  !
 380  PRINT PAGE
 390  FOR Addr=0 TO 1023
 400     Mask_bits(Addr,"1000000000",Tent)
 410     Mask_bits(Addr,"0100000000",Sync)
```

```
420     Mask_bits(Addr,"0010000000",T31exp)    ! 1=expiry of T3/1
430     Mask_bits(Addr,"0001000000",Dr)        ! 1=PH-DR
440     Mask_bits(Addr,"0000100000",Ar)        ! 1=PH-AR
450     Mask_bits(Addr,"0000011000",Ix)        ! info inputs
460     Mask_bits(Addr,"0000000111",Stin)      ! state inputs
470     Quick=0            ! if =0, state changes at frame boundarys
480                        ! if =1, state changes at bit boundarys
490     Ei=I124=Di=Ai=Ld=Info4=0
500     Stout=Stin
510     SELECT Tent
520     CASE 1 ! TE
530       SELECT Stin
540       CASE F1
550          Iout=I0o
560          Stout=F2
570       CASE F2
580          Iout=I0o
590          SELECT Ix
600          CASE I0
610             IF Ar=1 THEN
620                Iout=I1o
630                Stout=F4
640             END IF
650          CASE I2,I4
660             I124=1
670             Stout=F3
680          END SELECT
690       CASE F3
700          Iout=I0o
710          IF Ar=1 THEN
720             SELECT Ix
730             CASE I2
740                Iout=I3o
750                Stout=F6
760             CASE I4
770                Ai=1
780                Iout=I3o
790                Stout=F7
800             CASE ELSE
810                Stout=F5
820             END SELECT
830          END IF
840       CASE F4
850          Iout=I1o
860          IF Ix=I0 THEN
870             IF T31exp=1 THEN
880                Di=1
890                Iout=I0o
900                Stout=F2
910             END IF
920          ELSE          ! Iany,I2,I4
930             Quick=1    ! jmp to F5 & turn off I1 as quick as possible
940             Iout=I0o
950             Stout=F5
960          END IF
970       CASE F5
980          Iout=I0o
990          SELECT Ix
1000         CASE I0,Iany
1010            IF T31exp=1 THEN
1020               Di=1
1030               Stout=F2
1040            END IF
1050         CASE I2
1060            Iout=I3o
1070            Stout=F6
```

```
1080        CASE I4
1090           Ai=1
1100           Iout=I3o
1110           Stout=F7
1120        END SELECT
1130     CASE F6
1140        Iout=I3o
1150        SELECT Ix
1160        CASE I0,I2
1170           IF (Ix=I0) OR (T31exp=1) THEN
1180              Di=1
1190              Iout=I0o
1200              Stout=F2
1210           END IF
1220        CASE I4
1230           Ai=1
1240           Stout=F7
1250        CASE Iany      ! lost of framing
1260           Quick=1     ! turn off I3 right away
1270           Iout=I0o
1280           Stout=F8
1290        END SELECT
1300     CASE F7
1310        Iout=I3o
1320        SELECT Ix
1330        CASE I0
1340           Di=1
1350           Iout=I0o
1360           Stout=F2
1370        CASE I2
1380           Ei=1
1390           Iout=I3o
1400           Stout=F6
1410        CASE Iany      ! lost of framing
1420           Quick=1     ! turn off I3 right away
1430           Ei=1
1440           Iout=I0o
1450           Stout=F8
1460        END SELECT
1470     CASE F8
1480        Iout=I0o
1490        SELECT Ix
1500        CASE I0,Iany
1510           IF (Ix=I0) OR (T31exp=1) THEN
1520              Di=1
1530              Stout=F2
1540           END IF
1550        CASE I2
1560           Iout=I3o
1570           Stout=F6
1580        CASE I4
1590           Ai=1
1600           Iout=I3o
1610           Stout=F7
1620        END SELECT
1630     END SELECT
1640     !
1650  CASE ELSE ! NT
1660     Stin=BINAND(Stin,3)
1670     SELECT Stin
1680     CASE G0
1690        Iout=I0o
1700        IF Ar=1 THEN
1710           Iout=I2o
1720           Stout=G2
```

```
1730            ELSE
1740              IF Ix=I1 THEN
1750                I124=1
1760                Stout=G1
1770              END IF
1780            END IF
1790          CASE G1
1800            Iout=I0o
1810            IF Ar=1 THEN
1820              Iout=I2o
1830              Stout=G2
1840            END IF
1850          CASE G2
1860            Iout=I2o
1870            IF Ix=I3 THEN
1880              Ai=1
1890              Iout=I4o
1900              Stout=G3
1910            ELSE
1920              IF (T31exp=1) OR (Dr=1) THEN
1930                Di=1
1940                Iout=I0o
1950                Stout=G0
1960              END IF
1970            END IF
1980          CASE G3
1990            Iout=I4o
2000            IF Dr=1 THEN
2010              Di=1
2020              Iout=I0o
2030              Stout=G0
2040            ELSE
2050              IF (Ix=I0) OR (Ix=Iany) THEN
2060                Ei=1
2070                Iout=I2o
2080                Stout=G2
2090              END IF
2100            END IF
2110          END SELECT
2120          IF Iout=I4o THEN Info4=1
2130        END SELECT
2140        IF (Stout=Stin) OR ((Sync=1) AND (Quick=0)) THEN
2150          Ei=I124=Di=Ai=Info4=Dcare
2160          Iout=Dcare*3
2170          Stout=Dcare*7
2180          Ld=1
2190        END IF
2200        Output(Addr)=(Ei*4)+(I124*2)+Di
2210        Output(Addr)=(Output(Addr)*16)+(Ai*8)+(Iout*2)+Ld
2220        Output(Addr)=(Output(Addr)*16)+(Stout*2)+Info4
2230        Print_hex(Addr,3,"","   ",";")
2240        Print_bin(Output(Addr),11,"","",".")
2250      NEXT Addr
2260      Write_data_file(File$,If(*),Output(*))
2270      END
2280      !
2290      !
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

```
[R E NOT]    Oct  3 1986  [1750]              TENT/ADLOC.DATA (1024x11)
RPTCP v2.0 2-85 WHee              [000.11.39] [005.12.50.C 1s1s....cc]
Address bit (A): '0'=Address bar    '1'=Address    '-'=no connection
 Data  bit (D): '-'=no connection   '1'=wired OR   'o'=AND-NOR Pt#   (A)98 7654 3210   (D)a98 7654 3210
                                o    o
           ─────────────────────────────────
     <1>    80 -0-0 --11     1-1 -1-1 -1--
     <2>    00 --01 0-00     -11 ---1 --1-
     <3>    00 ---- -1--     --- ---1 ----
     <4>    00 ---1 1-10     --- ---1 --11
     <5>    00 --1- --0-     --1 -1-1 -1--
     <6>    00 -1-- -01-     --- ---1 ----
     <7>    80 1--- -010     --- ---1 ----
     <8>    0- 00-0 --10     --1 -1-- 11--
     <9>    0- 00-- 0-10     --1 -1-- 11--
    <10>    0- -0-1 --11     --1 -11- 1111

<11>    0- --00 --0-     --1 ---- 1---
    <12>    0- --0- --01     --1 ---- 1-1-
    <13>    -0 ---0 01-1     --- ---1 ----
    <14>    -0 ---- 011-     --- ---1 ----
    <15>    -0 --10 0001     --1 -1-1 -1--
    <16>    -0 1--- -10-     --- ---1 ----
    <17>    -- --01 110-     --1 ---- 1---
    <18>    -- ---1 1-10     --1 111- -1--
    <19>    10 ---- -000     --1 ---1 --1-
    <20>    10 ---1 -001     -11 ---1 -1--

<21>    10 ---1 -100     --1 -111 1---
    <22>    10 ---1 1--1     --1 ---1 ----
    <23>    10 --1- -010     --1 ---1 1---
    <24>    10 1--- --11     --- ---1 ----
    <25>    1- ---0 0--1     --- ---- --1-
    <26>    1- ---0 -1--     --- ---- --1-
    <27>    1- ---0 1101     --1 ---1 11--
    <28>    1- ---0 1110     1-1 ---1 11--
    <29>    1- ---- 01--     --- ---- --1-
    <30>    1- ---- 1011     --1 ---1 1---

<31>    1- ---1 0-10     --1 -11- 1-1-
    <32>    1- ---1 -011     --1 ---1 1---
    <33>    1- ---1 -110     1-- ---- --1-
    <34>    1- ---1 -11-     --1 -11- 1---
    <35>    1- ---1 11--     --1 111- 11--
```

Size of matrix = 35x(10x2+11) = 1085

APPENDIX L

RECOMMENDED ACT/DEACTIVATION SUBROUTINES FOR EXTERNAL UP

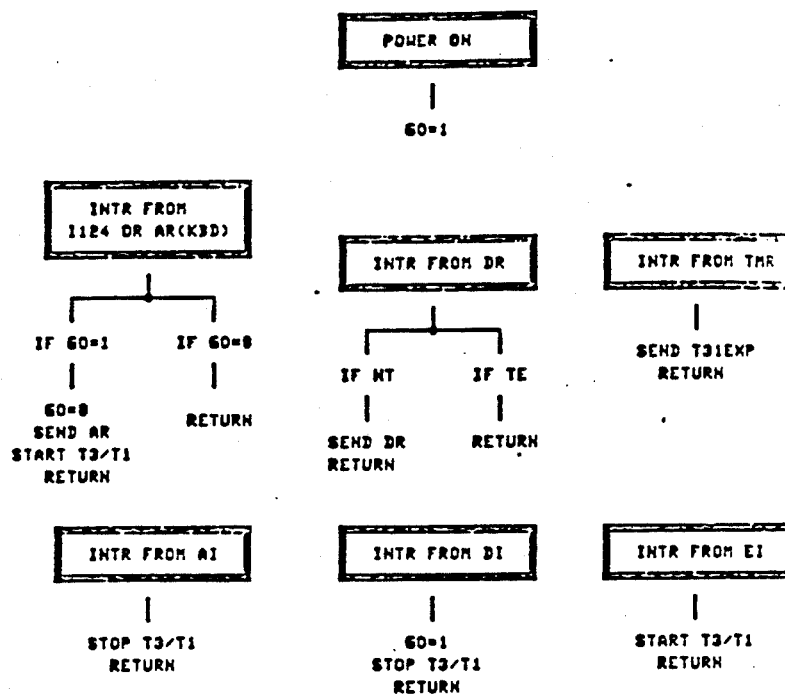

RECOMMENDED INPUT LATCH CIRCUIT FOR AR, DR & T31XP

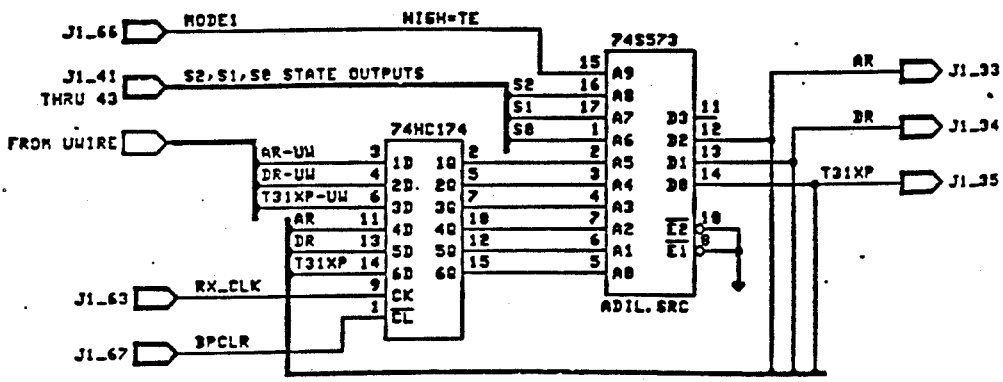

```
10  ! ADIL.SRC          SEP 86
20  ! S INTERFACE ACTIVATION/DEACTIVATION INPUT LATCH CONTROLLER
30  MASS STORAGE IS "TENT:CS80,7"
40  OPTION BASE 0
50  DOUBLE If(127),Output(1023),Addr,Tent,State,Ar_uw,Dr_uw
60  DOUBLE T31xp_uw,Ar_in,Dr_in,T31xp_in,Ar,Dr,T31xp
70  DOUBLE F1,F2,F3,F4,F5,F6,F7,F8,G0,G1,G2,G3
80  MAT If=(0)
90  If(0)=10
100 If(1)=3
110 File$="ADIL.DATA"
120 !
```

```
130   F1=G0=0
140   F2=G1=1
150   F3=G2=2
160   F4=G3=3
170   F5=4
180   F6=5
190   F7=6
200   F8=7
210   !
220   PRINT PAGE
230   FOR Addr=0 TO 1023
240     Mask_bits(Addr,"1000000000",Tent)
250     Mask_bits(Addr,"0111000000",State)
260     Mask_bits(Addr,"0000100000",Ar_uw)
270     Mask_bits(Addr,"0000010000",Dr_uw)
280     Mask_bits(Addr,"0000001000",T31xp_uw)
290     Mask_bits(Addr,"0000000100",Ar_in)
300     Mask_bits(Addr,"0000000010",Dr_in)
310     Mask_bits(Addr,"0000000001",T31xp_in)
320     !
330     IF Ar_uw=1 THEN
340       Ar=1
350     ELSE
360       Ar=Ar_in
370     END IF
380     IF Dr_uw=1 THEN
390       Dr=1
400     ELSE
410       Dr=Dr_in
420     END IF
430     IF T31xp_uw=1 THEN
440       T31xp=1
450     ELSE
460       T31xp=T31xp_in
470     END IF
480     !
490     SELECT Tent
500     CASE 1 ! TE
510       Dr=0
520       SELECT State
530       CASE F1
540         Ar=T31xp=0
550       CASE F2
560         T31xp=0
570       CASE F4,F5,F6,F7,F8
580         Ar=0
590         IF State=F7 THEN T31xp=0
600       END SELECT
610     CASE 0 ! NT
620       State=BINAND(3,State)
630       SELECT State
640       CASE G0
650         Dr=T31xp=0
660       CASE G2,G3
670         Ar=0
680         IF State=G3 THEN T31xp=0
690       END SELECT
700     END SELECT
710     !
720     Output(Addr)=(Ar*4)+(Dr*2)+T31xp
730     Print_bin(Addr,10,"","   ",";")
740     Print_bin(Output(Addr),3,"","",".")
750   NEXT Addr
760   Write_data_file(File$,If(*),Output(*))
770   END
```

```
>>>>>> SUB Write_data_file(File$,DOUBLE Inf(*),Outdata(*))
>>>>>> SUB Read_data_file(File$,DOUBLE Inf(*),Indata(*))
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
```

| | Sep 19 1986 [1737] | | TENT-ADIL.DATA (1024,3) |
|---|---|---|---|
| RFTCP v2.0 2-85 WH## | | [000.01.55] | [000.00.51.C ]..........] |
| Address bit (A): '0'=Address bar | '1'=Address | '-'=no connection | |
| Data bit (D): '-'=no connection | '1'=wired OR | 'o'=AND-NOR | |

| Pt# | (A)98 7654 3210 | (D)210 |
|---|---|---|
| | | 000 |
| (1) | 0- 00-- ---- | -11 |
| (2) | 0- 1--- ---- | 1-- |
| (3) | 0- 11-- ---- | --1 |
| (4) | -- --0- -0-- | 1-- |
| (5) | -- ---0 --0- | -1- |
| (6) | -- ---- 0--0 | --1 |
| (7) | -- 11-- ---- | 1-- |
| (8) | 10 0--- ---- | --1 |
| (9) | 1- 00-- ---- | 1-- |
| (10) | 1- ---- ---- | -1- |
| (11) | 11 ---- ---- | 1-- |
| (12) | 11 10-- ---- | --1 |

Size of matrix = 12x(10x2+3) = 276

What is claimed is:

1. An auto-threshold circuit that allows a signal receiver to detect an input signal at different amplitude levels, the input signal comprising data and a carrier waveform, the auto-threshold circuit comprising
   window comparator means for slicing the input signal at predetermined levels;
   an auto-threshold controller which receives the sliced input signal and provides an output voltage representative of the sliced input signal;
   a digital loop filter which receives the output voltage of the auto-threshold controller and generates a corresponding binary signal; and
   converter means for converting the binary signal to a single-bit, pulse density modulated signal having a predetermined sampling frequency whereby the auto-threshold circuit provides selected data as an ouput.

2. An auto-threshold circuit as in claim 1 wherein the converter means comprises a digital Sigma/delta modulator.

3. An auto-threshold circuit as in claim 2 wherein the auto-threshold control voltage generated form the digital Sigma/delta modulator is filtered by an RC circuit with a non-critical time constant.

4. An auto-threshold circuit as in claim 1 and further including means for operating the digital loop filter at more than one speed.

5. An auto-threshold circuit as in claim 1 and further including an adaptive equalizer that receives the auto-threshold slicing signal and generates an error feedback signal as an input to the adaptive equalizer.

6. An auto-threshold circuit as in claim 1 and including means for qualifying the auto-threshold controller to provide selected data as an output.

7. An auto-threshold circuit as in claim 6 wherein the means for qualifying comprises means for providing a first qualifier signal to the autothreshold controller, the first qualifier signal comprising a sliced output from 0+ and 0− filters.

8. In a receiver of the type that recovers data from input signals comprising data and a carrier waveform, an auto-threshold circuit that allows the receiver to detect input signals at different amplitude levels, the auto-threshold circuit comprising
   full-wave peak sensing means for estimating slice levels for input signal detection;
   means for qualifying the peak sensing means such that the auto-threshold circuit provides selected data as an output; and
   means for providing a window for the input signal such that the peak sensing means is coherent to the input signal, whereby the auto-threshold circuit is insensitive to noise spikes or input signal distribution outside the window.

9. An auto-threshold circuit that allows a signal receiver to detect an input signal at different amplitude levels, the auto-threshold circuit comprising
   window comparator means for slicing the input signal at predetermined levels;
   an auto-threshold controller which receives the sliced input signal and provides an output representative of the voltage level of the sliced input signal;
   means for qualifying the auto-threshold controller such that the auto-threshold circuit does not track an input signal with no modulation, wherein the means for qualifying provides first and second qualifier signals to the auto-threshold controller, the first qualifier signal being a sliced output from 0+ and 0− filters, the second qualifier signal enabling the auto-threshold circuit to operate on the same input signal segments as an adaptive equalizer included in the receiver;

a digital loop filter which receives the output of the auto-threshold controller and generates a corresponding binary output signal; and converter means for converting the binary output signal to a single bit pulse density modulated signal having a predetermined sampling frequency.

10. An auto-threshold circuit as in claim 9 wherein the qualifying means further includes means for providing a third qualifier signal to the controller, the third qualifier signal preventing the auto-threshold circuit from responding to bits which may contain distortion due to bus contention.

* * * * *